US006226626B1

(12) United States Patent
Thiel

(10) Patent No.: US 6,226,626 B1

(45) **Date of Patent: *May 1, 2001**

(54) METHOD AND ARRANGEMENT FOR DATA PROCESSING IN A MAIL-PROCESSING SYSTEM WITH A POSTAGE METER MACHINE

(75) Inventor: Wolfgang Thiel, Berlin (DE)

(73) Assignee: Siemens Aktiengesellschaft, Munich (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/850,413

(22) Filed: May 2, 1997

(30) Foreign Application Priority Data

May 2, 1996 (DE) .............................................. 196 17 476

(51) Int. Cl.[7] ...................................................... G06F 17/00

(52) U.S. Cl. .......................... 705/407; 705/401; 705/404; 700/221; 700/224

(58) Field of Search ..................................... 705/401, 406, 705/407, 408, 410; 364/478.01; 700/213, 219, 220, 221, 223, 224

(56) References Cited

U.S. PATENT DOCUMENTS

| | | | |
|---|---|---|---|
| 4,122,532 | 10/1978 | Dlugos et al. | 705/409 |
| 4,511,793 | 4/1985 | Racanelli | 705/404 |
| 4,639,873 * | 1/1987 | Baggarly et al. | 705/406 |
| 4,800,505 | 1/1989 | Axelrod et al. | 705/404 |
| 4,800,506 | 1/1989 | Axelrod et al. | 705/403 |

(List continued on next page.)

FOREIGN PATENT DOCUMENTS

| | | |
|---|---|---|
| OS 44 19 430 | 12/1995 | (DE) . |
| OS 44 22 263 | 1/1996 | (DE) . |
| 0 493 948 | 7/1992 | (EP) . |
| 0 543 395 | 5/1993 | (EP) . |
| 0 649119 | 4/1995 | (EP) . |
| 0 673 002 | 9/1995 | (EP) . |
| 2 182 178 | 5/1987 | (GB) . |
| 2 215 670 | 9/1989 | (GB) . |

OTHER PUBLICATIONS no author; Pithey Bowes launches new line of integrated weighing system; May 1997; Business Wire, p05191025; DialogWeb copy pp. 1–3.

*Primary Examiner*—Edward R. Cosimano
*Assistant Examiner*—Thomas A. Dixon
(74) *Attorney, Agent, or Firm*—Schiff Hardin & Waite

(57) ABSTRACT

The present invention is directed to a method and arrangement for data processing in a mail shipping system, wherein a piece of mail is detected and scanned in the transport path leading to a postage meter machine. Information obtained by the scanning of the piece of mail is automatically entered into the postage meter machine, and this information includes an identification of a number of items (pages or inserts such as disks or other information carriers). In the postage meter machine, the weight of the piece of mail is calculated by multiplying the item count by an average item weight stored in the postage meter machine, and adding this to the container weight, such as an envelope weight, for the piece of mail, also stored in the postage meter machine. The fee for shipping the piece of mail is then calculated in the postage meter machine using the calculated weight and a fee table for a carrier selected for shipping the piece of mail. The item count can either be printed on the piece of mail, in which case it is scanned directly, or it can be stored in a computer on which the piece of mail was produced, and the scanned information is used to enable the postage meter machine to search the memory of the computer to locate the item count. The piece of mail is then franked in the postage meter machine, with an accounting being conducted before the franking.

61 Claims, 20 Drawing Sheets

U.S. PATENT DOCUMENTS

| | | | | |
|---|---|---|---|---|
| 4,821,493 | | 4/1989 | Pintsov | 705/406 |
| 5,111,030 | | 5/1992 | Brasington et al. | 235/375 |
| 5,117,364 | | 5/1992 | Barns-Slavin et al. | 705/402 |
| 5,257,197 | | 10/1993 | Günther et al. | 705/406 |
| 5,325,303 | | 6/1994 | Walz et al. | 705/410 |
| 5,362,947 | | 11/1994 | Dietrich et al. | 705/408 |
| 5,419,440 | | 5/1995 | Piccoult | 209/583 |
| 5,445,367 | | 8/1995 | Long | 364/478.08 |
| 5,490,077 | | 2/1996 | Freytag | 705/405 |
| 5,493,106 | | 2/1996 | Hunter | 705/408 |
| 5,602,743 | | 2/1997 | Freytag | 705/408 |
| 5,606,508 | | 2/1997 | Thiel | 705/410 |
| 5,684,706 | * | 11/1997 | Harman et al. | 364/464.16 |
| 5,801,944 | * | 9/1998 | Kara | 364/464.2 |

* cited by examiner

POSTAL REGISTER VALUES Ri:

| priv.Carrier-Number m→ | 1 | 2 | 3 | 4 | ... | 7 | ... | l | $\sum_{m=1}^{l} R_{i,m}$ |
|---|---|---|---|---|---|---|---|---|---|
| Register $R_1$ | 200 | - | 78 | - | ... | 150 | ... | 34 | |
| $R_2$ | 100 | 50 | 43 | - | ... | 240 | ... | 57 | |
| ↓ i ↓ | ........ | ........ | ........ | ........ | ... | ........ | ... | ........ | |
| $R_{80}$ | 500 | 80 | 40 | - | ... | 360 | ... | 200 | |
| $R_{81}$ | 300 | 160 | 22 | - | ... | 100 | ... | 140 | |
| | ........ | ........ | ........ | ........ | ........ | ........ | ........ | ........ | |
| $R_h$ | 700 | 320 | 28 | - | ... | 121 | ... | 10 | |

Legend:

Register R1 := remaining value (descending register)
Register R2 := accum.used amount (ascending register)
Register R3 := total reset amount (total reset. reg.)
Register R4 := no. of valid imprints (piece count Σ printing with value ≠ zero),
Register R8 := no. of all imprints (R4 + piece count Σ printing with value = zero),
Register Ri
for further Register with i = 1 to h priv.Carrier-No.1 := Deutsche Post AG, CIN = 100.000.000.000
priv.Carrier-No.2 := DPD, CIN = 200.000.000.000
priv.Carrier-No.3 := UPS, CIN = 300.000.000.000
priv.Carrier-No.m
for further Carrier with m = 1 to l KST-No. 1 := ALPHA_100,
KST-No. 2 := BETHA_200,
KST-No. n
for further Cost Center with n = 1 to k

Fig. 7c

USED POSTAGE p:

| priv.Carrier-Number m→ | 1 | 2 | 3 | 4 | ... | 7 | ... | l | $\sum_{m=1}^{l} p_{n,m}$ |
|---|---|---|---|---|---|---|---|---|---|
| KST-No.1 | 200 | - | 78 | - | ... | 150 | ... | 34 | |
| KST-No.2 | 100 | 50 | 43 | - | ... | 240 | ... | 57 | |
| ↓ n ↓ | ..... | ..... | ..... | ..... | ... | ..... | ... | ..... | |
| KST-No.7 | 500 | 80 | 40 | - | ... | 360 | ... | - | |
| KST-No.8 | 300 | 160 | 22 | - | ... | 100 | ... | - | |
| | ..... | ..... | ..... | ..... | ..... | ..... | ..... | ..... | |
| KST-No.k | 700 | 320 | 28 | - | ... | 121 | ... | 10 | |
| $\sum_{n=1}^{k} p_{n,m}$ | | | | | ... | | ... | | $\sum\sum_{mn} p_{n,m}$ |

USED PIECE COUNT z:

| priv.Carrier-Number m→ | 1 | 2 | 3 | 4 | ... | 7 | ... | l | $\sum_{m=1}^{l} z_{n,m}$ |
|---|---|---|---|---|---|---|---|---|---|
| KST-Nr.1 | 1 | - | 2 | - | ... | 10 | ... | 2 | |
| KST-Nr.2 | 1 | 1 | 1 | - | ... | 16 | ... | 3 | |
| | ..... | ..... | ..... | ..... | ... | ..... | ... | ..... | |
| KST-Nr.7 | 1 | 1 | 1 | - | ... | 24 | ... | - | |
| KST-Nr.8 | 2 | 4 | 1 | - | ... | 5 | ... | - | |
| | ..... | ..... | ..... | ..... | ..... | ..... | ..... | ..... | |
| KST-Nr.k | 7 | 4 | 1 | - | ... | 7 | ... | 1 | |
| $\sum_{n=1}^{k} z_{n,m}$ | | | | | ... | | ... | | $\sum\sum_{mn} z_{n,m}$ |

Fig. 7d

METHOD AND ARRANGEMENT FOR DATA PROCESSING IN A MAIL-PROCESSING SYSTEM WITH A POSTAGE METER MACHINE

BACKGROUND OF THE INVENTION

1. Field of the Invention

The present invention is directed to a method for data processing in a mail-shipping system with a postage meter machine as well as to an arrangement for implementing the method.

2. Description of the Prior Art

In modern offices, producing documents such as letters ensues at the personal computer. The printed documents are manually placed in envelopes or are automatically stuffed in envelopes in a mail station with an envelope-stuffing system. Such mail stations also have postage meter machines available for use.

A postage meter machine is used for franking postal matter and can be equipped with a control unit, a memory arrangement, an input stage, a modem or other data reception means, an input/output control stage, a display and a printer. For example, a stationary print head prints the franking impression column-by-column with simultaneous conveying of the letter past (beneath) the print head. A printing width of approximately 1" is thereby achieved.

In addition to the manual entry of a postage amount into the postage meter machine, the postage is currently often automatically calculated on the basis of stored postage fee schedule tables. All quantities that define the postage such as weight, format and shipping class must be made available to the postage calculating module for this purpose. To this end, the weight is determined by a postage scale, whereas format and shipping class are manually entered.

High-performance franking systems include a dynamic scale. This measures the weight of the letter, with the transport motion of the letter from a delivery point (automatic separating unit) to the postage meter machine being uninterrupted. The determined weight value is converted into a postage value and leads to a corresponding setting of the postage printing means in the postage meter machine. These systems avoid the disadvantage of additional processing time but are very expensive to purchase and require intensive maintenance. Moreover, changes in the shipping class must still be manually entered, which always interrupts the automatic sequence.

If the postage meter machine contains a postage calculator, weight information are entered into the calculator by the scale. European Application 566 225, discloses a method for data entry into a postage meter machine is already disclosed for such a system that employs chip cards or a cellular communication network in order to enter fee schedule changes. Such chip cards, which have a number of non-volatile memories or, respectively, separately accessible memory areas and a microprocessor, are successively plugged into a single write/read unit in order to serially transmit data representing different information into the postage meter machine. The data stored in the postage meter machine can then be accessed during operation thereof.

The postage meter machine checks whether the fee schedule table data of the carrier stored in the scale are still valid and automatically decides whether a reloading or, respectively, updating is required. The updating preferably ensues by chip card after every turn-on, dependent on current criteria. Such criteria are present, for example, when data from a clock/date module that are called at the beginning of use but have been modified due to the passage of time are deemed by the microprocessor to require a reloading. A reloading or updating, however, is implemented only for one mail carrier and there is no possibility of selecting between competing mail couriers.

Such a postage meter machine is a stand-alone postage meter machine and is not provided for integration into a mail-processing system with a number of other devices. The piece of mail must first be placed on the scale before it is supplied to the postage meter machine. A great deal of manual work continues to be necessary in the mail center. Moreover, for operation of this machine, a comfortable, and thus expensive, user interface (keyboard and picture screen) is required in the postage meter machine for clear text presentation of the print format.

If the postage calculating module is located in the scale, the calculated postage amount is either displayed and manually entered into the postage meter machine, or is electronically entered into the postage meter machine as a dataset.

These various versions of the automatic postage calculation share the need for a postage scale. The postage scale represents an additional investment for the user and the scale manipulation also requires additional time.

European Patent 498 955 discloses a method and an arrangement for sending electronically stored letter contents, whereby the scale can be eliminated because the postal matter contains only one insert that always has the same weight. The pieces of mail contain chip cards that are placed in addressed envelopes. A franking tape is printed in the postage meter machine or the addressed envelope is franked before the envelope stuffing. This known arrangement and method, however, does not afford the possibility of supplying the mailings to the postage mater machine unordered with several inserts or different inserts, without again having to utilize a scale for determining the weight. A personal computer serves as an input unit for entering the shipping data into the postage meter machine, which undertakes the accounting.

European Application 493 948 discloses a coupling to a personal computer in order to use this as an input means. The postage fees are stored in various registers that are allocated to various authorities, however, this publication does not describe whether and how these authorities are selected by the customer or how an allocation ensues. This specific solution for a postage meter machine stores the debiting data for various services. A disadvantage of this known system is the outlay arising due to the need for a separate interface between the postage meter machine and a work station used as the input means. A separate printer is connected to the separate interface in order to print out debiting (accounting) reports.

All of the aforementioned, individual solutions for postage meter machines thus require an expensive, separate user interface, or a coupling to a personal computer in order to employ the user interface (keyboard and picture screen) thereof.

German OS 39 03 718 also discloses a coupling to a personal computer in order to print out department-related accounting data via a separate printer. A disadvantage is that a control unit must be connected as a separate device between the individual devices such as the scale, the postage meter machine and the personal computer. The employment of manually plugged chip cards in order to enter accounting reports into the personal computer, moreover, represents an impediment for automation of the production of accounting reports.

European Application 600 749 discloses a mail processing machine with a bar code user interface. Commands for controlling the mail processing machine are entered via a bar code reader pen (wand). This, however, requires a catalog having a list of bar code commands, and manual sampling thereof. A manual positioning of a reader pen and sampling for entering commands reduces the input dependability as well as an assumption of responsibility on the part of the user, i.e., one must assume that the user would not undertake any manipulation with fraudulent intent. As a guard against misuse, no commands that could be misused with fraudulent intent can be found in the list. An entry of unlisted commands effecting a falsification, i.e., a correspondingly generated bar code, however, cannot be prevented. Most steps have been taken to insure that the sequence of the bar code inputs can only ensue according to the sequence of pieces of mail supplied.

German OS 40 18 166 discloses that frankings and/or an address printing be undertaken with a franking module integrated in a personal computer. To that end, the franking module is arranged in a slot of a drive insert of a personal computer. Such a solution, however, limits the universal utilization of the personal computer as a result of the occupation of the slot of the drive insert and, moreover does not accommodate other postal matter conveyor means for other envelope formats and is therefore mainly suitable for standard mail in offices with low to moderate mail volume. A number of personal computers equipped in this way would have to be utilized in an office having a higher mail volume. The integration of the franking module in the personal computer, however, is more expensive than a solution in which a commercially available personal computer and a commercially available postage meter machine are coupled to one another via a data line.

U.S. Pat. No. 4,800,506 discloses a mail processing system with a number of devices that operate in a PC-supported manner and already have connected postage meter machines available. The individual devices carry out functions for recompilation of the letters, namely in the sequence of the postal area codes of their addresses. The aforementioned functions includes opening letters, sensing specific locations, possibly reprinting the letter or comments, folding, envelope-stuffing, postage calculation and sorted deposit or, bundling. Some public mail carriers offer discounts for postal matter pre-sorted in this way. This method is complicated insofar as it may require another printout of the letter. Installation of a high-performance computer is required in the mail station, which must be operated by appropriately trained personnel.

German OS 38 08 178 discloses a mail processing system with a first computer that produces the documents on fan-fold paper and that is in communication with a second computer that controls devices in the mail station. The communication is achieved by markings printed on the document and, by a communication element. The envelope stuffing, addressing and franking of the mail can be indirectly controlled by a printed coding identifying the respective piece of mail. Parameter values that are employed for controlling the envelope stuffing, addressing and franking of the mail are allocated to these identification codings in a data bank. The data bank is connected to the second computer to which the respective identification coding of the piece of mail is communicated via a connected sensor means. The address printing in the mail station is emphasized in this document as an advantage in view of the easy, subsequent modification of, among other things, the addressing of stuffed envelopes, and thus avoiding a bill-like appearance of the envelopes that is associated with window envelopes.

Such window envelopes are allegedly not opened by some recipients because they may contain bills. Apart from the fact that it would be senseless not to open window envelopes because they may contain bills, since cost-increasing reminders would be delivered anyway to such companies or persons, window envelopes nonetheless are not favored by many mailers. This disfavor against printing an address when preparing the letter at a location which will be visible through an envelope window, and against employing window envelops per se, leads to the aforementioned equipping of the mail station with complicated technology. When settings must be undertaken in the mail station in order to utilize beneficial services of a different private carrier, however, even the aforementioned equipping of the mail station with complicated technology still proves inadequate because correspondingly more highly qualified employees are then required. The weight and the postage amount are identified before resending postal matter. In conjunction with the increasing proliferation of private carriers competing with one another, beneficial special fee schedules for transport services and service performances related thereto are also being increasingly offered. A reduction of the weight by reducing the number of inserts for the envelope often suffices for meeting the prerequisites for making use of such special fee schedules. A great deal of redundancy and design latitude in the informational offering exists in direct marketing. For example, the format, the number of lines, letter height, etc., could be optimized for cost reasons. The number of pages could also be reduced when preparing the letter. The employees in the mail station, however, are not in a position to undertake such entries or modifications in the data bank. The employees of the mail station would then have to instruct the other employees whose produce the letter contents, or these mail station employees would have to make such changes themselves. Such a procedure, however, would only lead to unnecessary delays in the mail processing.

SUMMARY OF THE INVENTION

An object of the present invention is to provide a method and arrangement including a postage meter machine with which an automatic postage fee calculation can be made, given changing data which define the postage value, and which allows for a significant reduction in the apparatus hardware and outlay for the overall mail processing system.

A further object of the present invention is to provide a flexible document and/or package shipping system using a postage meter machine in a mail station which can be expanded to future services of various private carriers.

Another object of the present invention is to provide a method and arrangement for mail shipping which can be operated without the need for highly qualified operators, and which performs all functions substantially automatically.

A further object of the present invention is to provide a mail shipping system employing a postage meter machine which operates at a low noise level, is substantially maintenance-free, and which provides reliable operation.

The occurrence of manual input errors into the postage meter machine of the mail station also should be reduced. A further object is thus to provide a mail processing method which upon production of a letter, supplies significant data for subsequent debiting of the postage fee in a postage meter machine before the printout of the letter.

Another object is to provide a postage meter machine which allows an automatic means for setting critical data to be employed as well as an automatic means for the debiting of postage fees ordered according to cost centers, so that it is unnecessary to undertake manual postage meter machine inputs.

Despite a multitude of mail carriers, an accounting should ensue surveyably and reduplicatably in the interest of the customer. An additional object is thus to enable the presentation of accounting statements according to cost centers, as well as according to public and private mail carriers on the basis of displays and print outs.

Whereas a reliable (manipulation-proof) accounting of a monetary imprint is not yet possible using a personal computer without further difficulty, this has already been achieved for a postage meter machine. A personal computer, however, affords possibility for easy input, simulation and display of a number of parameters on the computer screen for mailings that are yet to be produced, and these capabilities can be advantageously utilized in the entry of shipping data for a document or package. The method and apparatus disclosed herein combine the advantages of both a postage meter machine and a personal computer, resulting in no need for a scale connected to the postage meter machine. The postage meter machine and the personal computer, moreover, do not thereby assume the function of weighing pieces of mail, but instead, an average page (sheet) weight or an average insert weight is identified and stored for each letter or package which is produced on a personal computer, as well as the number of pages or inserts, and this information is supplied to the postage meter machine in order to determine the total weight of the item to be shipped (mailed) by multiplying the page weight by the number of pages.

The invention avoids limitations in the financing and implementation of the mail processing insofar as possible. Window envelopes, standard envelopes, as well as other envelope shapes such as are preferred by private carriers, can be employed in order to implement an envelope stuffing in the office. Moreover, an addressing of the mailings is already implemented in the office. An optimization program is run on the personal computer which makes proposals to the user for low mail carrier costs. This provides the advantage that changes in the letter content, the number of pages of the letter, or the addressing of the letter can be undertaken and monitored directly by the employee responsible for producing the letter.

Only the franking ensues as before in the mail station with a postage meter machine, for which the possibility has now been created of generating arbitrary imprints in the way required by private carriers.

A mail carrier is selected with user interface of the personal computer, the number of pages of the produced letter and further shipping information such as the shipping class, as well as the cost center are displayed and, in a first version of the invention, are additionally printed out with the letter content.

A letter produced at a personal computer has a specific format with an area for a specific, imprinted alphanumeric address located in an address field. This address field, as discussed below, may also include a mark, which may be a non-alphanumeric mark, which may also identify the recipient in addition tot he alphanumeric address, and may contain (identify) additional shipping and/or accounting information as well. The aforementioned shipping information is referenced to the respective recipient address. In a first embodiment of the invention, at least the shipping information, supplemented by cost center information is printed out together with the letter content.

Other versions of the first embodiment proceed from the capability of modern office printers of printing a letter recipient address as well as at least the number of pages, cost center and/or carrier information on an envelope or adhesive tape. The printing can also ensue as a mark, for example in the form of a bar code.

The invention is also based on scanning this information from the letter or envelope in the remote mail station with a commercially obtainable scanner and automatically entering the data obtained by this scanning into the postage meter machine. At least one scanner is arranged in the mail delivery stream so that different envelope formats can also be scanned.

The postage meter machine automatically checks whether the selected services are available and, if not, undertakes a communication to a remote data center, whereby specific requests data are sent and the required data are received from the data central and the required data are loaded into its memories.

The invention allows loading of at least the fee schedule tables of the respective carrier which are valid for the location in the system, as needed, and calling of the tables for a selected mail carrier. (USPS, UPS, DEUTCHE POST AG or others).

It is typical in a modern office for a mail station to be provided which is remote from the locations within the office at which documents are produced respectively on personal computers. The overall office, however, may be divided into a number of departments, all of which use the same mail station to dispatch the documents produced in those departments. It is also common for a number of independent offices to share a common mail station in a building. For accounting purposes, particularly in the case of a number of independent users sharing a single mail station, it is necessary to identify the office, and sometimes the department within an office, which produced a document in order to debit an account for that document-producing entity by the cost of shipping the document. For this purpose, in an embodiment each document-producing entity, such as an independent office, or a department within an office, can be identified with a cost center number which can be supplied to the mail station in order to automatically implement an office-specific or department-specific accounting in the postage meter machine. Carrier-specific accounting can also be undertaken.

The operations implemented in the personal computer in the office include text production and processing, entry of the address and allocation of a cost center number for a cost-center-specific debiting of the charge for shipping a document, as well as menu-guided selection of a carrier. All of the information to which the contents of a particular letter (piece of mail) are allocated in the context of storage in a datafile of the personal computer are generically referred to as "instructional data."

The operations implemented in the mail center include at least scanning the address or mark with the cost center and/or carrier information. After scanning the aforementioned information from the letter or from the envelope, the further processing of the data corresponding to this information ensues in the postage meter machine up to the franking of the mailings.

According to the first embodiment of the invention, a method for data processing in a mail shipping system generally includes steps for printing out a letter together with an address field containing an alphanumeric address and/or an address identifying mark, scanning the address field at a mail station, and processing the data as well as franking with a postage meter machine. These steps are described in more detail as follows.

The presence of a piece of mail in the transport path to the postage meter machine is detected.

The mark or the recipient address in the address field of each supplied piece of mail is scanned. As a result, information with respect to the number of pages comprising the piece of mail as well as carrier and/or cost center is automatically entered into the postage meter machine, and at least one set of non-volatilely stored setting data is called (retrieved) for an automatic print data input into the postage meter machine.

A routine is conducted for automatic modification of the retrieved non-volatilely stored setting data, for determining the letter weight and for determining the letter postage on the basis of the letter weight and the communicated shipping data as well as for automatic print data entry and checking, and for display of the automatic entry.

The data are processed in the franking mode, with an accounting related to carrier and/or cost center being conducted before the franking.

The routine for the automatic modification of non-volatile stored setting data includes a formation of request data for reloading current carrier data and/or carrier fee schedules. After the communication of the cost center and/or carrier information from the personal computer to the postage meter machine, the latter automatically checks whether the selected carrier is available in its memories, or whether the fee schedule table data of the selected carrier are current. If not, a communication to the remote data central is undertaken. Specific request data are thereby sent and the required data are received from the data central, this data being loaded into the memories of the postage meter machine. Before the processing of the data in the franking mode, a communication with a remote data central can ensue, whereby, on the basis of communicated, aforementioned request data, carrier-specific datafiles including at least carrier-identifying, current fee schedule datafiles are transmitted from the data central to the postage meter machine. Further, carrier-identifying image data can be transmitted.

Inventively, datafiles that are allocated to every piece of mail, or letter, are provided in the personal computer.

A postage meter machine with automatic data processing according to a second embodiment of the invention scans only the address and then conducts a search for the allocated datafiles in the personal computers. The datafiles are referred to below as letter files. These letter files with the stored letter contents, addresses and shipping data are stored in a personal computer ordered according to the current production data (i.e., date on which the letter contents were produced. The memory or memories, for example hard disks, of all personal computers connected to the postage meter machine via a communication means form a component of a distributed data bank. A particular advantage of this embodiment is that no "new" data bank is required from which data are communicated to the postage meter machine.

Inventively, at least the recipient address that is printed out together with the letter content and that is visible in the window of a window envelope is scanned in the mail center. A clear text recognition, such as with an optical character reader (OCR), ensues in the scanner itself or in the postage meter machine, which then electronically communicates the recipient address, thus converted into electronic data, to a personal computer via a communication means as search request data. The personal computer searches each of its datafiles (letter files) to which a letter content is allocated according to recipient address, and upon the letter file being found which contains the scanned address, the personal computer electronically communicates the cost center and shipping information allocated to that letter file to the postage meter machine via the communication means.

A mail carrier selected with the keyboard/display unit of the personal computer is stored as mail carrier information allocated to the letter recipient address in the letter file every time a letter is produced, but is not printed out together with a contents of the letter. The allocated carrier information can thus be determined again later using the recipient address as a search request and can be electronically transmitted from the personal computer to the postage meter machine via the communication means. The number of pages for the letter content also is automatically determined and transmitted.

A further version of the second embodiment proceeds from the capability of modern office printers of printing a letter recipient address as well as a return address on an envelope. A letter produced at the personal computer therefor has a format with respective areas for a specific, imprinted return address and recipient address when, alternatively, a window envelope is employed. The appertaining data for an automatic data entry into the postage meter machine can then be derived from the return address and from the recipient address in this version.

Some mail carriers require that a bar code be printed in addition to the clear text address in order to achieve a machine-readability of the addresses in a simpler way. The invention affords the capability of franking such envelopes. This requires scanning the addresses from the letter or envelope in the remote mail center with a commercially obtainable bar code scanner and automatically entering the data obtained by such scanning into the postage meter machine. At least one scanner is arranged such in the mail delivery stream so that different formats can also be scanned. After the clear text recognition (OCR) or bar code recognition, formation of search request data ensues in the postage meter machine, the search request data then being electronically communicated to the personal computer via the communication means. The allocated carrier information thus can be determined again subsequently, using the recipient address as a search request and this information can be electronically transmitted from the personal computer to the postage meter machine via the communication means.

Compared to the first embodiment, the second embodiment of the invention has the advantage that no additional information have to be printed in the address field of the letter. It is possible, however, to further shorten the search in the distributed data bank by a single auxiliary information cell. This is especially advantageously utilized given a larger number of personal computers in the offices that all send mailings or letters to a single postage meter machine.

The auxiliary information cell can include an alphanumeric date and time of day when the letter was stored. The required shipping information are stored according to data and time of day on a hard disk of that personal computer on which the letter text was written. Alternatively, the auxiliary information cell may be a code (mark) for the identification of the personal computer which produced the letter.

If the personal computers were individually interrogated (searched) for a letter file currently stored under the address, this, may potentially lead to confusion if different letters to the same addressee were produced at different personal computers on the same day. Such confusion is minimized by an incorporation of time data in addition to the date that is already printed on the letter. Confusion that could still arise if different letters to the same addressee are produced at the same personal computer on the same day can be precluded by an identification code in another version. Such an identification code contains at least one character, for example a letter, for the identification of the personal computer, or text files with identical addressees. This code can be automatically produced by a modified word processing.

An advantage of both embodiment, including the aforementioned versions, is that a mail-processing system is created in which the sequence of the supplied letters in envelopes can be interchanged in the further processing between personal computer and postage meter machine. Because of the chronologically and locally unordered deliveries of the letters that have been printed and placed in envelopes to the mail station, a prescribed sequence in the processing of the letters is precluded. Manipulation-proof functioning even when interchanging the sequence of the mailings is of decisive significance when letter texts are produced on a number of personal computers, but are franked in only one mail station.

A further advantage of the second embodiment is that the shipping class could be redefined between the time the letter text is produced and the franking thereof in the mail center. For example, an originally standard letter can be made into an express mailing or, given a registered letter, a return receipt can also be later determined to be required. The postage meter machine reports the completion of the franking to the corresponding personal computer and initiates an "o.k." mark in the corresponding text file. The letter writer thus always has the possibility of checking at the personal computer to determine whether the in-house processing of his letter has already ensued.

The calculated postage fee can also be transmitted from the postage meter machine to the appertaining personal computer and can be cumulatively stored in the personal computer. It is thus possible at any time to check how much postage was incurred by letter mail that was produced on this personal computer. This is meaningful especially when the personal computer represents a personal computer cost center, i.e. when exactly one cost center is allocated to each personal computer.

The invention also makes it possible to produce a correlation of the department-related accounting in the personal computer to the department-related accounting of postage fees according to cost centers in the postage meter machine with little outlay.

Another version is based on a number of personal computers in the office belonging to a common cost center, and all sending mail to the same postage meter machine. When non-volatilely stored setting data for inputting the print data into the postage matter machine are called, then the same cost center number is called and, consequently, the same advertising slogan is also printed out during franking. The letter recipient addresses and the letter files created are different points in time, however, are different. Selected, different carriers can then be allocated to these stored as carrier identification number (CIN). The interrogation of the letter files by the postage meter machine on the basis of the sensed address enables the changes of a carrier selected for the shipping of the postal matter to be automatically taken into consideration. A variable, carrier-related logo can therefore be printed out during franking.

Another version proceeds on the basis that the personal computers in the office do not belong to a common cost center, but always select the same carrier. When non-volatilely stored setting data for the input of the print data into the postage meter machine are called, then the same carrier number, or CIN, is called. The interrogation of the letter files created at different points in time by the postage meter machine on the basis of the scanned address enables the different cost centers to be automatically taken into account. The routine, for automatic modification of non-volatilely stored setting data in this version contains a sub-routine for allocating a cost center number (cliche number)to a slogan number for the automatic input of the slogan number given input of the cost center number allocated thereto. It is thus possible that, via the slogan number allocated in this way, the variable, specific advertizing slogan for each cost center (department or small company) is automatically set and printed out during franking.

On the basis of the address scanned by the postage meter machine, a combination of the aforementioned versions enables the different cost center and carrier selection to be automatically taken into consideration in conjunction with the communicated number of pages for a postage calculation in the postage meter machine. Simultaneously with the carrier selection, the postage meter machine can also interrogate other selective print types (for example, air mail, return receipt, etc.) or other settings.

The communication of the required setting information to the remote postage meter machine is initiated via a data line on demand by the postage meter machine, whereupon the postage meter machine is supplied with data from the aforementioned personal computer.

The operations performed in the personal computer in the office include the text production and processing, including a determination of the number of pages, the input of the address and allocation of a cost center number for a cost center-related accounting, the menu-prompted selection of the shipping types, shipping forms or determining other information about the most beneficial carrier, the formation of carrier information and the allocation of all information to the aforementioned address, as well as the storing of the allocation. As needed or periodically, accounting reports that are correlated with the cost center-related accounting in the postage meter machine are printed out via an ordinary, connected printer.

The inventive improvements in the postage meter machine reside in allowing a substantially fully automatic processing of the letter while making use of different fee schedule structures of various carriers while still providing flexibility with respect to the debiting vis-a-vis different carriers. Given the elimination of the governmental mail monopoly for sending letters, an increase in mail delivery by regionally, nationally or internationally acting private carriers can be expected. It is in fact already known from package shipping systems to prepare accounting statements for various carriers. The accounting statements for various carriers in the context of package shipping systems generally ensues with a debit note method. Such an accounting approach, however, does not make any automatic processing, postage calculation and security monitoring available to the customer as is prescribed, for example, by postal authorities in the case of a postage meter machine into which a credit was loaded. An accounting vis-a-vis various private carriers is inventively established in the postage meter machine in a postage fee module on the basis of a prepaid or credited amount. The postage calculator contains the stored postage table for the carrier. If a carrier or service was newly selected and the postage table for the selected service or carrier is not available or does not belong to the permanently stored postage tables due to limited memory capacity, the postage meter machine automatically dials a data central operated, for example, by the postage meter machine manufacturer and the required postage table is loaded into the memories of the postage meter machine. Each postage table can have a date allocated to it for when it takes effect and/or for its minimum validity duration. The postage meter machine contains a real-time clock to whose date the minimum validity duration of the corresponding postage table is compared in order to request a new table via the data central, if necessary. A corresponding identifier can be printed in the franking field for identifying the postage table employed.

The specific postage is calculated on the basis of the data already present, such as format and type of mailing, as well as on the basis of a page count and the average page weight.

This is possible both in a debit note method as well as in a pre-paid method. In the debit note method, a debit account is read, whereby the stored value is incremented by the postage value to be franked. In the pre-paid method, a pre-paid amount is maintained in the credit account of the postage meter machine as an electronic credit. Another accounting version is to undertake the accounting on a specific chip card (similar to a telephone card or credit card), brought into contact with the postage meter machine, that each carrier has edited. Because the selection of the carrier that has already been undertaken, however, a universal carrier card can be employed instead of a credit card, a memory area for each carrier in which the accounting data are stored being reserved therein. All of these types of cards will be collectively referred to herein as "value cards."

If the postage meter machine is equipped with, or is in communication with, a modem, an electronic communication of accounting data to the remote data central can ensue at time intervals, the remote data center implementing the accounting with the carrier on commission from the customer. Alternatively, the data center, after an inquiry at the customer's bank directed to the customer's solvency (credit check), can grant the customer a credit and communicate a credit. Information about the appertaining type of accounting and the respective logo that identifies the employment of a current carrier fee schedule are related to the selected carrier. The aforementioned information and their allocation are stored in the postage meter machine for each selectable carrier. As needed, a document about the successful recrediting (receipt) can be printed out with the print head of the postage meter machine for each mail carrier after successful completion of recrediting. This becomes possible by switching the postage meter machine to an internal printing mode. Also, a listing regarding individual financial recrediting data within a time span and other register or service data can be printed out as a document by the print head of the postage meter machine when this is desired.

DESCRIPTION OF THE DRAWINGS

FIG. 7*c* illustrates a format for carrier-related accounting data in the postal registers in accordance with the invention.

FIG. 7*d* illustrates a format for a two-dimensional cost center/carrier matrix in accordance with the invention.

DESCRIPTION OF THE PREFERRED EMBODIMENTS

The following discussion is directed to the handling, and associated data processing, for pieces of mail in the form of letters containing one or more pages (sheets) or inserts such as computer disks or other electronic data carriers. The method and apparatus disclosed herein, however, have general applicability to the shipping of any piece of mail, including packages. The pieces of mail which are handled, with associated data processing, in the method and apparatus disclosed herein have in common the features of a container which contains at least one item therein, with the weight of the piece of mail, and subsequently the shipping fee therefor, being calculated without the use of a scale.

Figure 1A:
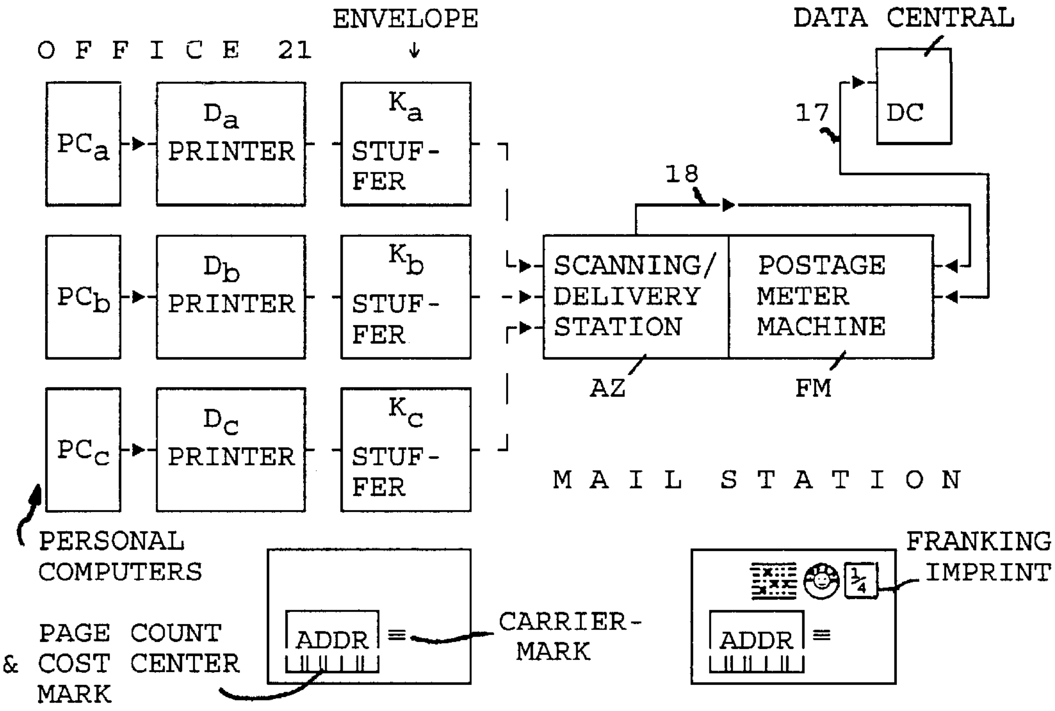
FIG. 1*a* is a block circuit diagram of a mail processing system with a postage meter machine, according to a first embodiment of the invention.

The block circuit diagram shown in FIG. 1 for a mail processing system with a postage meter machine shows the transport flow of mail from a modern office 21 to a mail center. In at least one such office 21, letters are produced on a number of personal computers $PC_a$, $PC_b$, $PC_c$, . . . , with associated printers $D_a$, $D_b$, $D_c$, . . . , and possibly other connected periphery devices.

A mail carrier can be selected and at least displayed with a user interface at each of a number of personal computers, of which personal computers $PC_a$, $PC_b$, $PC_c$ are shown. In the preferred version, the selected mail carrier information is additionally printed out in the address area with the letter contents. A window envelope or a preprinted envelope can be employed for stuffing which takes place at respective automated or manual stuffing locations $K_a$, $K_b$, $K_c$ . . . .

The printer can be a commercially available printer equipped for printing envelopes that is connected to the personal computer. Further, as noted above the address printing can ensue onto self-adhesive labels that are subsequently stuck onto an envelope.

Figure 2A:
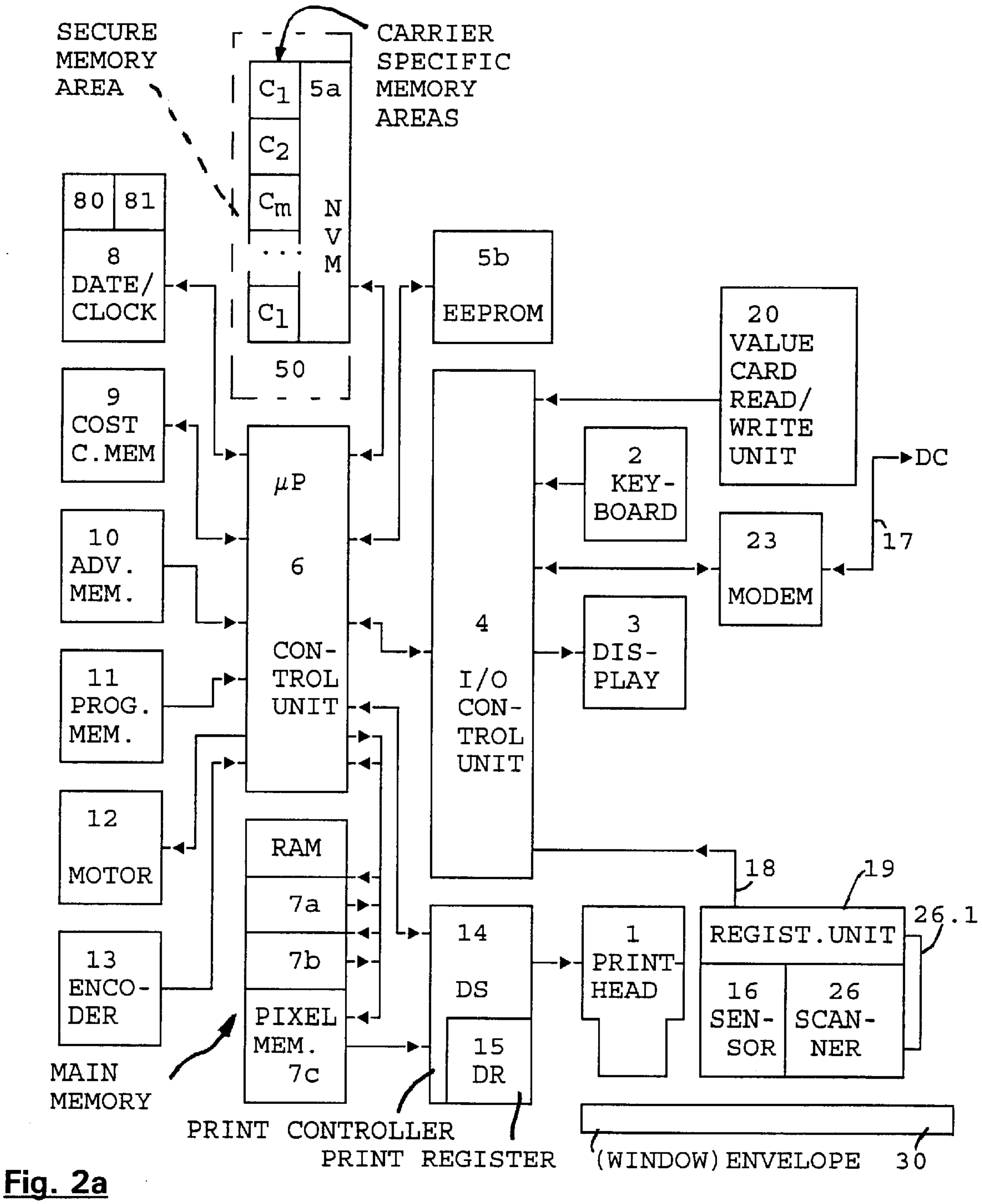
FIG. 2*a* is a block circuit diagram of a postage meter machine with automatic data input, according to a first embodiment of the invention.

In the mail station, at least one of the scanners scans the information with respect to page count and carrier or cost center that is printed on in the address field, or that can be scanned through a window of a window envelope, or is applied to the envelope on a self-adhesive label. At least one letter sensor 16 and a scanner 26 are electrically connected to the postage meter machine via a register unit 19 and a data line 18, as shown in FIG. 2*a*, and are preferably arranged in a scanning and delivery station AZ preceding the postage meter machine FM. A line 17 provides a communication connection as needed with a remote data central DZ.

Figure 1B:
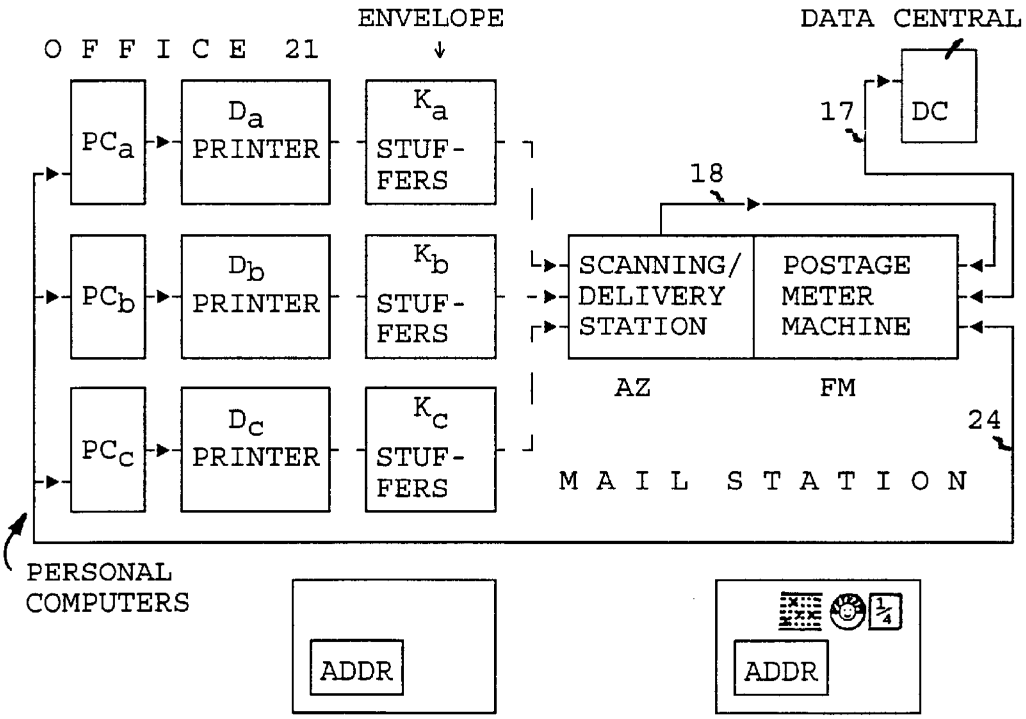
FIG. 1*b* is a block circuit diagram of a mail processing system with a postage meter machine, according to a second embodiment of the invention.

The block circuit diagram for a mail-processing system with a postage meter machine shown in FIG. 1*b* in a second embodiment additionally has a communication connection 24 between the postage meter machine FM and at least one personal computer in the office 21.

The page count is communicated to the postage meter machine in order to at least determine the weight data of the letter in the postage meter machine.

The postage meter machine can form request data from the address data of the letter recipient scanned with scanners in the mail center in order to request additional data in the office 21 that are communicated directly to the postage meter machine from the respective personal computer $PC_a$, $PC_b$, $PC_c$, via the data line 24. The scanners can again advantageously be part of an automatic scanning and delivery station that is arranged in the mail center at the start of the letter transport path in front of the postage meter machine.

Figure 2B:
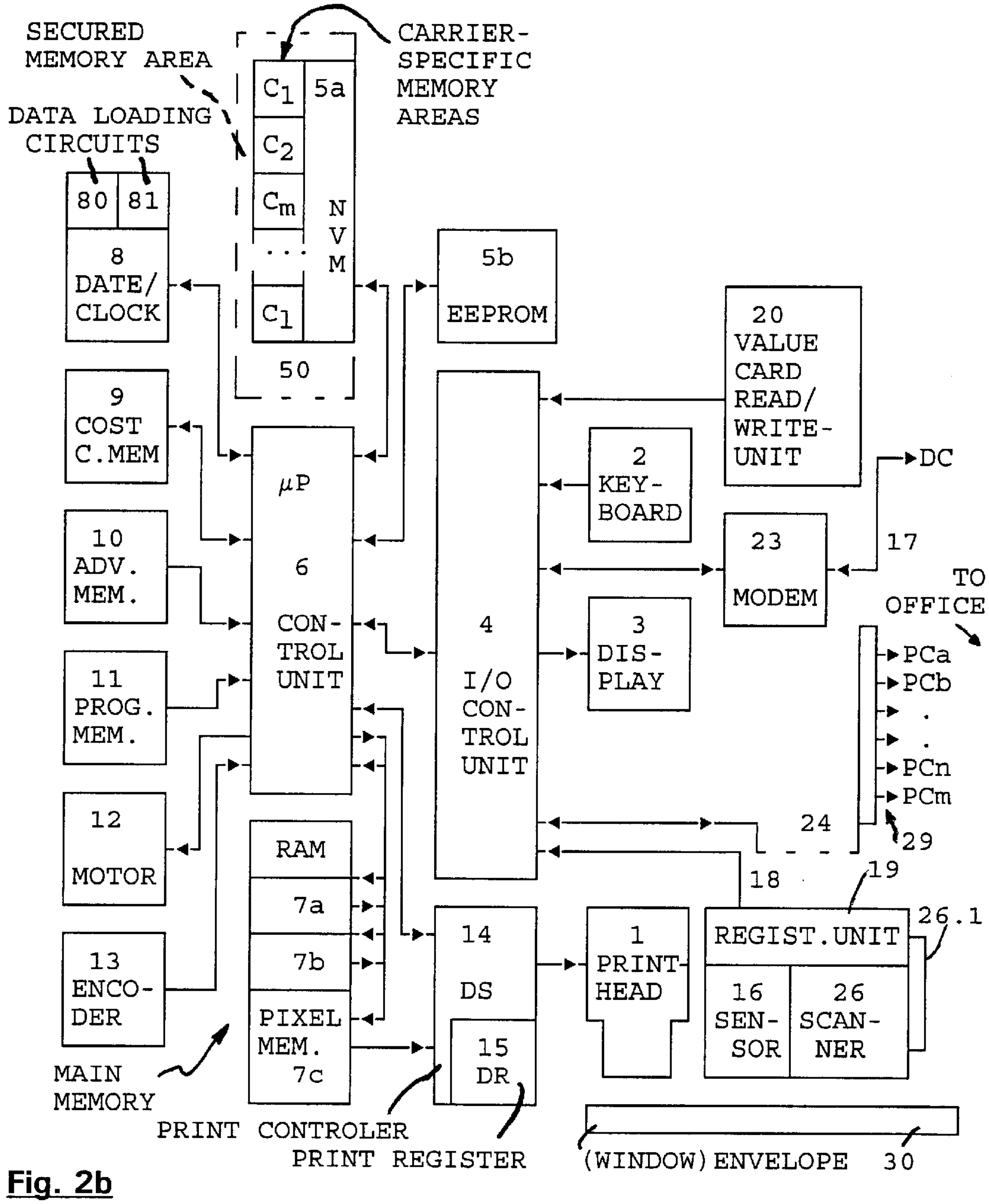
FIG. 2*b* is a block circuit diagram of a postage meter machine with automatic data input, according to a second embodiment of the invention.

The block circuit diagram of a postage meter machine shown in FIG. 2*b* has a programmable processor system that is connected to at least one scanner 26 and a modem 23, a value card write/read unit 20 and/or other, corresponding reception means or communication means for communication with the office 21. The scanner for the address is likewise positioned at the start of the secure mail path in the mail center. Of course, a number of personal computers $PC_a$, $PC_b$, . . . $PC_n$ through $PC_m$ in the office 21 can communicate with a single postage meter machine when these, for example, are successively requested to search their files stored under time data for a relevant letter recipient address and allocated cost center and/or shipping information. Files with the same recipient address are considered not relevant if they were not stored on the same day. The requested carrier and/or cost center identifiers are then electronically communicated to the postage meter machine, for example via a data line.

The scanners 26 (and other scanners, if present) is positioned at a suitable location in the mail path preceding the postage meter machine. This position is derived as a result of uniform mail regulations for the position of the address. Corresponding programs for the position of the addresses exist in memories of the respective personal computers $PC_a$, $PC_b$ or $PC_c$ in the office 21 that drive a printer in common or use separate printers according to the aforementioned areas to be printed. A bar code can additionally be printed on the envelope, i.e., in the address field of the envelope. A differently positioned further scanner 26.1 can be provided for a different format of the envelope. The scanners 26 and 26.1 are connected, together with a first mail sensor 16, to with a register unit 19 that intermediately stores data and implements a parallel-to-serial conversion. For serial data transmission, the register unit 19 is electronically connected via the data line 18 to an input/output control unit 4 of the postage meter machine, as shown in FIG. 2*b*.

The inventive method and apparatus are based on an intentionally produced relationship between the address of the letter printed out and allocated information in the letter files in one of a number of personal computers, whereby, after scanning the address, formation and communication of search request data and a search in the memories of the personal computer, additional information for the aforementioned address required for the automatic data entry is electronically transmitted to the postage meter machine via a data line. The allocation of the information to the address is fetchably stored in the personal computer, for example ordered according to time data, in order to enable access to the most current datafile with the same address as the scanned address. The allocation of the information ensues in the personal computer upon the storage of the addresses that are printed out with the letter contents. After a first preparatory step for creating a letter file within the framework of a letter production program, further preparatory steps are executed, and an allocation of the printed-out letter to the aforementioned address and the allocation of aforementioned, transmittable, additional information to the address is fetchably stored in the personal computer according to time data. This additional information inventively includes the page count of the produced letter.

Upon a scanning of the return address, the corresponding cost center or department can be identified in a manner analogous to that for the carrier information. The personal computers in the office are searched by the postage meter machine in the mail station for a cost center number that is allocated to the return address. Such a method for data processing in a mail shipping system includes known steps for printing out a document together with an address field and mark, scanning the mark in a mail center, and processing the data as well as franking with a postage meter machine. As a result of the scanning of the return address and/or of the mark for the return address and searching of the personal computer for a stored allocation to the aforementioned return address, the cost center number is inventively automatically entered into the postage meter machine, with an automatic entry of the imprint number on the basis of the entered cost center number, for automatic print data input and for cost center-related accounting before the franking.

In a version of this embodiment, scanning of the return address as well as of the letter recipient address and/or of the corresponding mark on the piece of mail takes place in the transport path to the print head of the postage meter machine FM. Subsequently, the postage meter machine FM searches a personal computer for allocated, stored information. The determination of the personal computer responsible for the storage of the letter file on the basis of the return address is advantageous in this version. The search process for the relevant letter file is thereby shortened significantly in the case of a large number of personal computers in the office 21.

If the addresses are scanned through a window envelope with the scanner 26, the allocated information with respect to the cost center and the number of pages as well as further shipping data, including the carrier identification number (CIN), that are stored in the personal computer in the office 21 can electronically called by the postage meter machine FM in the mail station via the data line 24. The aforementioned, allocated information stored in the office 21 serve for the automatic setting of the postage meter machine FM, which makes a manual operation virtually superfluous.

Of course, such a pre-set carrier can nonetheless be manually changed in the mail station when, for example, the input was not actuated in the office 21 or when some other carrier is more favorable. When shipping a number of letters produced on the same day to the same postal zip code, it is generally assumed that it is more economic not to use a number of different private carriers, but instead to ship all such letters using the same carrier. A complete automation can be achieved when the best carrier is determined in the office 21. A postage meter machine FM that can be operated for a number of carriers is employed.

The block circuit diagram of a postage meter machine shown in FIG. 2*a* has a programmable processor system that is connected to at least one scanner 26 and a modem 23, a chip card write/read unit 20 and/or other, corresponding reception means or input means. The scanner 26 for the address is positioned at the start of the secure mail path in the mail center. This position derives as a result of uniform mail regulations for the position of the address. Corresponding programs for the position of the address and of the other information exist in memories of the respective personal computers $PC_a$, $PC_b$ or $PC_c$ in the office 21 that drive a printer in common or separate printers according to the aforementioned areas to be printed. An additional line can be provided on the envelope or in the address field of the envelope as the area to be printed. A differently positioned further scanner 26.1 can be provided for different formats of the envelope. The scanners 26 and 26.1 together with a first mail sensor 16 are connected to a register unit 19 that intermediately stores data and implements a parallel-to-serial conversion. For serial data transmission, the register unit 19 is electronically connected via the data line 18 to an input/output control unit 4 of the postage meter machine.

In the postage meter machine housing, input and output units such as a keyboard 2, a display 3, the chip card write/read unit 20 and the modem 23 are connected via the input/output control unit 4 to a processor system having a postal-oriented security region 50, by a direct connection or via a bus (not shown). The processor system is composed of at least one memory means having a non-volatile memory (NVM) 5*a*, with carrier specific memory areas $C_i$, $C_m$, and an EEPROM 56, a clock/date module 8 and a processing unit (CPU) functioning as a control unit 6 and, possibly a specific circuit or program source 80 and/or 81 for automating the loading of data from a data central via modem or chip card, or some other suitable transmission means. The special circuit and/or program source 80 and 81 are preferably a component part of a battery-supported, non-volatile memory (CMOS-NV-RAM) in the clock/date module 8. Further supporting programs can be present in the program memory 11 and/or in a non-volatile EEPROM stored in the memory 5*b*. A print controller 14 is fashioned, for example, as an ASIC and is matched to the respective, preferably digital, printing process, and operates with a print register 15.

The input/output control unit 4 may include the print controller 14 and be connected in to the control unit 6 of the postage meter machine via a bus and, for example, can be fashioned as an ASIC. A print head 1 is connected to the print controller 14.

The various memories are usually composed of a number of permanent and temporary, non-volatile memories. Together with the control unit 6, one part of the memories forms a postage calculator in a known way an another part forms a protected postal region within the processor system. Work is carried out with the non-volatile memories of the aforementioned, other part of the memories for accounting. It is particularly provided that the protected postal region 50 be equipped with a specific accounting unit that works in a completely counterfeit-proof way and relieves the control unit 6 of this task job. The protected postal region 50 of the processor system of the postage meter machine can be fashioned as a hardware-controlled accounting unit in the form of a special circuit module or, for example, as an ASIC, so that the executive sequence during accounting cannot be manipulated in an unauthorized way, as disclosed in German patent application 196 03 467.1, corresponding to co-pending U.S. application Ser. No. 08/788,188 filed Jan. 24, 1997 now Abandoned, entitled “Postage Meter Machine.”

In addition, an area organized according to carrier and cost centers can be provided in a special cost center memory 9 in order to execute operations related to the cost center or cost centers. Additional cost centers can thus being established or deleted without the reliability against manipulation be diminished. The protected postal region 50 within the processor system can only be read, but not overwritten. During the service life of the postage meter machine, data such as the number of pieces franked and total amount used for franking with a postage value can always only be incremented but never decremented. In particular, the postage calculator can be formed of the control unit 6 and memory areas of the EEPROM 5*b* and/or other nonvolatile memories. Some of the memory areas of the EEPROM 5*b* are intended for the acceptance of fee schedule tables of the individual carriers.

Differing therefrom, individual costs and their data (number of pieces, total amount used) in the cost center memory 9 can be reduced by a predetermined amount, or can be set to zero at the start of an accounting period. The correspondingly actuated keys of the keyboard 2 and/or other input means produce a connection to external memories in order to execute operations related to cost centers.

The program memory 11 of the memory means of the postage meter machine contains programs for initiating and conducting a communication via interfaces in the input/output control unit 4 with the scanner 26 and with input units 20 through 23 and with at least one of the personal computers $PC_a$, $PC_b$ and/or $PC_c$ at the office 21. In this context each of these personal computers with its connected keyboard and monitor can be considered as a peripheral input/output means for the postage meter machine FM for searching for and entering data. Other peripheral input/output means (not shown in detail) can be connected to the processor system of the postage meter machine. At least one parallel interface to the display unit 3 and, in conjunction with the print controller 14, at least one serial interface for print data control and data transmission to the drive electronics arranged on the print head 1, can be provided in the input/output control unit 4. A further serial interface can be connected via the aforementioned register unit 19 to a number of scanners or sensors. At least one scanner 26 is a pixel sensor with a high resolution. Its data bits are output in parallel and are converted into serially fetchable data bits with a sensor shift register in the register unit 19 driven by the input/output control unit 4. The input/output control unit 4 is preferably fashioned such that a number of sensors or actuators with one or more connected sensors or actuator shift registers can be connected via a shared serial interface data line 18 to a single shared shift register in an actuator/sensor controller in the input/output control unit 4, as disclosed in greater detail in the German application No. P 44 45 053.2, corresponding to co-pending U.S. application Ser. No. 08/568,019 ("Internal Postage Meter Machine Interface Circuit" Rieckhoff et al) filed Dec. 6, 1995 now U.S. Pat. No. 5,710,721 and assigned to the same assignee as the present application.

The base (not shown in detail) of the postage meter machine is composed of the print head 1 and a power electronic/sensor/actuator module 12 that contains an energy supply and control for the drives (paper transport, printer, tape, tape dispenser) and the required drive motor. The print head and the module 12 and an encoder 13 for acquiring the transport speed of the piece of mail lie in the base and are coupled to the processor system directly and/or to the processor system and, possibly to other peripheral input/output means in the mail station or in the office 21 via the input/output control unit 4 via appropriate interfaces.

The postage meter machine has a reception means such as an external modem 23 and a modem interface in the postage meter machine for the external modem 23 or for an internal modem. A communication with the remote data central DC is enabled via modem. An electronically stored credit thus can not only be replenished in the postage meter machine, but also current fee schedule table data and other data can be communicated.

In another version, a telecommunication network is provided that externally contains a memory with the fetchable data and/or flags for reloading of auxiliary functions and information into the postage meter machine. The external memory is supplied with updating data from the public postal authority and/or private carriers, preferably via the aforementioned data central DC.

Alternatively, an external memory with required updating data can be provided in a mobile radiotelephone communication network and can be addressed by a corresponding communication connection and communication means. An intermediate storage in the transmission means ensues, and data packets are then transmitted under the control of the postage meter machine and an automatic transfer of the current fee schedule by the postage meter machine is thereby potentially assured. The storage of the fee schedules ensues according to various public mail carriers or private carriers in separate memory areas of the aforementioned postage calculator.

Specific inputs can be undertaken with an alternative input means, particularly a chip card. This is brought into contact with the chip card write/read unit 20 serving as an input means. The interface board of the chip card write/read unit 20 is connected to a serial interface of the postage meter machine. The contacting means in the write/read unit 20 comprises at least six contacts and the data exchange between the unprotected and/or the protected card memory area and a non-volatile memory of the program memory 11 of the postage meter machine is automatically serially undertaken in the framework of a communication protocol as soon as the chip card has been plugged into the plug-in slot of the write/read unit 20.

Such a special mail station chip card for the employees in the mail station can be advantageously utilized for entering location data. A correspondingly programmed chip card is delivered to the user after authorization of a new location or a change in location. Before the machines of the mail station are transported to a new location, it is necessary to turn them off. A location-specific initialization of the postage meter machine automatically ensues after turn-on. So that the postage meter machine need not be switched on or off often at the same location, a standby mode is provided.

With the same chip card delivered to the user, a corresponding postmark imprint text part for the modified name of the municipality and, if needed, for the modified postal zip code is loaded into the postage meter machine in addition to the setting in order to be able to modify the print image data already stored in conformity with the change in location, as is disclosed by European Application 566 225.

Every allocation of semi-variable print image data (window data) that fill up a specific window in the print format (frame data) is stored in specific memory areas of, for example, the EEPROM **5*b*** and/or of another non-volatile memory of the postage meter machine FM.

In the franking mode a cost center-specific accounting of the automatically or manually set postage value ensues before the printout of the franking format, this being explained in greater detail in connection with FIGS. **7*a* through 7*d*. It is also provided that a printout can be produced for the cost center-specific accounting by the postage meter machine, as disclosed in German OS 42 24 955. In the first embodiment of inventive mail shipping system, a print requirement upon introduction of a sheet of paper into the printing region is recognized by a standard, mail sensor 16 and, as a reaction to a preceding, manual input including entry of the cost center number in conjunction with a function key, the postage meter machine then produces a printout. The postage values that have been used are listed individually and cumulatively related to various carriers. The cost center printout is regularly sent to the appertaining department in the office 21** or in response to a specific request.

Similar to FIG. **2*a*, input and output units 2, 3, 20 through 23 in the block circuit diagram of FIG. 2*b* are connected via the input/output control unit 4 to a processor system that has a postal-oriented security area 50. A permanent memory PSP 11 of the memory means of the postage meter machine contains programs for a communication—via interfaces in the input/output control unit 4—with the scanner 26, the input unit 20 through 23 and—via a data line 24—with at least one personal computer in the office 21. A personal computer (PC) including picture screen and appertaining keyboard can be viewed as being a peripheral input/output means for searching and input of data. Moreover, a connection to an existing computer network can be enabled by a separate device 29. Further peripheral input/output means (not shown in detail) can also be connected to the processor system of the postage meter machine. Accounting information is communicated via the aforementioned data line 24 to the appertaining department in the office 21 either regularly or as a reaction to a message request. Documents about reloadings with credit, fee schedule, image and other data that have ensued are also printed out in a mail-carrier-related format in the mail station with the print head 1 of the postage meter machine. As needed, a document (receipt) about the accomplished reloading after a reloading has been undertaken can be produced separately for each mail carrier when the postage meter machine is switched to an internal printing mode. A self-adhesive franking tape is then preferably printed. A listing concerning individual financial reloading data within a time span and other register or service data can be printed out as a document by the print head of the postage meter machine when this is desirable. After an electronic communication, such a document can also be printed in the office 21. As needed, data for a carrier are also produced for whom the postage values of all cost centers serviced by this carrier are compiled. This is meaningful when the departments are fiscally independent units, i.e., when a number of small companies that use an office 21** and the mail station in common but must carry out separate accounting at the carriers.

In a further version for conducting a cost-center-specific accounting in the inventive mail processing system, an automatic entry of the cost center number into the postage meter machine is undertaken as a reaction to an inquiry from a personal computer in the office 21 via the data line 24, and, in conjunction with a specific program stored in the program memory PSP 11, a data communication to the personal computer in the office 21 can be undertaken for listing the cost-center-specific accounting. The cost center printout can then be undertaken by the appertaining department in the office 21 itself with a printer connected to the requesting personal computer.

The communicated listing can also be compared in a personal computer of the office 21 to an internally stored listing. Only modifications of the setting of the carrier are undertaken by the mail center in order, for example, to use favorable offers to obtain rebates from carriers, so that this can be checked by such a comparison.

Figure 3A:
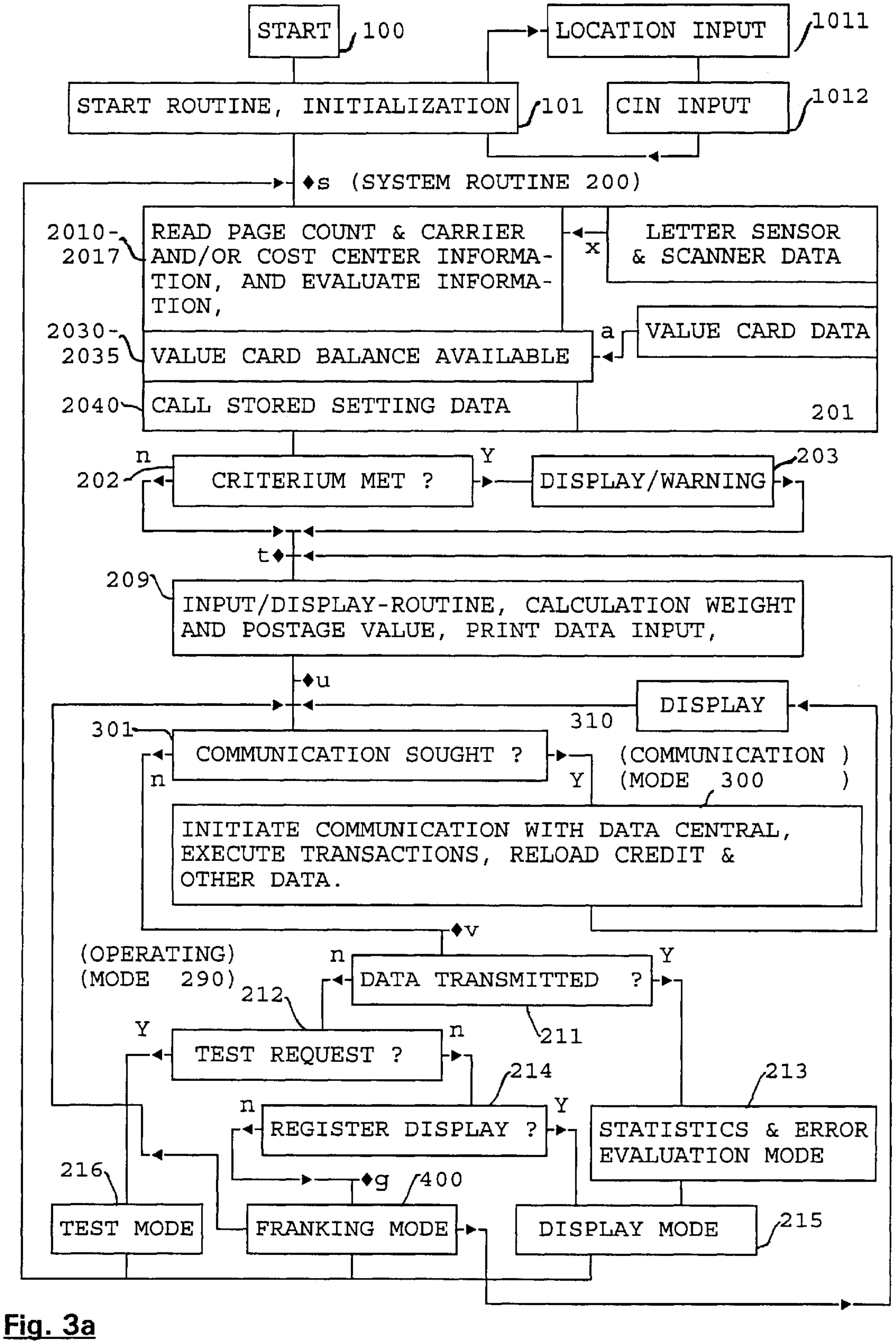
FIG. 3*a* is an overall flowchart of a postage meter machine with integrated postage calculation and with automatic data processing according to the first postage meter machine embodiment.

The overall flowchart for the postage meter machine of FIG. 2*a* is shown in FIG. 3*a*. After a start 100, a start and initialization routine 101 is executed which includes a sub-step 1011. After turn-on, a communication requirement is formed in the sub-step 1011 in order to initiate an automatic communication with the data center, for example, via modem 23, and in order to implement a corresponding data transmission wherein the municipality name in the date stamp is modified corresponding to the current location.

The location-specific offering of data ensues optionally or corresponding to the existing postage meter machine type with a card-like transmission means or with corresponding reception means, ensuing from an external memory via a communication network (modem, mobile radiotelephone).

Given a location input with a chip card via a chip card reader/write unit 20, authorization must be obtained in advance. This is in fact more time-consuming but allows a location registration for the respective mail processing system in the data center DC.

In another version, an entry of the location is undertaken, for example, by the keyboard 2 instead of with a remote data transmission or instead of chip card when the postage meter machine is turned on, for example, by a new user after a change in location. After the turn-on, such an input possibility is afforded in sub-step 1011 of step 101 of the initialization, namely by entering the postal zip code into the postage meter machine.

During the initialization routine 101, there is also the possibility in addition to the input of the location to change the previous carrier constellation by definition of a new set of mail carriers, for example with an input of a carrier identification number (CIN) corresponding to the name of the mail carrier in sub-step 1012.

When one of the carriers has been selected from the aforementioned set of mail carriers at a later time, only the carrier identification number (CIN) need be automatically communicated to the postage meter machine and the data stored in nonvolatile fashion under the carrier identification number (CIN) in step 1012 need be accessed.

After the initialization routine 101, the program branches to a first step 201 a system routine 200 in order to at least call non-volatilely stored settings for the postage meter machine in sub-step 2040 when no piece of mail is detected in the mail delivery path. Step 209 affords the possibility of modifying the aforementioned setting with a manual input. One of the aforementioned settings describes an average insert to the piece of mail, such as a page (sheet) weight, which can be modified in step 209 as needed.

A piece of mail possibly supplied in the meantime remains in a waiting period, preferably at the start of the delivery path until all manually required inputs have been actuated in the second step 209. The franking mode 400 is reached after further steps of the overall flowchart have been executed. It is recognized therein that the manual input has been terminated by a comparison of the loop traversals after the last input to a predetermined plurality of loop traversals, or a time duration is compared to a predetermined time duration after the last input. A switch is then first made into the standby mode before returning to the system routine 200 at s.

Inventively, data scanned by the scanner 26 positioned in the mail delivery path to the postage meter machine FM can be entered into the postage meter machine during the activated operating or standby condition of the postage meter machine when a first postal matter sensor 16 has detected a piece of mail that is being transported to the print head 1. A first flag is thereby set. If a second letter sensor (not shown) is used as well, a second flag is also set when the postal matter sensor 16 is actuated. When, however, only the second postal matter sensor by itself is actuated, or is actuated before the postal matter sensor 16, this can be determined in an interrogation step 211 which then in turn leads to a branch into the error interpretation mode 213. When, for example, the postage meter machine is in the standby condition and only the second postal matter sensor is activated, this does not lead to a franking however, an internal cost center printout or a printing of service data or of an advertising slogan can still be undertaken.

The interfaces in the input/output control unit 4 are selected in order to recognize the connected peripheral means and in order to switch the postage meter machine as warranted into a required, pre-programmed operating mode that enables the collaboration and communication with the aforementioned peripheral means. For example, a detection of the scanned data can trigger a conveying of the piece of mail in the direction of the print head 1. The interface to the scanner 26 is selected in order to detect at least one cost center and/or carrier identifier in sub-steps 2010 through 2017 (explained in connection with FIG. 6*a*) in order to read valid data into the memory areas of the non-volatile memory of the postage meter machine provided for that purpose, so that a manipulation-proof, automatic setting can be achieved, which is also preserved in case of an outage of the operating voltage. In sub-steps 2030 through 2035 (also shown in FIG. 6*a*), the interface to the write/read unit 20 is then selected, whereby a mode switching ensues if such a write/read unit 20 is connected for monetary value input. The postage meter machine FM is then in a slave condition in order to receive data from the peripheral means, i.e. the scanner 26 and the write/read unit 20. The new setting for the automatically entered weight value is likewise non-volatilely stored, with the old setting data being overwritten.

In at least one following step 202, an interrogation is carried out to determine whether the scanned data yield meaningful information to determine at least one limit value is exceeded, i.e., whether a criterion was met that leads to a warning in a following step, for example a display that warns the user or displays an error. After a number of interrogations in further steps 202, 209, 301, 211, 212 and 214 have been executed in the program, the postage fee determined in the step 209 for a weighted piece of mail, or according to the setting, is accounted for or debited in the franking mode 400. Print data for printing are now offered from the pixel memory 7*c* in the RAM 7.

Moreover, an automatic print data generation with protected data also already ensues in the initialization routine 101 for preparing for a printout, as disclosed in greater detail in co-pending U.S. application Ser. No. 08/525,923 ("Method For Improving The Security Of Postage Meter Machines," Windel et al filed Sep. 8, 1995 now U.S. Pat. No. 5,805,711 and assigned to the present application ). Further security criteria can be interrogated at least in step 202 and can be displayed in the step 203 or can be edited for signaling. Even when no further inputs are undertaken, a stamp imprint can be generated and printed from the stored data protected against manipulation. The following, inventive, second step 209 is directed to a specific input and display routine. In the aforementioned step 209, the previously non-volatilely stored data can be overwritten or modified with the input means of the postage meter machine or other inputs can be manually actuated and displayed. A print data input is also provided for corresponding sub-images (window pixel data). The transport of the postal matter in the direction of the print head 1 may then be interrupted so that the input can be completed. When, however, no manual intervention ensues, the mail processing and franking is executed fully automatically.

After the second step 209, the point u, i.e., the beginning of a communication mode 300, is reached and an interrogation is made in a third step 301 to determine whether a transaction request is present. This is the case when request data were formed or when an input was undertaken for the purpose of reloading credit. When this is not the case, the communication mode 300 is exited and point v, i.e., the actual operating mode 290 of the postage meter machine, is reached. When relevant data were communicated in the communication mode, then a branch is made to the step 213 for data interpretation. A statistics and error evaluation is implemented in step 213 in order to acquire further current data that, after branching to the system routine 200, can likewise be called in the sub-step 2040 of the first step 201. Or, when the non-communication of data was found in at least step 211 following the communication mode in the third step 300, a branch is made to the next interrogation in step 212. A check is made in step 212 to determine whether corresponding inputs had been actuated in order to proceed into the test mode 216 given a test request, otherwise to proceed into a display mode 215 when a check 214 of the register status is intended. When this is not the case, the point g, i.e., the franking mode 400, is automatically reached. In the franking mode 400, a number of security interrogations are provided and the cost center-related accounting only ensues shortly before the beginning of the printout of the franking format, with memory address data being employed that were already previously formed after their entry on the basis of a change in the cost center number. A higher security against manipulation is achieved with the aforementioned sequence of interrogations. With the program routine of the postage meter machine, the branch is then made from the franking mode 400 to point u when a number S of credit items has been used. A communication with the data central DC is automatically undertaken in order to be able to continue to frank. A branch is repeatedly made to point t from the franking mode 400 in order, in the second step 209, to enable a data input with the postage meter machine keyboard 2. In a practical fashion, such manual inputs ensue when a signal for a print output request was not yet generated, this being derived from a corresponding postal matter sensor signal. When, however, postal matter was recognized and the print output request was generated after a predetermined time delay, a cost-center-dependent accounting and a franking of a piece of mail are implemented by program and a branch is then made back to point s.

Figure 3B:
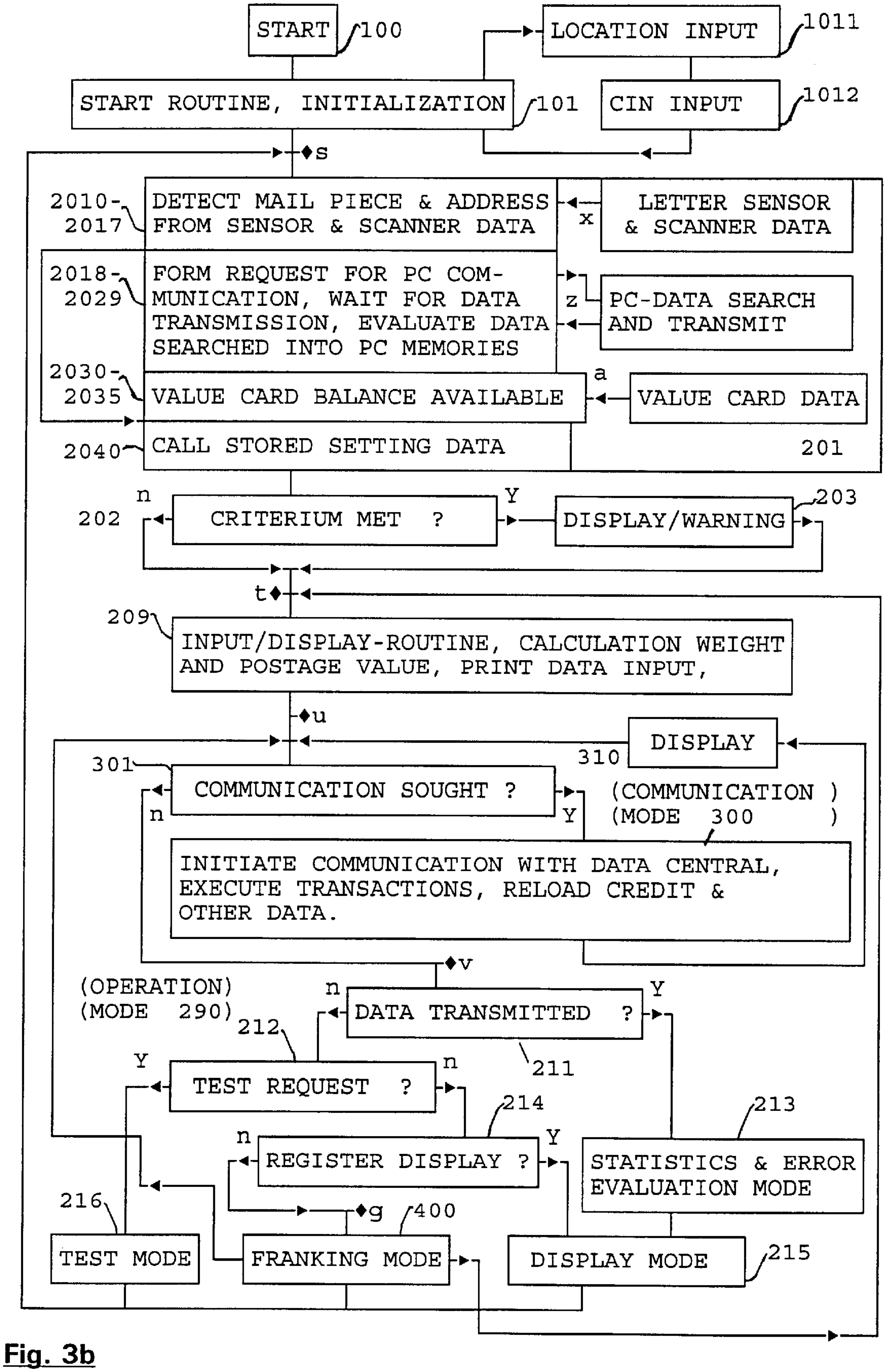
FIG. 3*b* is an overall flowchart of a postage meter machine with integrated postage calculation and with automatic data processing according to the second postage meter machine embodiment.

The overall flowchart FIG. 3*b* for the postage meter machine of a system according to the second embodiment employs a start and initialization routine identical to that already described, including sub-step 1011 for updating the location information and the sub-step 1012 for updating the carrier constellation. The stored carrier constellations can be matched with one another via the data line 24 to the personal computers.

After the postage meter machine FM is turned on, a communication request is formed in the aforementioned sub-steps in order to initiate an automatic communication with the data center dc, for example via modem 23, and in order to implement a corresponding data transmission for the updating the database as needed.

After the initialization routine, a branch is made to step 201 in order to at least call (retrieve) non-volatilely stored settings (default settings) for the postage meter machine in sub-step 2040 when no piece of mail is detected in the mail delivery path. One of the aforementioned settings again relates to the average page weight. The setting of the page weight for letters or the insert weight for other mailings can be stored allocated to the cost center and can again be correspondingly modified.

A piece of mail, if potentially supplied in the meantime, remains in a waiting position, preferably at the start of the delivery path, until all manually required inputs have been actuated in the step 209. After the last input, a switch is first made into the stand-by mode before a return is made to the system routine 200.

The interfaces in the input/output control unit 4 are selected in order to recognize the connected peripheral means and in order to switch the postage meter machine FM as warranted into a required, pre-programmed operating mode that enables collaboration and communication with the aforementioned peripheral means. For example, a detection of the scanned data can trigger conveying the piece of mail in the direction of the print head 1. The interface to the scanner 26 is selected in order to detect cost center and/or carrier information for at least one cost center and/or carrier in steps 2010 through 2016 in order to read valid data into the memory areas of the non-volatile memory of the postage meter machine FM provided for that purpose, so that a manipulation-proof, automatic setting thus achieved is also preserved in case of an outage of the operating voltage. In the following sub-steps 2018 through 2029, a communication with one of the remote personal computers is implemented, this already having been explained in conjunction with the data line 24 in FIGS. 1*b* and 2*b*. This communication includes at least the transmission of request data to the personal computer in the office 21 and the calling of cost center and carrier data stored in the personal computer in the office 21.

In steps 2030 through 2035, an interface to the value card write/read unit 20 also may be selected. The new setting for the automatically entered, available monetary value is again non-volatilely stored, with the old setting data being overwritten. The further interrogations again ensue in the manner already described for FIG. 3*a*.

In the step 201, the overall flowchart shown in FIG. 3*b* for a postage meter machine with integrated postage calculation thus includes a number of sub-steps for an automatic data entry according to the second embodiment of the mail-processing system. The step 201 includes the sub-steps 2010 through 2017 for a scanner communication mode, as described in FIG. 6*a* in greater detail, sub-steps 2018 through 2029 for an office computer communication mode, as described in greater detail in FIG. 6*b*, and, optionally, sub-steps 2030 through 2035 for a value card communication mode, as described in greater detail in FIG. 6*a*, as well as the sub-step 2040 for an automatic data entry.

Figure 4A:
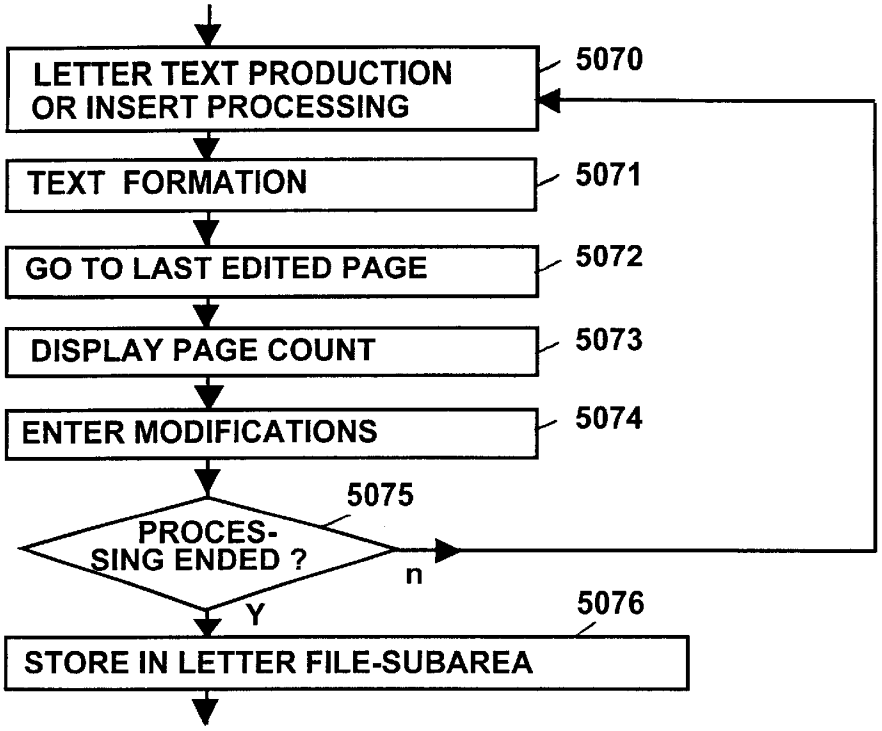
FIG. 4*a* is a computer routine for determining the page count as the result of a letter production for a calculation of the letter weight in the inventive postage meter machine.
Figure 4B:
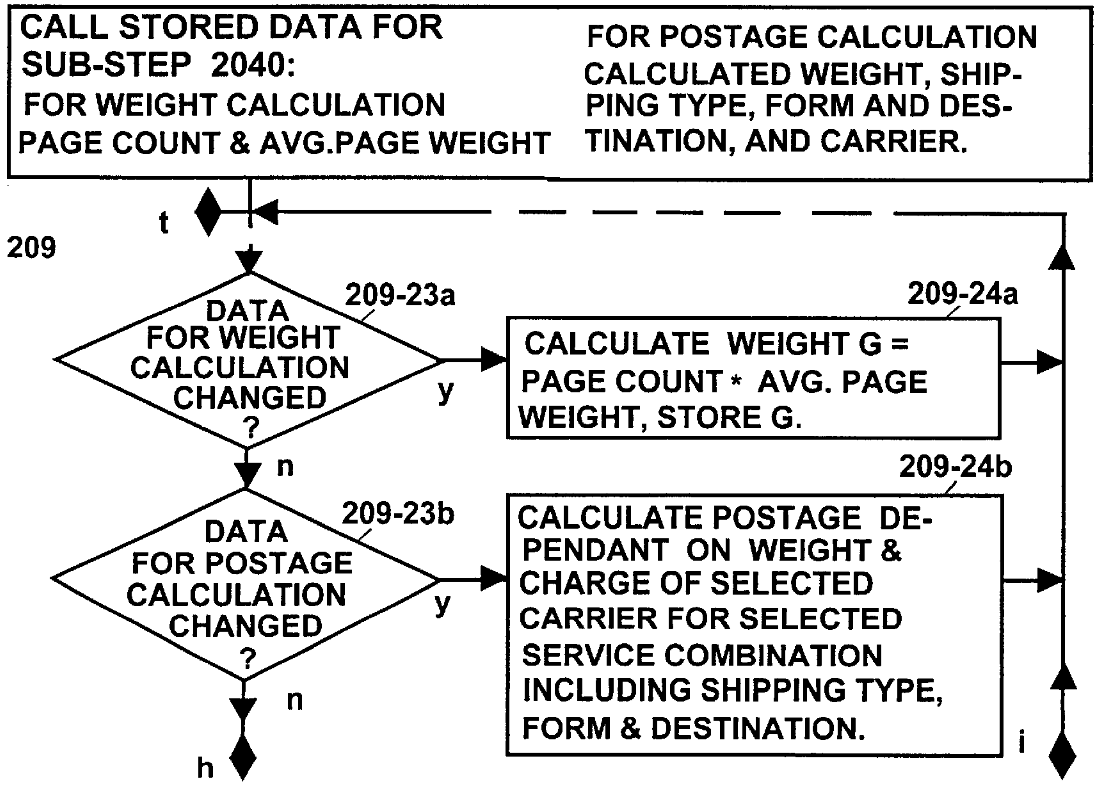
FIG. 4*b* is a flowchart with a processing routine for data stored in the postage meter machine for calculating the weight value and the postage value.
Figure 5A:
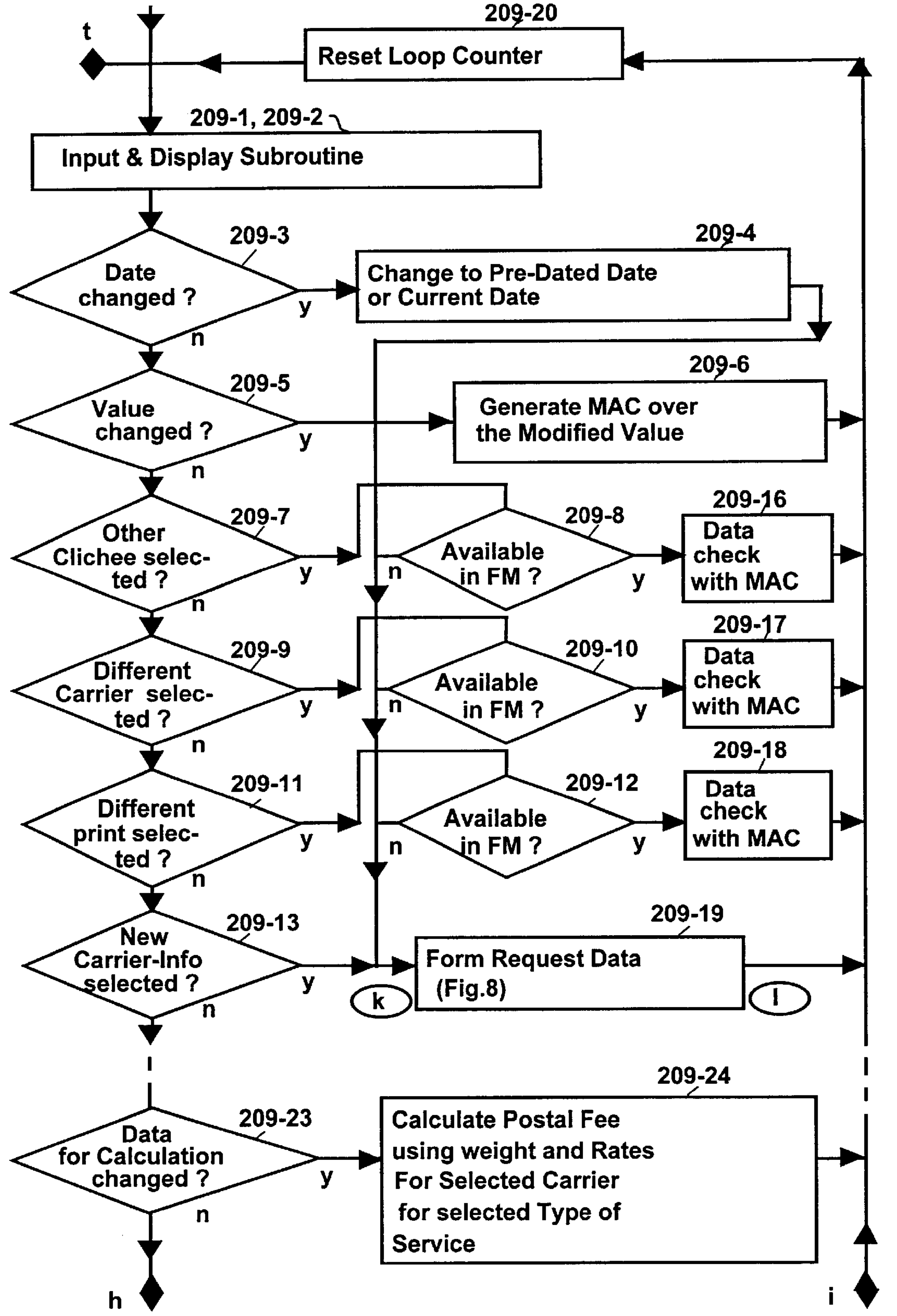
FIGS. 5*a*–5*c* together for a flowchart of evaluation of a data entry for the postage meter machine constructed and operating in accordance with the principles of the present invention in the framework of an input/display routine according to the first embodiment.

A personal computer communicates the page count via the data line 24 to the postage meter machine, which then calculates the weight value required for a postage calculation in a second step 209, as presented in greater detail in conjunction with FIGS. 4*b* and 5*a*.

The computer routine shown in FIG. 4*a* for determining the page count as the result of producing a letter precedes a calculation of the letter weight in the postage meter machine.

The data such as format, number of pages and, possibly, shipping type, that define the postage were already determined in the production of the letter. To that end, the text processing program with which the letter is produced in a standard way on a personal computer in a step 507, for example WORD under WINDOWS, is supplemented by a special page count counting program as component of step 507, that calculates the page count as letter-specific data.

In the inventively modified text processing program, further sub-steps for preparation and determination of the page count are added in the aforementioned step 507 after the production of the letter text or editing of the mail inserts (in sub-step 5070) and before the printing in step 508. A sub-step 5071 is implemented for formatting the text. The last page, or last edited insert, is then selected in the sub-step 5072 and the number of pages or inserts is displayed in the sub-step 5073. In the sub-step 5074, allowance is made for a manual input in order to undertake modifications and to continue the text production or insert processing. In a sub-step 5075, a check is made to determine whether the processing has ended, in order to branch to a sub-step 5076. Otherwise, a branch is made back in a sub-step 5070 to the start of the routine for producing the letter text or for processing the mail inserts. In the sub-step 5076, the number of pages on the basis of the displayable page number of the last page, or the number of inserts, is stored in that specific sub-area of the letter file (not to be printed out with the letter content) in which the selected carrier information is also stored.

When printing in step 508, the page count or insert count is then automatically inserted into the printed format of the letter such that it is visible in the clear window of the envelope after envelope stuffing has been carried out. The number of pages or inserts displayed in the third sub-step 5073 can be additionally supplemented by displaying the type of insert. The additional shipping information relating to the insert type is printed out, allocated to the number of inserts, in order to communicate this information to the postage meter machine FM for controlling the weight calculation.

A simplified embodiment (not shown in FIG. 4*a*) executes without a counting program for the page count. To that end, the particulars that determine the postage must be manually entered. The page count is visible after the formatting in the text and the author of the letter can manually enter this into the address field that should appear under the clear window. As an alternative, a further input mask can be automatically called in order to support the manual entry. The program triggers the print instruction only after this entry.

The printing of the aforementioned page count information in the address field of the letter can ensue either in clear text or in the form of a one-dimensional or two-dimensional code. The latter have the advantage of better machine readability. After the manual or automatic input of the page count, conversion into, preferably, a bar code ensues with a special sub-program 5081 of the personal computer in step 508 for printing out the letter.

The postage meter machine is equipped with an optical recognition means, or is connected to such a means, that acquires the page count information printed in the address field. The content is identified with an OCR method. In the case of bar codes, standard software with recognition rates of nearly 100% can be utilized. The recognized postage information are forwarded to the calculating unit of the postage meter machine FM. This inventively implements the weight determination without scale and, subsequently, the postage calculation in a known way, and undertakes a corresponding franking imprint at the upper right corner of the envelope.

The shipping fee for, for example, a letter is calculated by the postage meter machine on the basis of the standard (average) weight of a letter page that is stored in the postage meter machine. The letter weight is determined from the weight of a page and from the number of pages. Even though letter and a page weight or a page count are specifically discussed herein, the inventive concept can clearly apply as well to packages and standard (average) package insert weights and package insert counts. Mailings may also have CD-ROM or chip card inserts. Such inserts likewise have a typical insert weight. When shipping a number of such inserts, their number is required for determining the insert weight. Given mixed inserts such as paper and plastic, the type of insert and the number thereof must be unambiguously definable.

Given correspondingly connected auxiliary units, processing of chip cards, CD-ROMs and other card-shaped or disk-shaped information carriers for shipping thereof is also possible with a personal computer. Such information carriers of plastic and/or information carriers made of paper as well as package inserts generically constitute inserts whose number is automatically determined and communicated to the postage meter machine according to the two embodiments of the invention. In a version of each embodiment, the type of insert is automatically identified in addition to the number thereof and type information also is communicated to the postage meter machine. As an advantage compared to European Patent 498 955, the embodiment of the invention afford the possibility of supplying the mailings with a number of different inserts to the postage meter machine in unordered fashion, without again having to utilize a scale for identifying the weight.

The inserts taken into consideration in the postage meter machine when calculating the weight are preferably identical pages of a letter or document or are disks or cards of an electronic information carrier. Given a combination of different inserts, the type of insert is additionally communicated in addition to the number of inserts and is identified in the postage meter machine. The weight is calculated from the sum of all stack weights of insert types and the weight of the shipping container (envelope). Each stack weight derives from the insert count multiplied by the average insert weight, ensuing separately for each insert type.

Under normal conditions, the same paper grade is consistently employed by a given department (cost center) for printing the letter, so that the page weight only has to be identified and emitted once. The page weight can be easily identified by dividing the overall weight of a complete paper stack by the number of sheets. Both particulars can generally be taken from the packaging for the paper sheets. Otherwise, the page weight can also be learned by asking the paper manufacturer. A new entry of the page weight into the postage meter machine is possibly required only in those instances in which the paper grade is changed. In the sub-step 209-1 of the step 209, a selected input can ensue with respect to a change of the automatically entered cost center and/or shipping information, including the average insert weights.

The weight of a window envelope is likewise taken into consideration like an insert weight. The weight of a window envelope is practically independent of type and need only be entered once into the postage meter machine. Type and unit statistical scatters can be left out of consideration.

FIG. 4*b* shows a flow chart directed to the sequence in the postage meter machine with a processing routine for stored data for respectively calculating the weight value and the postage value. The stored data for the calculation include the page count (or number of and type of inserts), the average page weight (or insert weight) and further shipping information such as shipping type (letter count, package count, printed matter, etc.), shipping form (registered, express, air mail, etc.), such as shipping destination (domestic, Europe, foreign), and the selected carrier. The stored data for the calculation are called in the sub-step 2040 of the step 201 before the step 209 is reached, and a check is made in a sub-step 209-23 to determine whether relevant data for calculating the postage have changed before the weight calculation ensues in a sub-step 209-24*a* and, subsequently, the postage calculation ensues in a sub-step 209-24*b*.

The aforementioned sub-step 209-23 for checking includes a number of sub-interrogations with respect to a modification of each of the aforementioned, stored data for the calculation. The previous data for the calculation and the data subsequently stored are compared to one another. If the comparison shows that a modification of even a single parameter relevant for the calculation has occurred, a branch is made to the sub-step 209-24*a* and/or to the sub-step 209-24*b* for calculation. In the version shown in FIG. 5*a*, both calculating sub-steps 209-24*a* and 209-24*b* are sequentially run every time.

In a preferred version shown in FIG. 4*b*, groups with respect to the sub-interrogations are formed for shortening the calculation. A first group (sub-step 209-23*a*) includes only inquiries with respect to a change of each of the aforementioned, stored data categories for the calculation of the weight. A second group (sub-step 209-23*b*) includes only inquiries with respect to a change of each of the aforementioned, stored data categories for the calculation of the postage weight on the basis of a specific weight. If the parameters for calculating the weight remain unmodified, the sub-step 209-24*a* for calculating the weight is not executed; instead, the sub-step 209-24*b* for calculating the postage value is executed. The weight value is used which was determined in the most recent franking and that is currently stored non-volatilely as a part of the stored data in the sub-step 2040 of the step 201.

The second embodiment of the invention differs from the first embodiment in that the page count and, possibly, the insert type as well as the shipping type are no longer printed in the address field of the letter. These information sets are stored in the personal computer allocated to the letter file or, respectively, the address thereof, supplemented according to time of production (or time of storage) data.

In the step 209 the address field of the letter is scanned in a station of the mail center. The address is identified as clear text or as code. The address identified in this way is transmitted from the postage meter machine to the personal computer currently connected thereto. The personal computer program identifies the stored, postage-relevant information under the indicated address and transmits this information to the postage meter machine. On the basis of the transmitted information and on the basis of the postage tables stored in the postage meter machine, the postage meter machine determines the postage applicable to the just-scanned letter in step 209.

The inventive arrangement for data entry into a postage meter machine includes input and output units that are connected to a processor system and the postage meter machine has an input/output unit 4, a register unit 19 for automatic entry of data and for controlling connected periphery devices, as well as a modem 23 for communication to a remote data central DC and a communication link, such as line 24, to a personal computer (PC) in the office 21.

A processor system in the postage meter machine contains a control unit 6 with microprocessor that is programmed with a routine for interpreting the scanned data and that is programmed with a routine in order to find the data of a datafile of the personal computer (PC) in the office 21 from the number of interrogated datafiles respectively allocated to letter contents. As a result, the page count, the carrier identification number (CIN) and further shipping information as well as the cost center number are automatically entered into the postage meter machine and processed.

The microprocessor is also programmed with a routine for weight and postage calculation on the basis of the scanned data.

At least one scanner 26 is connected to the register unit 19. At least one further scanner 26.1 can be arranged in the mail delivery stream so that different formats can be scanned.

Programs corresponding to the postal regulations for the position of the address and of the other information exist in memories of the respective personal computers $PC_a$, $PC_b$ or $PC_c$. These regulations are used to control printing of the address and other information on the envelope (or on a letter page or insert if a window envelope is used).

The scanners 26 and 26.1 together with a letter sensor 16 are connected to the register unit 19 that intermediately stores data and implements a parallel-to-serial conversion, the register unit 19 being electronically connected via the data line 18 to the input/output control unit 4 of the postage meter machine FM, for serial data transmission.

The location of the optical recognition means is not necessarily physically bound to the postage meter machine. For example, an integration by the postage meter machine of such a means remotely located in an automatic feeder or in an automatic separator is possible. The latter separates the pieces of mail for automatic feed.

Of course, other peripheral input/output means can be connected to a shared, serial interface via the register unit 19 and the data line 18.

The scanners 26 and 26.1 each have an electronic circuit for image evaluation. A mark reader with subsequent image evaluation can be realized as disclosed, for example, in German OS 43 44 471.

Alternatively, the electronic circuit in each scanner 26 and 26.1 may only support an image evaluation which ensues in the postage meter machine FM. On the basis of the identified addresses, the carrier and/or the cost center is successfully identified in the postage meter machine.

As a result, carrier information required for the carrier-specific fee calculation, and carrier information required for a carrier-specific input of logo print data are automatically entered into the postage meter machine. The processor system of the postage meter machine contains a control unit 6 that is programed with a routine stored in a memory area 81 of the clock/date module 8 in order, as needed, to correspondingly load the data of the automatically set, new mail carrier in automatic routines.

Additionally, the control unit 6 is programmed with a further routine in order, after turn-on, to initialize the postage meter machine in a location-specific manner and, as needed, to load further data into the postage meter machine. Also included in this initialization are critical franking image data prescribed or required by the carrier, analogous to the sovereignty characters of the national, governmental mail carriers, as was already described in detail in German application 195 49 305.2.

This type of reloading is particularly provided for digital printing processes that allow a program-controlled embedding of variable or semi-variable window pixel field data in constant frame pixel field data. Such a method for controlling the column-by-column printing of a postage imprint character image in a postage meter machine is disclosed, for example, in European Application 578 042.

As noted above, the arrangement for data entry into a postage meter machine has input and output means that are connected to a processor system. The input means (such as the keyboard 2) have first actuation means (such as a key) in order to set the postage meter machine to a different mail carrier. The input means can have second actuation means (such as a another key or a shift setting for the aforementioned key) for the specific setting of a new mail carrier. The processor system contains a control unit 6 that is programmed with a routine in order to load the data of the new mail carrier that has been set in automatic routines 1000 of the communication mode 300 and in order to generate a change in the print format, the generated change data being non-volatilely stored under a number and allocated to the respective mail carrier, or non-volatilely stored allocated to a carrier identification number (CIN) corresponding to the selected carrier.

The communicated sub-image datafiles, allocated to a carrier identification number (CIN) corresponding to the selected carrier, are non-volatilely stored in the postage meter machine in order, given selection of a predetermined carrier number or CIN, to generate specific print formats. The communicated sub-image datafiles, pixel image datafiles and the modify data generated by automatic or manual input are stored in non-volatile memory areas of the write/read memories 5*a* and 5*b* and/or in the clock date module 8.

As shown in FIG. 5*a*, the modification of the setting with respect to the slogan (cliche), the mail carrier, and the services or selected imprints of the carrier, is undertaken by entry of an allocated number, with the respective functions being called by the actuated elements of the keyboard 2 in a sub-step 209-1 and determined in interrogation sub-steps 209-7, 209-9, 209-11. The formation of the request data is connected to the aforementioned modification of the setting of the mail carrier and/or connected with those data of the clock/date module 8 called in the step 201 but modified due to the passing of time. The modification can be identified by the control unit 6 in the sub-step 209-3. In the communication mode, the request data lead to the reloading of sub-image data or files pixel image datafiles that are either embedded as window pixel data into the frame data or modify the frame data of the franking format itself in a carrier-specific fashion.

It is also provided that the communicated sub-image datafiles, allocated to a carrier identification number (CIN) corresponding to the respectively selected mail carrier, are non-volatilely stored in the postage meter machine in order, given selection of a predetermined mail carrier number or CIN, to generate specific print formats. Moreover, the communicated sub-image datafiles, pixel image datafiles and the modified data generated by automatic or manual input are stored in non-volatile memory areas of write/read memories 5*a* and 6*b* and/or the module 8.

In FIG. 5*a*, an interrogation is made in sub-step 209-9 as to whether a carrier change has occurred, after a scanning of the piece of mail has ensued in the input routine (step 201 in FIGS. 3*a* and 3*b*). The carrier type is then communicated from the office 21 as a result of a request from the postage meter machine (also in the step 201 in FIG. 3*b*). Thus, modified information for accounting purposes is automatically entered into the postage meter machine.

A corresponding automatic input in the first step 201 (FIGS. 3*a* and 3*b*) or manual input in the sub-step 209-1 being assumed, a branch is made to sub-step 209-10 when the sub-step for checking for carrier input (209-9) is reached in order to check the availability of the data in the postage meter machine. The absence of a concordance with respect to the data sets stored in the personal computers $PC_a$, $PC_b$, . . . $PC_m$ in the office 21 relative to the individual carriers can be determined with this check in sub-step 200-10. The data of the missing carrier or of a new carrier, can be stored in the postage meter machine after they are communicated.

Correspondingly, a branch is made from the sub-step 209-7 for checking for slogan input, or from the sub-step 209-11 for checking for selected imprint input respectively to sub-step 209-8 or sub-step 209-10 for checking the availability of the data in the postage meter machine. Within the framework of an automatic entry in the first step 201 (FIGS. 3*a*, 3*b*) of a cost center number, an advertising slogan allocated to the cost center can likewise be automatically selected. It is still possible to modify the selected imprint when change data are transmitted to the postage meter machine via the data line 24, for example, according to the second embodiment disclosed herein.

Given available data, a branch is made from the sub-steps 209-8, 209-10 and 209-12 for slogan, carrier or selected imprint input checking respectively to the allocated security checking steps 209-16, 209-17, 209-18, whereby an automatic print data input is undertaken given validity. A data check on the basis of an encoded check sum (MAC) prevents a manipulation with fraudulent intent, as was disclosed in detail in German application Serial No. 195 34 530.4, corresponding to co-pending U.S. application Ser. No. 08/525,923, filed Sep. 8, 1995, now U.S. Pat. No. 5,805,711 entitled "Method for Improving the Security of Postage Meter Machines."

If, however, the necessary data are not available in the postage meter machine, a branch is made at a point k to the nineteenth sub-step 209-19 in order to form request data. If actuation means for a new input of a carrier were actuated during the input routine (sub-step 209-1), this is identified in an interrogation step (sub-step 209-13) and a branch is likewise made to point k of the sub-step 209-19 in order to form the request data. The aforementioned sub-step 209-19 shall be explained in greater detail below in conjunction with FIG. 8.

A number of interrogation steps that are not shown can lie between the interrogation step 209-13 and a point h in order to further interpret inputs such as, for example, those relating to service performances, shipping types, shipping forms or mail classes. If it is then found in a interrogation step 209-23 that the data required for a postage calculation are presently modified, a branch ensues to a sub-step 209-24 for calculating the postage value according to the fee schedule of the selected carrier for the selected service performances and other relevant inputs. Subsequently, a branch is made back via the sub-step 209-20 to the point t. The postage value modified on the basis of the postage calculation is again determined in the sub-step 209-5 and a branch is then made to the sub-step 209-6 for the purpose of generating an encoded check sum (MAC) over the modified postage value. This postage value secured in this way is now storable manipulation-proof together with the MAC and can be employed for accounting within the framework of the franking mode 400 that sequences chronologically later (FIG. 7*b*).

User-specific or department-specific accounting requires cost center information in order to properly assign these accounting data. The cost center information scanned from the piece of mail or communicated from the personal computer in the aforementioned way can be utilized for a cost-center-dependent, automatic allocation of the accounting data, as well as for a cost-center-dependent, automatic setting of an advertising slogan in the franking format, shown in FIG. 5*b*. The user-relevant settings of the cost center and the advertising slogan via the keyboard 2 of the postage meter machine that are otherwise respectively required are thus advantageously eliminated. A prerequisite for this is the capability for non-volatile storage of a number of advertising slogans in the postage meter machine. A fixed number of advertising slogans, for example, can have been already non-volatilely stored by the factory of the manufacturer in an internal user memory 10 (EEPROM). This is a non-volatile memory for storing a number of advertising slogans, with each advertising slogan being respectively allocated to a cost center of the department. Alternatively, a number of advertising slogans can be subsequently loaded. The value card (chip card) write/read unit 20 enables a more frequent slogan change, by card, for a number of inputs. A further possibility is, for example, a password-protected function for deleting predecessor data for parts of the print format, or the allocation thereof to the cost center. The postage meter machine is therefore equipped with a corresponding program as well as with input and display means. A corresponding executive sequence for loading data or for updating is stored in further circuit or an area in the program memory 11 and in the non-volatile memory areas of the clock/date module 8 and/or in the memories 5*a* and 5*b* in order to load successor data into these memory areas previously occupied by deleted predecessor data, as well as in order to redefine their allocation to the cost center, as shall be described in greater detail below in conjunction with FIG. 5*b*.

Figure 5B:
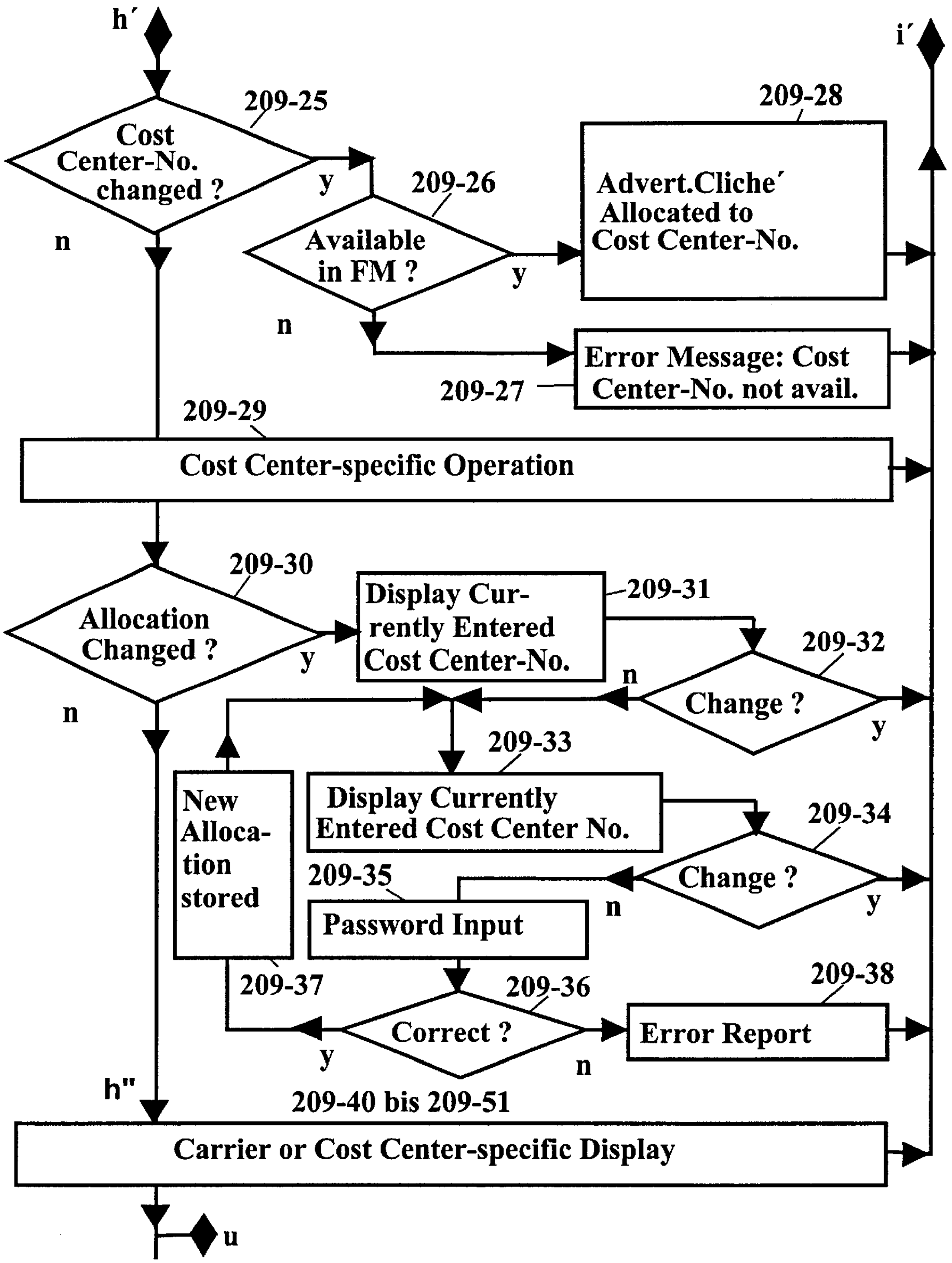

In FIG. 5*b*, an interrogation criterion about a change of cost center number is inventively satisfied in the sub-step 209-25 when a corresponding scanning of the mail within the framework of the input routine has ensued in order to directly enter cost center information (step 201 in FIG. 3*a*), or to indirectly (step 201 in FIG. 3*b*) enter cost center information via a PC, for calculating purposes automatically into the postage meter machine. As a result of the interrogation in the sub-step 209-25, a sub-step 209-26 is reached when the cost center was modified. The availability of the cost center number is checked here. It is possible that a cost center number was deleted. Then a corresponding error message ensues in a sub-step 209-27 and a branch is subsequently made back via the sub-step 209-20 to the point t. Otherwise, a branch is made from the 26th sub-step 209-26 to a sub-step 209-28 when the availability of the cost center number is established. An advertising slogan allocated to the cost center number is automatically set in the sub-step 209-28. Cost-center-specific operation 209-29 then is conducted.

An interrogation about a requested change of the allocation between cliche' and cost center number ensues in a sub-step 209-30. If such a change has occurred, a branch is made to a sub-step 209-31 for displaying the currently input cost center number and, after the confirmation thereof, a branch is made to an interrogation step 209-32. If no confirmation previously ensued, then a branch is automatically made back via the sub-step 209-20 to the point t after a time lapse. There is then the possibility in the sub-step 209-7 of selecting a different imprint with the input of an imprint number before the aforementioned interrogation steps are run again up to the interrogation in the sub-step 209-30. Given confirmation with, for example, a specific acknowledgment key of the cost center number, a branch is made from the interrogation step 209-32 to the sub-step 209-33. The previously allocated cliche' number is displayed in the sub-step 209-33, which identifies the semi-variable window data for an advertising slogan to be embedded into carrier-dependent frame data. After confirmation, a sub-step 209-35 is reached if, in an interrogation step 209-34, it was not found that a change was not acknowledged, this in turn then again automatically leading to the branch back to the point t via the sub-step 209-20 after a time lapse. This makes it possible to again select another imprint in the sub-step 209-7 (FIG. 5*a*). After executing the sub-steps 209-8 and 209-16, 209-20 209-1 through 209-23 that leads to the point h or h' in FIG. 5*b*, and after the sub-step 209-25 with the interrogation criterion about a change in cost center number—which of course, is not met—the sub-step 209-30 is again reached for asking about a desired change of the allocation between imprint and cost center number. After executing the sub-steps 209-31, 209-32, 209-33 and 209-34, a sub-step 209-35 comprising a password input routine is reached when the imprint setting in the $33^{rd}$ sub-step 209-33 was confirmed after the display of the imprint number.

If an incorrect password was entered in the aforementioned sub-step 209-35, this is determined in the interrogation step 209-36 and, after an error message, a branch is made back to the point t in an interrogation step 209-38. If, however, it is found in the interrogation step 209-36 that the password input was correct, then a sub-step 209-37 is reached in order to then store the new allocation and to then branch to the imprint number display in the sub-step 209-33 or to the imprint number display in a separate sub-step (not shown) in order to then branch back via the sub-step 209-20 for resetting the loop counter to the point t. The new allocation to the cost center number has thus been entered into the postage meter machine and now continues to be available.

A number of other interrogation steps that must be executed before the point u is reached are arranged between the interrogation sub-steps 209-25 and 209-30 shown in FIG. 5*b*; for reasons of space, however, these have been shown as only sub-step 209-29 in FIG. 5*b*. A program and memory regions for executing cost center-related operations is provided in an area of the special cost center memory 9. Thus, in addition to a basic cost center with the number zero allocated to the respective carrier, additional cost centers can also be setup or deleted under numbers other than zero. Values and piece numbers of individual cost centers other than that with the number zero can be edited or deleted without the security against manipulation being thereby affected. The carrier-related basic cost center with the number zero contains a sum of values of cost centers.

Figure 5C:
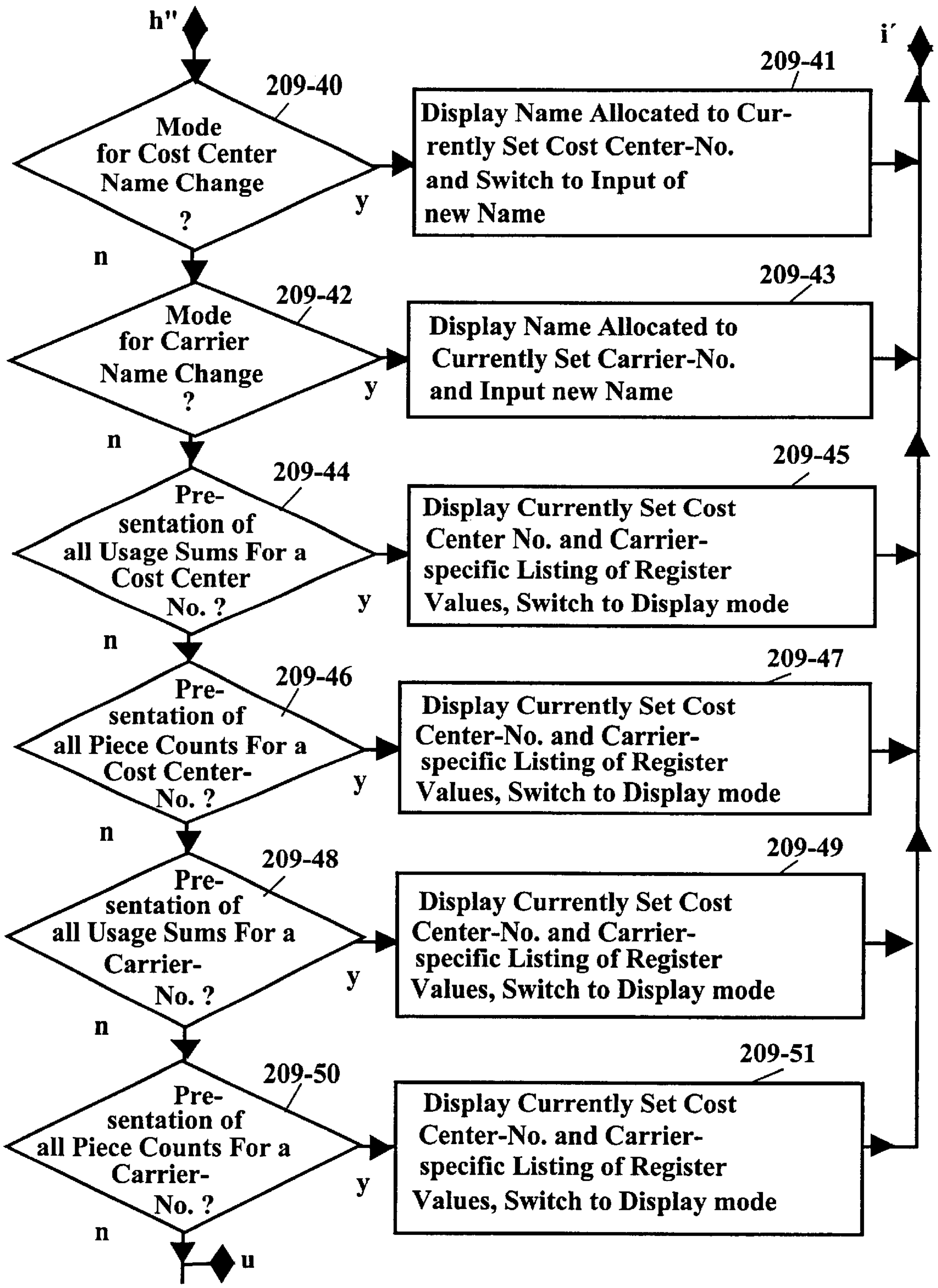

A number of further interrogation steps that must be executed but that were shown as sub-steps 209-40 through 209-51 in FIG. 5*c* for space reasons is arranged between the point h" of the interrogation step 209-30 shown in FIG. 5*b* and point u.

For simpler input, an allocation of numbers to the names of cost centers, or carriers ensues, as shown in FIG. 7*c*. Inventively, the name of the cost center which is standard among the departments of the office 21 can be modified if this should become necessary. When a corresponding input ensues, then this is recognized in the interrogation sub-step 209-40 and, after display of the allocated, currently set number, a switch is made to the input routine of the new name (sub-step 209-41). The carrier names which are standard among the carriers can also be modified if this should become necessary. When a corresponding input ensues, then this is recognized in the interrogation step 209-42 and, after display of the allocated, currently set number, a switch is made to the input routine of the new name (sub-step 209-43). The advantage is particularly useful given a large number of cost center names and/or carrier names.

Inputs in conjunction with operations related to cost centers can be interrogated in the aforementioned sub-step 209-29 in a way that is not shown in FIG. 5*b*. When a selective entry of cost center-related shipping information, including the average insert weights, ensues in the sub-step 209-1, a routine for interrogating and storing the change of the average insert weights according to the selective entry which has been undertaken is provided in sub-step 209-29.

An entry with respect to the cost center-related register operations can also be interrogated. After a register selection, a display of the stored values, or piece counts, ensues in the display mode 215 (FIGS. 3*a* and 3*b*).

Further, the display of all used sums for an individual cost center can be useful in order to allow an overview given a plurality of private carriers. A production of the listing ensues for preparation of the display in the display mode 215. The listing ensues on the basis of a corresponding input. The storage thereof in the pixel memory 7*c* ensues for an internal printout of the postage meter machine. The printout likewise ensues on the basis of a corresponding, other input that, however, need not be explained in detail here.

A presentation or display of all carrier-related used sums for the cost center number that has been set is preceded by a corresponding input. When a corresponding input ensues, then this is recognized in the interrogation sub-step 209-44, and, after display of the allocated, currently set cost center number, a switch is then made to the listing routine for the selected register (sub-step 209-45).

A presentation or display of all carrier-related piece numbers for the cost center number that has been set is again preceded by a different, corresponding input. When a corresponding input ensues, then this is recognized in the interrogation sub-step 209-46, and after display of the allocated, currently set cost center number, a switch is then made to the listing routine for the selected register (sub-step 209-47).

A presentation or display of all carrier-related used sums is likewise enabled for all available cost center numbers when an interrogation sub-step 209-48 and a sub-step 209-49 are executed or, a presentation or display of all carrier-related piece numbers is enabled when an interrogation step 209-50 and a sub-step 209-51 are executed.

When an interrogation criterion is satisfied, a branch is made back via the aforementioned sub-step 209-20 to the point t at the input of the second step 209. In the sub-step 209-2, a display with an input possibility in the first sub-step 209-1 subsequently ensues, whereby a user specific input set can be advantageously utilized in order to enable a number of different inputs. A suitable user specific input set is disclosed in the aforementioned European application 94 120 314.3.

Figure 6A:
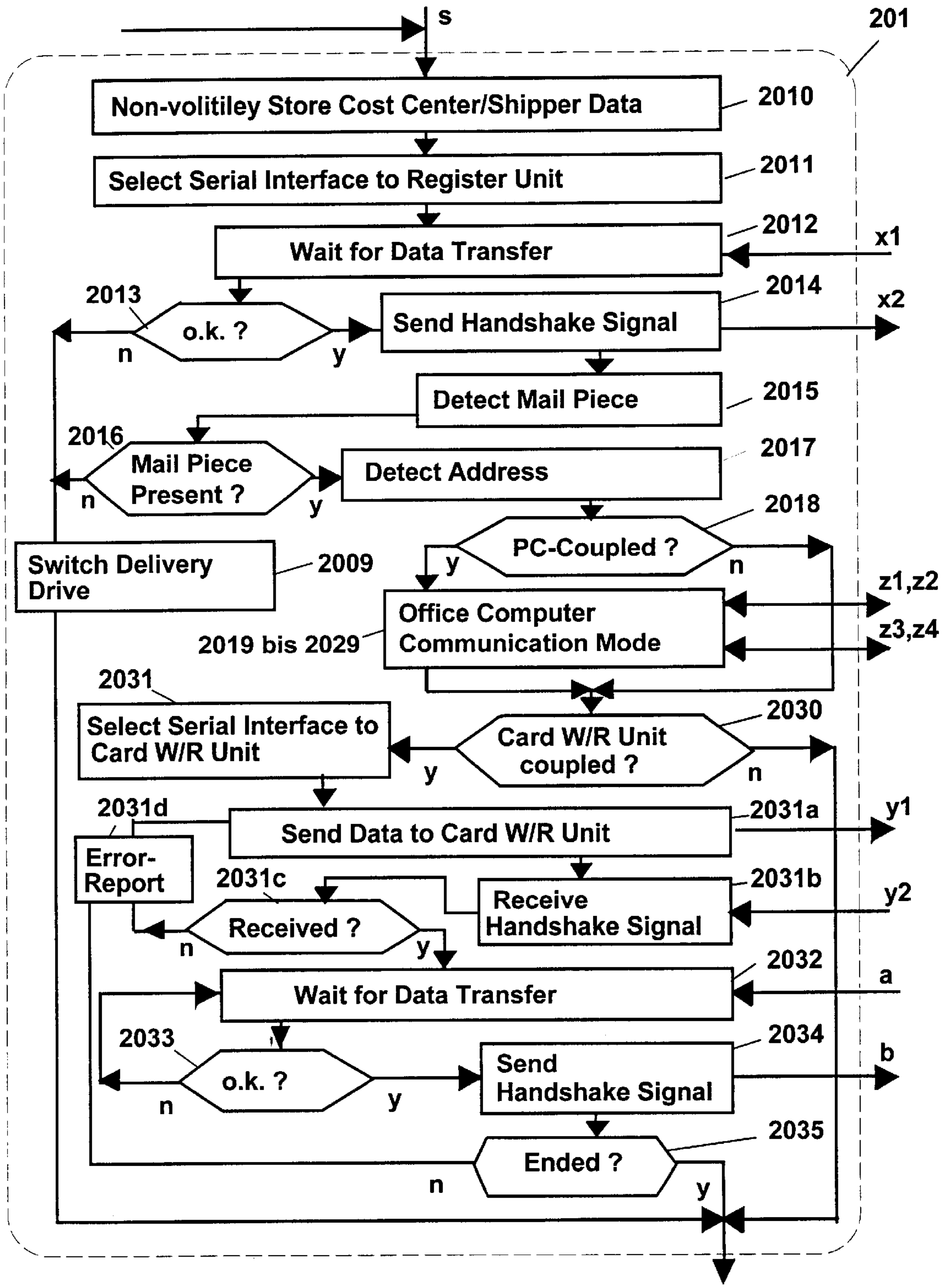
FIGS. 6*a* and 6*b* together from a flowchart for an automatic data entry in accordance with the invention on the basis of the scanned letter recipient address.
Figure 6B:
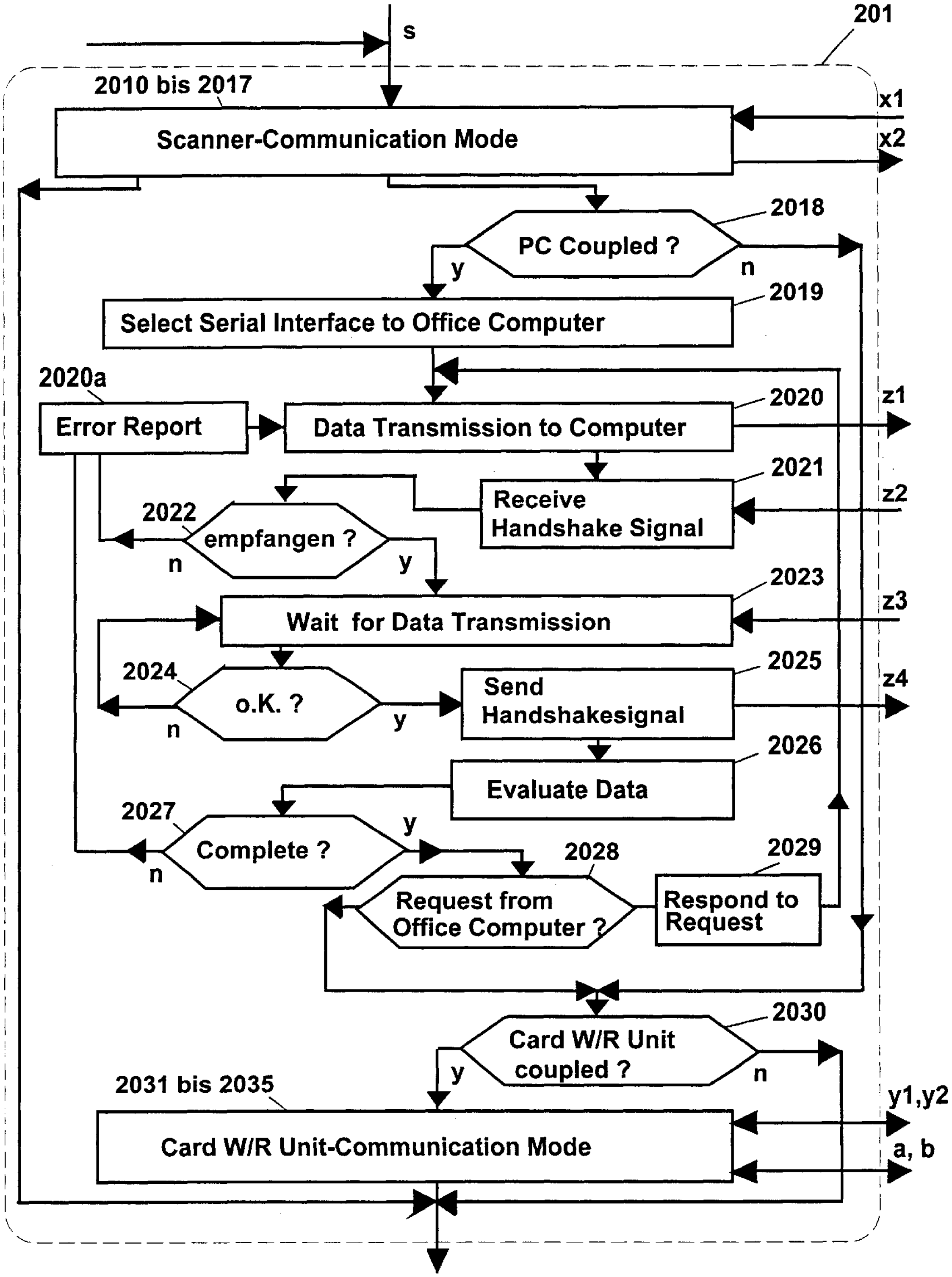

FIGS. 6*a* and 6*b* show a flowchart for an automatic data entry on the basis of the scanned letter recipient address. The first step 201 of the postage meter machine system routine 200 can be subdivided into a number of a communication modes. A chip card communication mode (sub-steps 2019 through 2027) that is not shown in detail in FIGS. 6*a* and 6*b* can also be included, whereby the chip card, for example, is employed as a key card. According to the version of the mail shipping system shown in FIGS. 2*a* and 3*b*, a communication connection exists (or can be set up) to each personal computer in the office 21. Sub-steps 2010 through 2016 for a scanner communication mode, sub-steps 2019 through 2029 for an office computer communication mode, and sub-steps 2031 through 2035 for a scale communication mode are executed in the first step 201.

First, a routine ensues in the sub-step 2010 that non-volatilely stores the cost center and/or shipping data, including carrier data, as prior data so that these data are available as comparison data when a decision is to be made whether a modification of individual data has ensued on the basis of an automatic data input. A deletion of the old, aforementioned data in the main memory of the postage meter machine takes place in connection therewith. In the following sub-step 2011, a serial interface is selected in order to then receive data x1 from one of the scanners (postal matter sensor 16) in the following sub-step 2012 before a branch is made to an interrogation sub-step 2013. In the interrogation step 2013, a branch is made to a sub-step 2014 when a data transmission has ensued in order to send a handshake signal to the aforementioned register unit 19 to which the aforementioned sensor together with other sensors is connected. From the interrogation step 2013, a branch is made via the sub-step 2009 to the sub-step 2040 when no sensor data were received. After sending the handshake signal to the aforementioned sensor, a detection of a piece of mail ensues in sub-step 2015. When the sensor 16 functions according to a mechanical working principle, the appertaining bit merely has to be stored in the simplest case. If the sensor 16 works according to an optical principle, this can ensue on the basis of a relatively simple image evaluation. When a recognition of a piece mail which is present in the delivery path has ensued, a branch is potentially made from the interrogation step 2016 to a sub-step 2017 for evaluating the other scanned data. It can be required, given a marking in the form of a bar code, to move the piece of mail further forward before an evaluation succeeds. Particularly given a version with a complete or partial image evaluation (bar code) in the postage meter machine, the completeness of the scanned data must be assured before an evaluation. If the data required for the detection, i.e., for finding and evaluating, are incomplete—this being determined in interrogation sub-step 2008-, a branch is made back to sub-step 2012 as a reaction thereto in order to wait for a further data transmission from the sensors via register unit 19 and data line 18. Otherwise, a branch is made directly to the next interrogation sub-step 2018. In a preferred version, the evaluation in the sub-step 2017 includes the detection of the mail (letter) recipient address.

If a recognition has not ensued, i.e., given the lack of a piece of mail in the delivery path, a branch is made from the interrogation sub-step 2016 to the sub-step 2040 for the purpose of calling stored, current data. Neither a chip card communication mode nor a scale communication mode is then executed. Further, a sub-step 2009 is executed in order to switch the delivery drive (not shown) off, i.e., to control motors in the delivery means (not shown) such that these motors are shut off as warranted when a piece of mail to be transported is not found in the delivery path given another run of the system routine 200. Only the input/display routine with print data input is then active and this enables a manual input or presetting of the postage meter machine. At the beginning of the first step 201 of the system routine 200, a number of sub-steps 2001 through 2007 (not shown separately) is again provided so that the operation of the peripheral devices in the mail center and parts of the appertaining conveyor means in the base can sequence controlled by the postage meter machine.

As noted above, an office computer communication mode (sub-steps 2019 through 2027) is also executed. A corresponding interrogation sub-step 2018 proceeds this office computer communication mode.

In all of the aforementioned versions, sub-steps 2031 through 2035 are executed for a scale communication mode when a scale coupling is found in the leading interrogation step 2030.

A serial interface is selected in sub-step 2031 in order to then undertake a data transmission y1 from the postage meter machine FM to the scale 22' in the following sub-step 2031 a. This data transmission y1 includes the transmission of the carrier identification number CIN. When a data transmission has ensued, a handshake signal y2 sent from the scale 22 is received in the following sub-step 2031 b and a branch is then made to the sub-step 2031 c in order to produce an error message in the following sub-step 2031*d* and to branch back to the sub-step 2031*a* if no handshake signal was received from the scale 22'. Otherwise, a wait takes place in the following sub-step 2032 for a data transmission a from the value card write/read unit 20 before a branch is made to an interrogation step 2033. This data transmission a contains at least the balance (available credit) in the value card.

When a data transmission has ensued, a branch is made in the interrogation step 2033 to a sub-step 2034 in order to send a handshake signal to the aforementioned value card write/read unit 20. Without the handshake signal, the unit 20 automatically repeats the data transmission. A branch is made back from the interrogation step 2033 to the sub-step 2032 to wait for the renewed data transmission. An evaluation of the scale data ensues in the sub-step 2035 after the transmission of the handshake signal to the aforementioned unit 20.

In the first step 201, the mail-shipping system, which contains a postage meter machine FM having a communication connection to at least one personal computer $PC_a$, $PC_b$, . . . , $PC_m$, $PC_n$ in the office 21, implements the automatic data input relating to the cost center and/or carrier information on-line via the aforementioned communication connection when corresponding request data were previously formed on the basis of the scanned letter recipient address. The flowchart shown in FIG. 6*b* for an automatic data input in step 201 illustrates the office computer communication mode. The sub-step 2018 leads to a sub-step 2019 in order to select a serial interface to the personal computer in the office. A data transmission to the computer in the office 21 subsequently ensues in the sub-step 2020. A wait for a handshake signal from the computer in the office 21 takes place in the sub-step 2021 and a branch is then made to the interrogation step 2022. If a handshake signal was not received from the computer in the office 21, a branch is made to the interrogation step 2030. Such a case can occur when an office computer is turned off. If a handshake signal is received, a branch is made to the sub-step 2023 in order to wait for a data transmission from the computer in the office 21. If and when this has ensued (sub-step 2024), a handshake signal is sent to the computer in the office 21 (sub-step 2025). Otherwise, a branch is made back to the sub-step 2023. An evaluation of the data ensues in the sub-step 2026 when the handshake signal was sent to the computer in the office 21 (sub-step 2025). If the data transmission was not terminated or was possibly, incomplete, then a branch is made back via the sub-step 202*a* for the error message to the sub-step 2020 for the data transmission of request data to the computer in the office 21. An interrogation as to whether the data transmission has been completed ensues in the sub-step 2027.

The sub-steps 2019 through 2027 for an office computer communication mode can also be expanded by further sub-steps 2028 and 2029 that implement the answering of an electronic message for a listing for a department-related accounting. A check is made in the sub-step 2028 to determine whether, in the evaluation of the data in the sub-step 2026, a corresponding request in the form of an electronic message was emitted by the personal computer in the office 21, before the request is processed in the sub-step 2029. A branch is then made back to the sub-step 2020 in order to implement a renewed communication until the message has been appropriately processed.

Figure 7A:
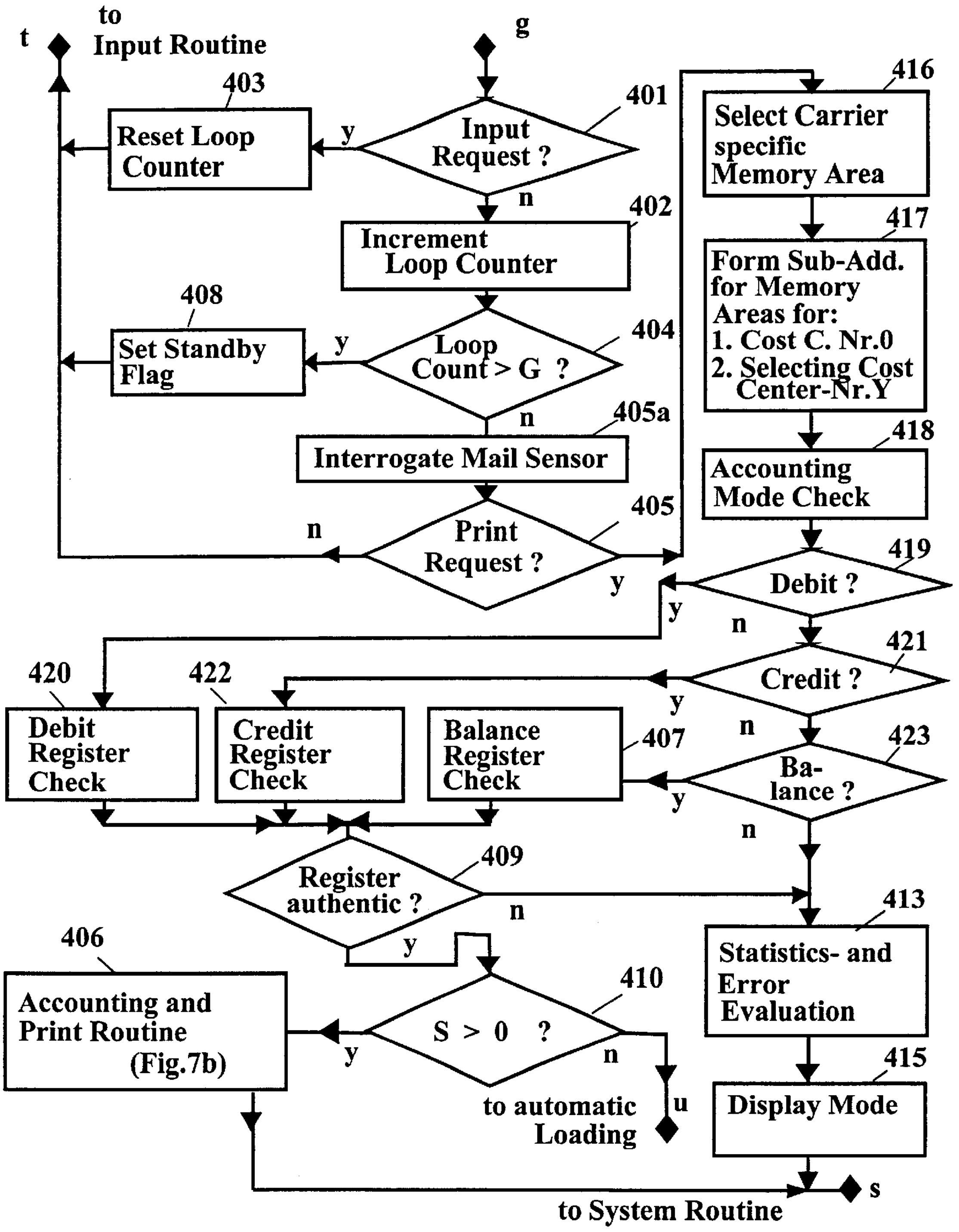
FIG. 7*a* is a flowchart for the franking mode with a carrier and cost center-related processing of accounting data in a postage meter machine constructed and operating in accordance with the principles of the present invention.
Figure 7B:
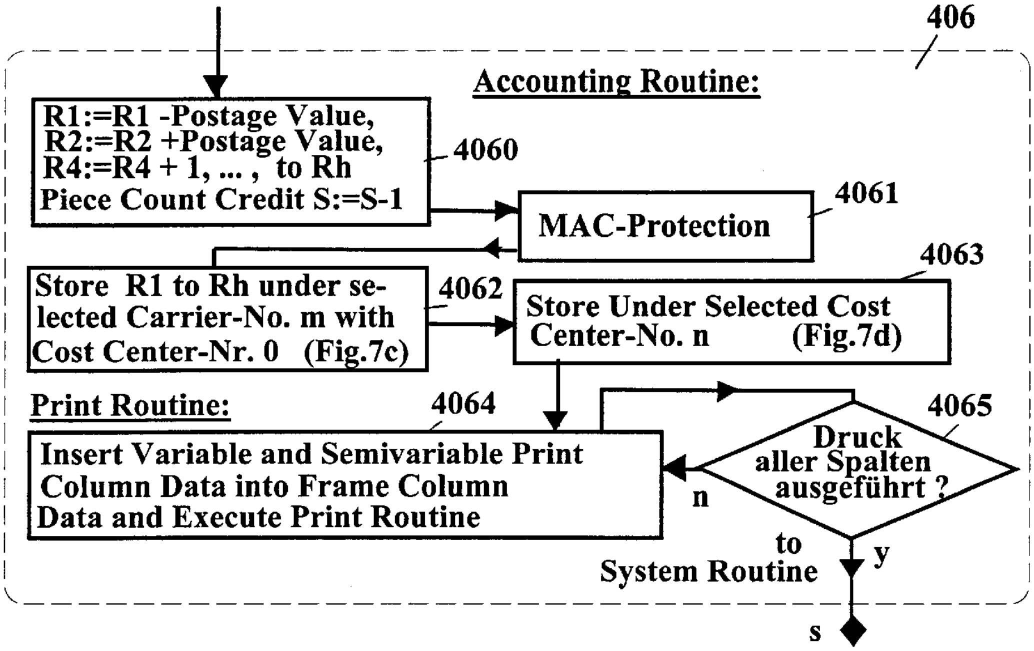
FIG. 7*b* is a flowchart for the accounting and printing routine in franking mode with carrier and cost center-related accounting in a postage meter machine constructed and operating in accordance with the principles of the present invention.

FIG. 7*a* shows a flowchart for the franking mode given carrier-related and cost center-related processing of accounting data. When no determination of a keyboard actuation or some other input request ensues in sub-step 401, a loop counter is incremented in sub-step 402 and an interrogation step 404 is reached. When a predetermined limit number G is reached by the loop counter, then a standby flag is set.

The standby mode is reached when no input or print request ensues over a predetermined time. The latter is the case when a known letter sensor (not shown in detail) does not detect a next envelope to be franked. The step 404 (shown in FIG. 7*a*) in the franking mode 400 therefore also includes a further interrogation for a time lapse that, when the time (based on a loop count) is exceeded, ultimately leads back to the point t, and thus to the input routine according to the step 209. When the interrogation criterion is satisfied, a standby flag is set as in step 408 and a branch is made back to the point t without running the accounting and printing routine in step 406. The standby flag is interrogated later in the step 211 (see, for example, FIG. 4*d*) and, after the check sum inspection in step 213, is reset if no manipulation attempt was recognized. The interrogation criterion in step 211 therefore is expanded by the question as to whether the standby flag is set, i.e., whether the standby mode has been reached. In this case, a branch is likewise made to step 213. The advantage of this procedure is that every attempt at manipulation is statistically acquired in step 213 before a branch is made back to the system routine at point s.

It is thus assured that the last input quantities are also preserved when the postage meter machine is shut off, so that, after it is again turned on, the postage value in the value stamp is automatically prescribed according to the last input before the postage meter machine was shut off and the date is automatically prescribed in the postmark according to the current date.

If a weight value has been calculated for a previous postage fee imprint, this previous weight value can be retrieved, for example, from a memory region of the EEPROM 5*b*. A check is then made in step 401 to determine whether an input is present. Given a renewed input request in step 401, a branch is made back to step 209.

Otherwise, a branch is made via the steps 402 and 404 for incrementing a loop counter and for checking the number of runs through steps 405*a* and 405 in order to interrogate the print output request that is recognized by a standard mail sensor 16.1 upon introduction of a sheet of paper into the printing region upon a printer request. This mail sensor 16.1, for example, is connected to the register unit 19, just like the sensor 16, but is mechanically arranged in the proximity of the printing area and is also interrogated later in the sequence of method steps than the sensor 16. The letter to be franked is detected with the mail sensor 16 and a print request is triggered after a time lapse. A branch can thus be made to the accounting and printing routine in step 406. When no print output request (step 405) is present, a branch is made back via the steps that lie at the start of the system routine, i.e., the between the point s and the point t, to the step 201 lying after the point t.

A communication request can be made or some other input according to the steps for data modification 209, test request 212, register check 214 as well as input request 401 at any time before the step 301 is reached. As shown in the version of FIG. 7*a*, steps 401 through 404 are again run. Given a predetermined number of runs, a branch is made from the step 404 to the step 408. The alternative interrogation criterion can be interrogated in the step 405 in order to set a standby flag in the step 408 if a print output request is not yet present after a predetermined time. As already explained above, the standby flag can be interrogated in the step 211 following the communication mode 300. A branch is thus not made to the franking mode 400 before the check sum review has yielded the completeness of all or of at least selected programs.

When a print output request is recognized in the step 405, further interrogations are actuated in the following steps 401 through 420 as well as in step 406. For example, the presence of authentic register values is interrogated in step 409, and reaching a further piece number S criterion is interrogated in step 410, and the registered data involved in a known way for accounting are interrogated in the step 406. As already explained with reference to FIG. 5*a*, moreover, a securing of selected registers in the NVRAM of the postage meter machine is implemented by MAC formation. When the number of items predetermined for franking was used in the preceding franking, i.e., the number of pieces S is equal to 0, a branch is automatically made from step 410 to the point u in order to enter into the communication mode 300 so that a new, predetermined piece number S can be credited from the data center. When, however, the predetermined number of pieces was not yet used, a branch is made from the step 410 to the accounting and printing routine in step 406. A special sleeping mode counter is initiated to count one counting step more in step 406, i.e., during the accounting routine ensuing immediately before printing. The number of printed letters and current values in the postal registers are likewise registered in nonvolatile memories 5*a* and 5*b* of the postage meter machine according to entered cost center in the accounting routine 406, and are available for a later interpretation.

The register values can be interrogated as needed in the display mode 215. It is likewise provided that the register values or other service data can be printed out with the printer head 1 of the postage meter machine for accounting or monitoring purposes. This, for example, can likewise ensue like the normal printing of the postage stamp, with, however, a different frame for fixed image data being selected at the start. The variable data according to the register values stored in the non-volatile memories 5*a* or 5*b* in the cost center memory 9 being inserted into this frame, similar to that already disclosed in German OS 42 24 955 for the formation and presentation in three multi-line information groups, or for a required switching into a corresponding mode. If a rotated presentation is requested, the data, contrary to the specific teaching in German OS 42 24 955, can already be directly deposited turned in the volatile memory, as required for the printing. The time-consuming routine of rotating the print data is only implemented once by the manufacturer for an additional picture element datafile when the slogan/advertisement memory 10 is programmed, this merely requiring more memory space but no enhanced calculating performance in the postage meter machine.

The carrier and cost center information are employed for accounting in the franking mode 400 shown in FIG. 7*a*. When a print output request is recognized in step 405, the carrier-specific memory area is selected (step 416), and step 417 is then reached in order to form sub-addresses for the memory areas of, first, a cost center number 0 and, second, the selected cost center number that was set different from 0 (such as cost center No. Y) for the department-related accounting. An accounting without being split into individual cost centers or departments ensues under the cost center number 0 for the sum of all cost centers for the respectively selected, individual carrier m (with m=1 through l).

The step 417 for forming sub-addresses is required for selecting the memory areas during the accounting. An MAC protection is placed over all postal registers to be updated in each accounting, this being required in order to decide in the interrogation step 409 run later whether the register values are authentic. Since such a check is extremely time-consuming, particularly when the DES algorithm is employed for encoding the check sum, the only purpose for which this check is always implemented is for the accounting of the postal registers to be updated. This check therefore ensues in the aforementioned interrogation step 409 parallel to proceeding steps, the step 420 for a debit register check, the step 422 for a credit register check or the step 407 for a balance register check. Such a balance register check is disclosed in German application No. 195 34 530.4, corresponding to the aforementioned copending U.S. application Ser. No. 08/525,923. A further step (not shown) for checking the value card register can likewise possibly be included among the aforementioned, parallel preceding steps.

The debiting on a special chip card (similar to a telephone card or credit card) brought into contact with the postage meter machine FM via the unit 20 and edited by a number of carriers takes place in another accounting version. Here, a prepaid amount is maintained as an electronic balance in the balance account of the chip card and is reduced by the postage value to be franked in the case of an intended franking. At the same time, a transfer of the debited postage value ensues into the accounting unit of the postage meter machine. The debiting with such a value card, which functions as an electronic purse, can ensue until the electronic purse is empty. The refilling of the value card ensues in special bank terminals in a remote credit institute up to a predetermined amount. When the refilled value card is brought into contact with the write/read unit of the postage meter machine, a communication with a special program module of the postage meter machine ensues. Both program module and value card generate crypto codes that are exchanged. The crypto codes are communicated from the postage meter machine to a data center of the postage meter machine manufacturer by modem. At the end of the day, preferably during the night, both of the aforementioned crypto codes and the data sets for every individual entry are communicated for checking to an inspection group of the remote credit institute.

The accounting mode is checked in a step 418 in order to form sub-addresses following the aforementioned step 417. If an accounting on the basis of a debit balance is present, then a branch is made from interrogation step 419 to a step 420 for debit register checking. When an accounting on the basis of a credit balance is present, then a branch is made from the interrogation step 421 to a step 422 for credit register checking. When, however, a standard crediting on the basis of a prepaid balance is present, then a branch is made from the interrogation step 423 to the step 407 for balance register checking. When, alternatively, an accounting on the basis of a prepaid balance in a value card is present, then a branch is correspondingly made from an interrogation step 425 to a corresponding step 426 for balance register checking in a value card. A check preferably ensues on the basis of the co-stored MAC. Interrogation step 409 is then reached and a branch is made if necessary to error interpretation step 413. A manipulation with fraudulent intent can only be precluded given authentic register data. Via step 410, the step 406 with the accounting and printing routine is then reached.

The sub-flowchart for the accounting and printing routine in franking mode with carrier-related and cost center-related accounting is shown in greater detail in FIG. 7*b*. A MAC protected postage value can be checked on the basis of the appertaining MAC in franking mode 400 at the beginning of the accounting routine (FIG. 7*a*). A check sum formation over the postage value and the encoding thereof then ensues. When the result is identical to the MAC value, one can assume the validity of the postage value and the actual accounting procedure can then be started. With an accounting unit that cannot be manipulated, a register R2 is incremented by the postage value in sub-step 4060 and another register R1 is reduced by the postage value. A comparable accounting ensues with the piece number data. An attachment of the MAC protection in sub-step 4061 also ensues after the accounting. In sub-step 4062 a storing then ensues under the selected carrier number and the cost center number 0. The storing under the department-related, selected cost center number n (with n=1 through k) additionally ensues in the cost center memory 9 in sub-step 4063. Only then is the printing routine with the sub-steps 4064 and 4065 reached.

FIG. 7*c* shows the result of the carrier-related accounting in the postal registers implemented in the manipulation-proof accounting module. In FIG. 7*c* (and in FIG. 7*d* as well) the designation "KST" stands for "cost center." A listing of postal register values Ri (with i=1 through h) for each carrier m (with m=1 through l) which is present in the memory area. When, for example, the postage meter machine operator has selected an accounting version with value card, an amount is first transferred from the value card into one of the registers R80 and the piece number for the bookings is counted in one of the registers R81 proceeding from 0. Independently of the selected cost center number, a booking in the registers R80 and R81 is undertaken in a carrier-specific manner in addition to the value card registers, whereby the amount from the value card is correspondingly reduced. When, however, the standard accounting from the balance loaded via the data center DC, for example by modem, is selected, then, independently of a selected cost center number, an accounting first ensues in the registers R1 through R8, correspondingly accumulated and related to a selected carrier.

The carriers have a name to which a number is allocated in order to call or set this more easily by pressing a key. The carriers may also be identifiable by the carrier identification number (CIN) that is a multi-placed number for exact, automatic identification of the carriers, particularly during a communication with a data center of the postage meter machine manufacturer. This CIN makes it possible to load a set of carrier data into the postage meter machine. Further, a number for each cost center is likewise provided in order to call or set this independently of its name by pressing a key.

FIG. 7*d* shows a two-dimensional cost center/carrier matrix for the used sum amount (postage consumption p) respectively allocated to the cost centers in the ascending register R2 and for the used piece number z respectively allocated to the cost centers in the piece count register R4. A resetting to 0 both for the postage use p as well as for the piece count z ensues periodically or at freely selectable time spans after an accounting and output of a listing for a cost center. The output of such a listing can, for example, ensue as a cost center printout or as a carrier-related printout on a tape by the postage meter machine.

Figure 8:
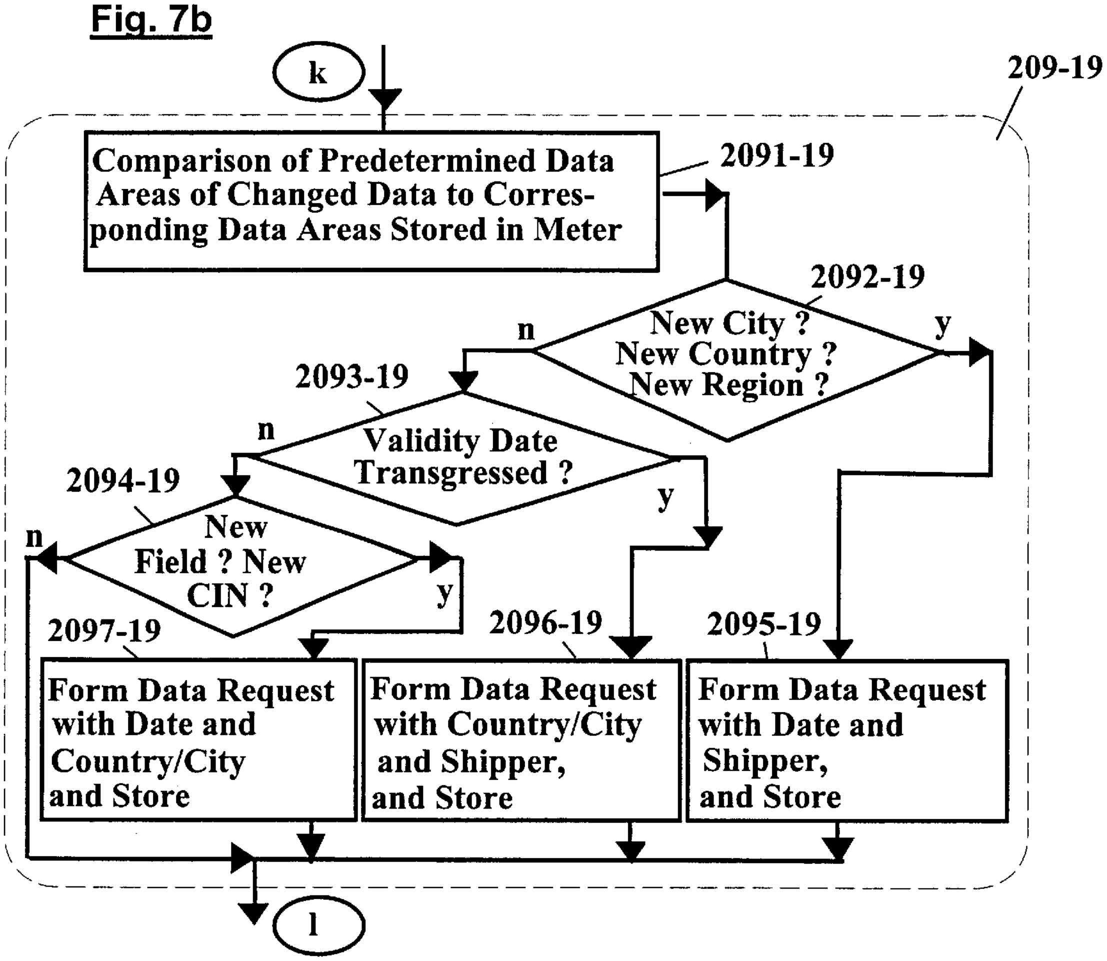
FIG. 8 is a flowchart for forming request data for a data transmission from a data center in accordance with the invention.

The routine 209-19 (shown in FIG. 5*a*) for checking stored data and for forming request data for a data transmission of fee schedule tables and auxiliary data from the data center DC to the postage meter machine is explained in greater detail with reference to FIG. 8. A comparison of predetermined data areas for checking data on the basis of predetermined, corresponding comparison data stored non-volatilely ensues in sub-step 1262 of FIG. 8 in order to be able to identify modifications that have occurred, or have been entered. Specific interrogations ensue in the following sub-steps 2092-19, 2093-19 and 2094-19 in order to form specific request data in the appertaining sub-steps 2093-13 through 2097-13. If the location was changed, whereby the country, the region and/or locality were newly entered, a branch is made from sub-step 2092-13 to the sub-step 2095-13 in order to form and store request data together with the current date and carrier. Transgression of the validity date that is allocated to every carrier-specific table is checked in sub-step 2093-19 in order to then form request data together with the current location and carrier and to store these items. A new entry of a field name is evaluated in sub-step 2094-19, where with tables and information are specifically identified before a branch is made to sub-step 2097-19 in order to specifically form and store request data. A branch is made directly to point I only when no changes were detected in the interrogations 2092-19 through 2094-19.

Such request data can be automatically formed in a constantly run step 209 (FIGS. 3 or 4*b* or, respectively 5) in front of point t and the request data are interpreted in step 301 according to FIGS. 3, 4*b* or 4*d* as communication requests in order to enter into a communication mode.

Figure 9:
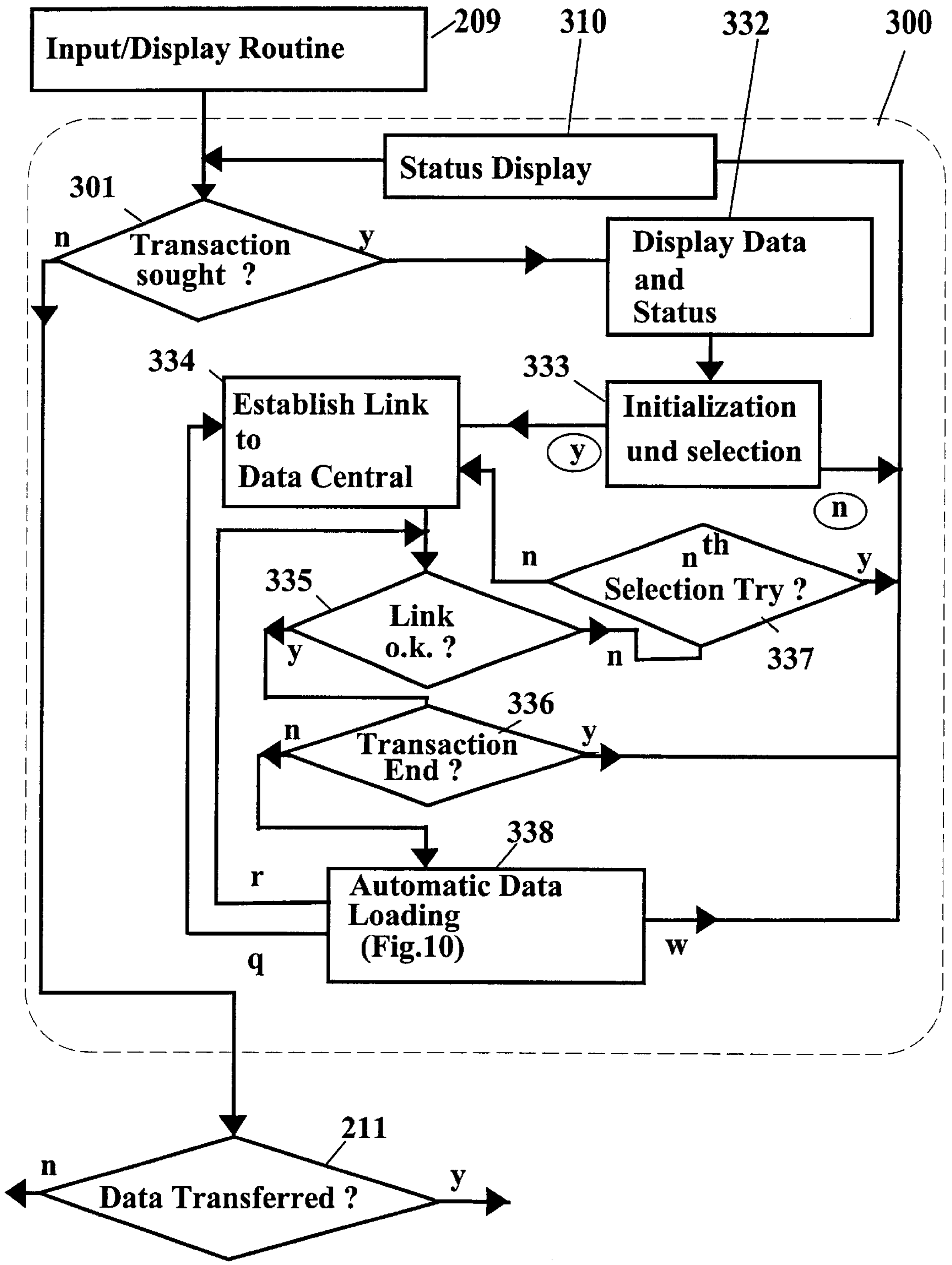
FIG. 9 is a flowchart for the communication mode for a postage meter machine constructed and operating in accordance with the principles of the present invention in order to implement a data transmission.

FIG. 9 shows the communication mode for the postage meter machine that is required in order to implement a data transmission that sequences largely automatically by modem. A recognized transaction request in sub-step 301 of step 300 leads to the display of data and of the status in the sub-step 332 in order, after an initialization of the modem and a selection of the data center (telephone number), to subsequently branch in the sub-step 333 to a sub-step 334 for setting up the connection to the data center. When an initialization of the modem and selection in sub-step 333 cannot be successfully implemented, a branch is made back via sub-step 310 for displaying the status to sub-step 301. A branch is likewise made back to sub-step 301 if it is found in a sub-step 335, after the sub-step 334, that the connection step up did not ensue properly and a determination is made in sub-step 337 that the connection subsequently still can not be setup after the nth redialing.

When, however, the call setup ensues properly and it is found in sub-step 336 that one of the transactions has not yet been terminated, an automatic reloading with data ensues in sub-step 338. Corresponding to the modification of the CIN that is stored in the postage meter machine, a reloading now ensues. If the CIN was not modified by the minimum validity duration for the fee schedules stored in the postage meter machine is transgressed or when a different set of mail carriers was defined, the data center is likewise automatically selected and an updating is accomplished.

A determination is made in sub-step 338 as to whether an error status has occurred that can be eliminated by a renewed connection setup to the data center in order to branch back via point q to the sub-step 334. A further determination is made in sub-step 338 as to whether an error status has occurred that cannot be eliminated in order to branch back via point w to the sub-step 310 for the purpose of a status display. If a transaction has been implemented, subsequent transactions then can be implemented, whereby a branch is made back via point r to the sub-step 335. When the connection is still intact, a check is made in sub-step 336 to determine whether all transactions have been implemented, or to determine whether the last transaction was ended in order to then branch back via the sub-step 310 to the sub-step 301. The flag for a transaction request is reset in sub-step 338 at the end of the last transaction. A branch is thus made from sub-step 301 to step 211 in order now to store and interpret the selected data communicated to the postage meter machine. The value of the transmitted CIN can be automatically classified (according to frequency or priority) in a predetermined way in the interpretation. The type of classification can be set. At least one actuation means is provided in order to set the type of classification. The automatic reloading with data in sub-step 338 includes at least one handling routine that is explained in greater detail in conjunction with FIG. 10.

Figure 10:
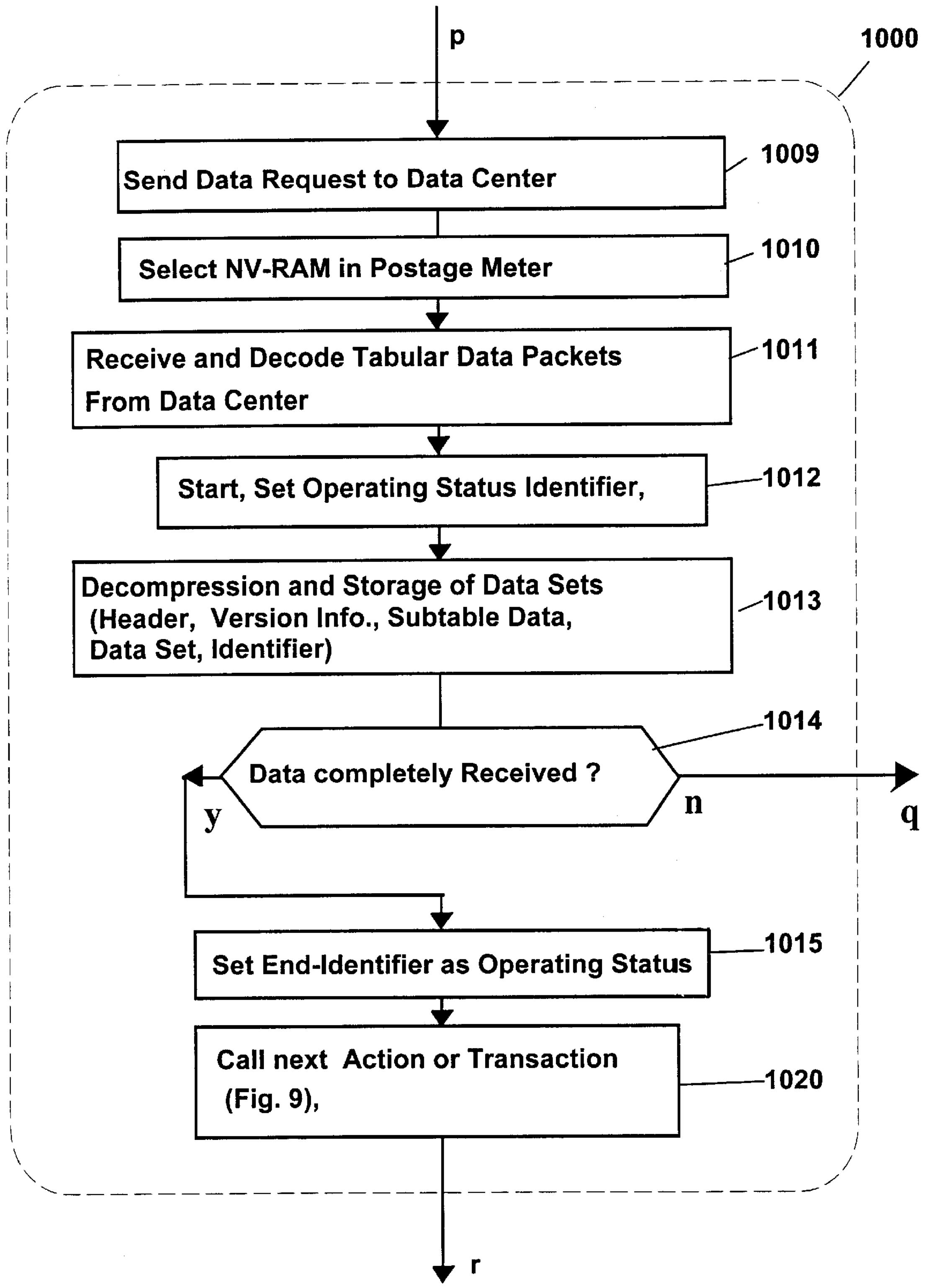
FIG. 10 is a flowchart for a routine for receiving and handling communicated service performance data in a postage meter machine constructed and operating in accordance with the principles of the present invention.

The routine 1000 shown in FIG. 10 for handling communicated table data in the postage meter machine includes a sub-step 1009 for sending request data to the data center. A sub-step 1010 is then implemented in order to select a non-volatile memory area in the postage meter machine in which the requested data can be intermediately stored later. After the sub-step 1010, a branch is made via the sub-step 1011 for receiving and decoding the data packet communicated from the data center to a sub-step 1012 in which a start processing status is set for a data processing. A first processing of the data then ensues in the sub-step 1013. The intermediate storage of the data is advantageous when data are communicated in a number of transactions or when a transaction must be repeated. After departing the communication mode 300, a determination is made in the interrogation step 211—shown in FIGS. 3*a* and 3*b*—that data were communicated and a branch is then made to the statistics and error evaluation mode 213. Given freedom from error and validity of the communicated data, a non-volatile storage in the postage meter machine ensues in the aforementioned evaluation mode. After intermediate storage and, if necessary, after a following decompression given packed data in the sub-step 1013 and after executing further sub-steps 1014, 1015 and 1020, a storage of the data set that belongs to a complete postage fee set of a mail carrier ensues. Such a data set includes a header, version information, sub-table data and an end data set identifier.

In the sub-step 1014 for checking for complete reception of the communicated data packet, a branch is made to a sub-step 1015 given completeness in order to set an end identifier as the processing status. Such identifiers are required in order, even given a program abort, for example due to an interruption of operating voltage, to continue the program at this point after the voltage returns. In the following sub-step 1020, the next transaction or action is called, and thus a branch is made to the further execution of the executive sequence shown in FIG. 9 in order to non-volatilely store the intermediately stored updating data in a step 213 that follows later.

Given an improper execution, which is determined in sub-step 1014, the point q is reached. By branching to the sub-step 334 according to FIG. 9, a further attempt can be started in order to transmit the required sub-table data. The sub-steps 335 through 336 are thereby run and the point p according to FIG. 10 is reached.

Automatic reloading with data in the sub-step 338 includes specific handling routines that go beyond those explained in greater detail in conjunction with FIG. 10. This method disclosed in the aforementioned German application Serial No. 195 49 305.2 and corresponding U.S. application Ser. No. 08/770,525, now U.S. Pat. No. 5,852,813 supplies a location-specific offering of window data for the postage stamp or of auxiliary functions for the postage meter machine, as well as offering current information for permanent and/or temporary configuration of the postage meter machine on the basis of a communication network that contains a memory with the callable data blocks for reloading auxiliary functions and information into the postage meter machine, as well as updating data.

Figure 11:
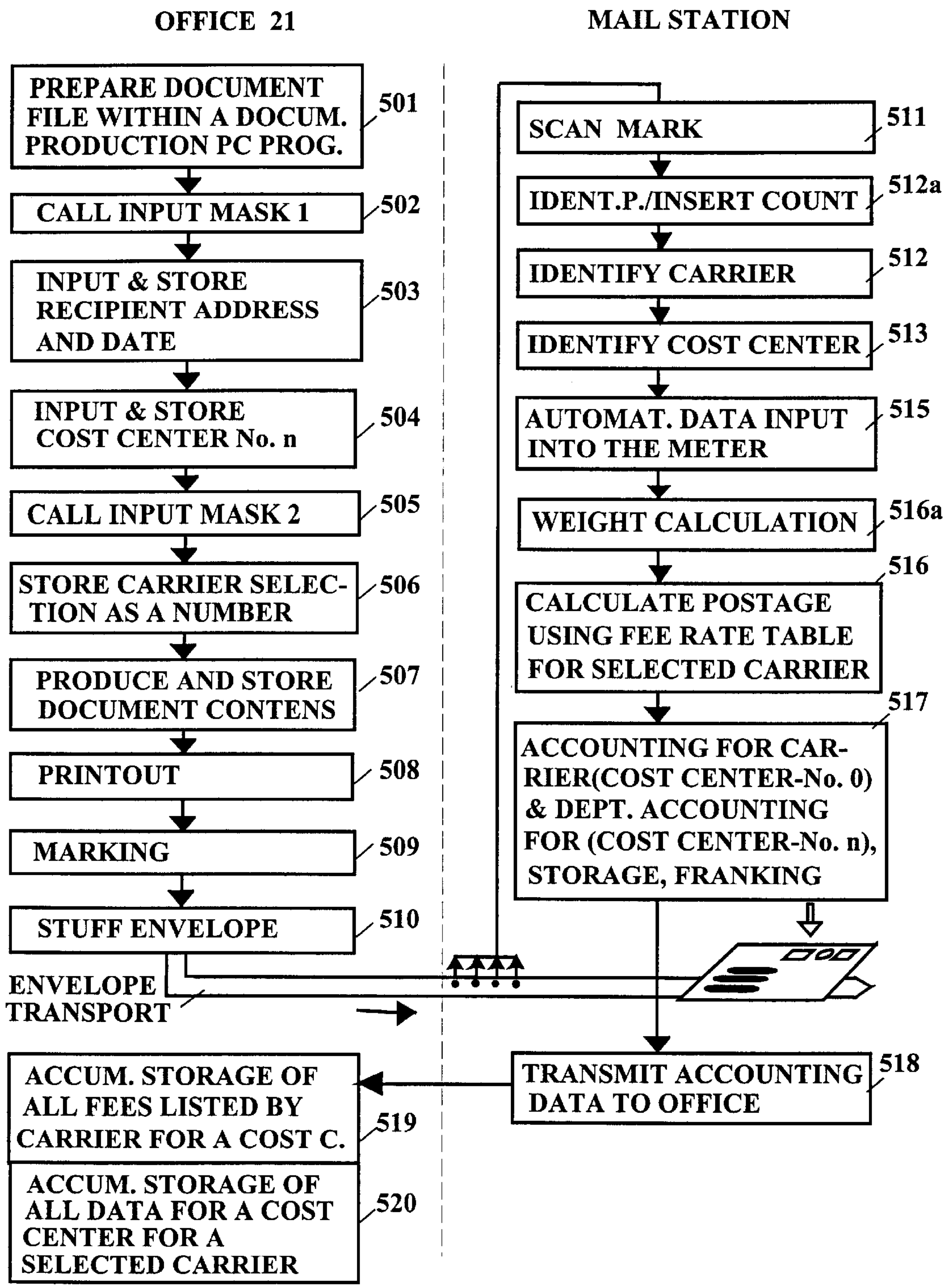
FIG. 11 is a flowchart for a method for operating a mail processing system employing the first embodiment of the inventive postage meter machine.

FIG. 11 shows a method according to a first embodiment of the inventive mail processing system. The method for data processing in a mail shipping system includes a number of steps that are implemented on a personal computer in the office 21 for preparing the printout of a letter together with address field and mark. These steps are as follows:

Step 501: creating a letter file within the framework of a letter production program;

Step 502: call first input mask;

Step 503: input and storing of the recipient address and of the date;

Step 504: input and store cost center number;

Step 505: call second input mask;

Step 506: store carrier selection as number;

Step 507: producing and storing the page count together with the a letter content;

Step 508: printout of the letter with some of the shipping information including the page count, a carrier and/or cost center number, and the address of the recipient of the letter on the envelope;

Step 509: marking the letter or container (envelope) with a mark identifying at least certain shipping information (optional);

Step 510: stuffing the letter into an envelope.

In a version of this embodiment a program routine for automatic entry of the cost center number sequences in conjunction with the first input mask in step 504. In another version, step 504 is entirely eliminated. Only the carrier selection is then stored as number and applied on the document, label, letter or envelope. In all of these versions, however, print out of the page count takes place.

The addressing ensues either on the letter given printout of the letter in step 508, or in the following step 509. The marking in step 509 includes the calling of programs for the position of the address and/or information corresponding to the postal regulations for the position of the address and/or other information. Such a postal regulation may, for example, prescribe that a bar code be used as a mark identifying the address or the associated postal zip code be applied to a piece of mail (i.e., a letter if visible through a window envelope, or the envelope itself in the form of a separate mark.

Corresponding programs are loaded in the memories of the respective personal computer $PC_a$, $PC_b$ or $PC_c$ that are located in the office 21. In steps 508 and 509, a printer that is shared or separate printers, are correspondingly operated to print the aforementioned areas.

In another version alternative editing steps are implemented in order to enable the employment of stickers or of pre-printed letter envelopes.

The following steps are executed when scanning the mark in a mail center and when processing the data as well as when franking with a postage meter machine.

Step 511: scanning the mark;

Step 512*a*: identify page counter or insert count;

Step 512: identify carrier number;

Step 513: identify cost center number;

Step 515: automatic data input for processing in the postage meter machine, comprising cost center and carrier information as well as the page count or insert count;

Step 516*a*: weight calculation from page or insert count multiplied by average page or insert weight, added to the (constant) container weight;

Step 516: employ postage fee table of the selected carrier for calculating the postage value;

Step 517 first accounting according to a selected carrier m for a plurality of carriers under the cost center number 0 and department-by-department accounting classified according to selected cost center number n.

The "container weight" is the weight of an envelope, wrapping or other exterior material used to enclose the pages or inserts.

Optionally, the mark contains only a part of the shipping information, whereas another part is permanently set in the postage meter machine. Alternatively, the step 512*a* for identifying the insert count, the step 512 for identifying the carrier number or the step 513 for identifying the cost center number are executed. Likewise alternatively, the automatic data input ensues correspondingly in step 515.

Inserts employed in step 516*a* for weight calculation are preferably identical pages of a letter, or disks or cards of an electronic information carrier. Given a combination of different inserts, the type of insert is communicated in addition to the number and identified in step 512*a*. In step 516*a*, the weight calculation of the insert count multiplied by the average insert weight ensues separately for each insert type in order to first determine a stack weight and then form a sum of all stack weights of the insert types, plus the weight of the container (envelope).

A step 518 is optionally provided in order to send accounting data to the office 21 as a reaction to a request.

Figure 12:
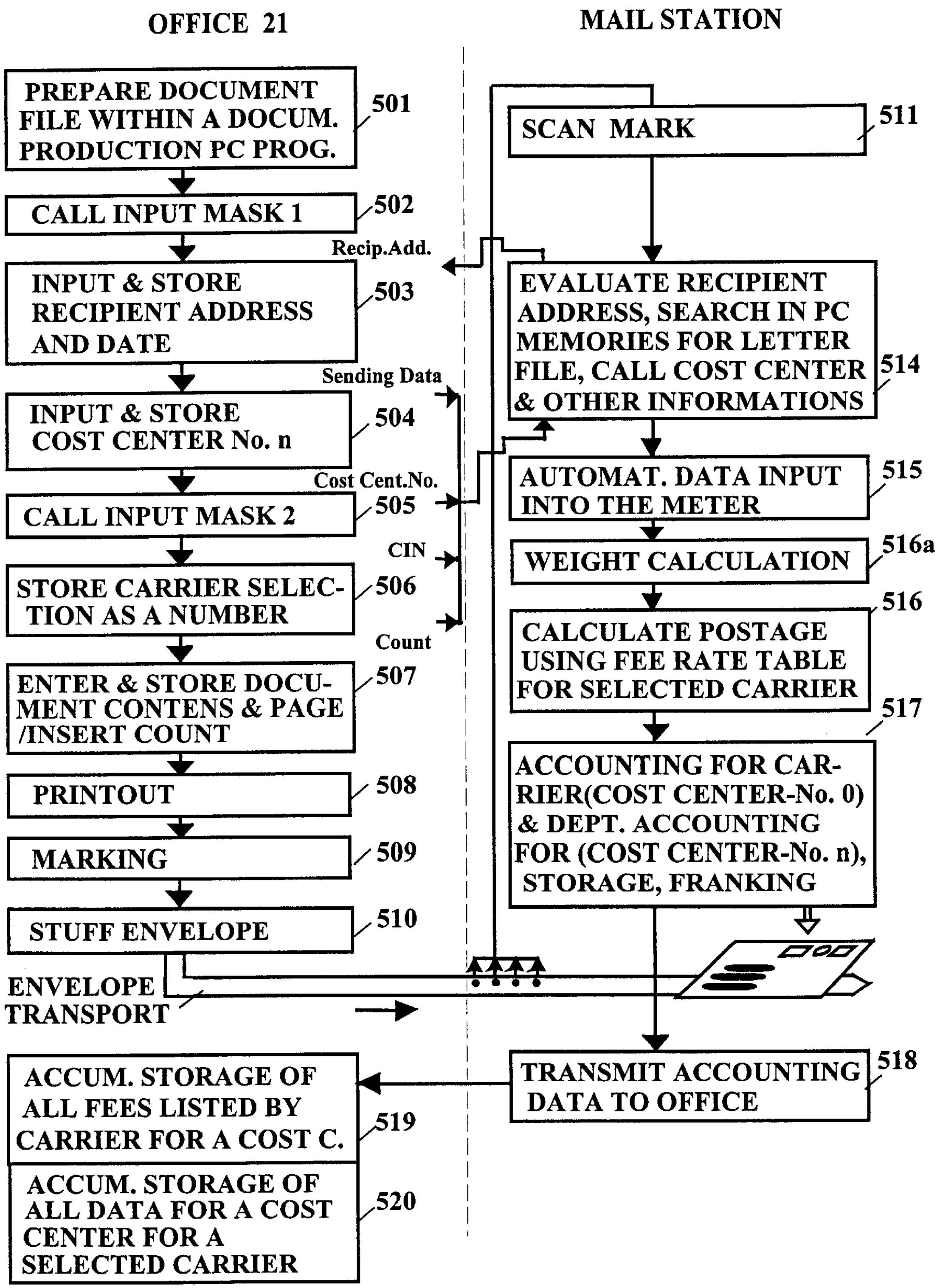
FIG. 12 is a flowchart for a method for operating a mail processing system employing the second embodiment of the inventive postage meter machine.
Figure 13:
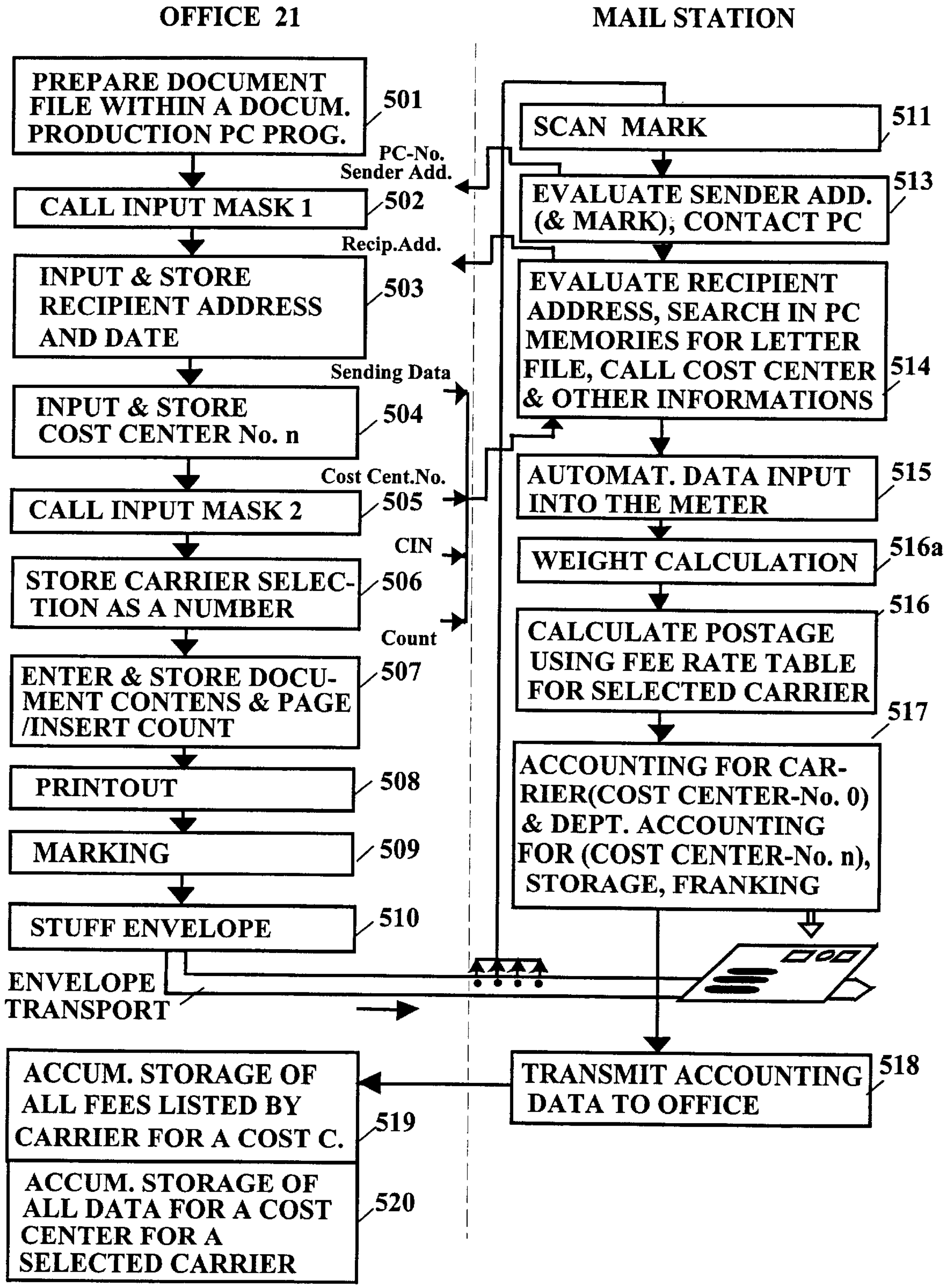
FIG. 13 is a flowchart for a method for operating a mail processing system employing a third embodiment of the inventive postage meter machine.

FIG. 12 shows a version with internal postage calculation according to the second embodiment of the invention. The method for data input in a mail shipping system includes a number of steps that are implemented on the personal computer in the office 21 for preparing the printout of a letter together with address field and mark, including a step for producing and storing a letter content before the printout of the letter.

Step 501: creating a letter file within the framework of a letter production program;

Step 502: call first input mask;

Step 503: input and store the recipient address and of the date;

Step 504: input and store cost center number (optional);

Step 505: call second input mask;

Step 506: store carrier selection as number;

Step 507: produce and store the page count in conjunction with the letter content;

Step 508: printout of the letter and, possibly the address of the recipient of the letter on the envelope;

Step 510: stuffing the letter into an envelope.

The optional step 504 in the automatic execution or by user prompting in order to input and store the cost center number is preferably inserted after the step 503 for entering and storing the recipient address and the date, and before the step 505 for calling the second input mask. In a variant version a program routine for the automatic entry of the cost center number is executed in the optional step 504 in conjunction with the first input mask.

The addressing ensues either on the letter given printout of the letter in step 508 or in the form of a mark or marking in the following optional step 509 before the letter is placed in the envelope (in step 510). The marking in the optional step 509 includes calling programs for positioning the address and/or the other shipping information corresponding to postal regulations for the position of the address and/or of the other shipping information. The postal regulation can, for example, prescribe a marking with a bar code for the address or the appertaining postal zip code that is to be applied to the piece of mail (or letter or envelope) in the form of a separate mark.

Corresponding programs are loaded in the memories of the respective personal computers $PC_a$, $PC_b$ or $PC_c$ that are located in the office 21. In steps 508 and 509, a printer that is shared, or separate printers is/are correspondingly driven for the aforementioned areas to be printed.

The aforementioned steps 503, 504 and 506 according to the second embodiment are inventively executed such that, during storage, an allocation of the data to the recipient address and to the date automatically ensues with a program routine in conjunction with the first and second input masks. Differing from the first version, no selected cost center number, no insert count and no selected carrier information need be printed on the letter or on the envelope. The mark on the letter or envelope to be subsequently interpreted in the mail center contains only the recipient address. A program routine in conjunction with the first input mask for the automatic input of the cost center number can still be executed in the optional step 504 when it is assured that the personal computer in the office is always used only by the same department.

The following steps are run when scanning the mark in a mail center and when processing the data as well as when franking with a postage meter machine:

Step 511: scanning the mark;

Step 514: identify recipient address and interpret date as well as access to the memory of the personal computer in order to identify the letter file and in order to fetch the cost center and/or carrier information as well as the insert count;

Step 515: automatic data input for processing in the postage meter machine, comprising cost center and/or carrier information as well as the insert count;

Step 516*a*: weight calculation from the insert count multiplied by the average insert weight and added to the constant container weight;

Step 516: employ postage fee table of the selected carrier for calculating the postage value;

Step 517: first accounting according to a selected carrier m from a plurality of carriers under the cost center number 0 and/or department-by-department accounting classified according to selected cost center number n.

In the case of different inserts, in addition to the number of inserts, the type of insert is also called in the step 514 for the identification of the address and for calling data from the letter file of the personal computer, and, in step 516*a*, the weight calculation for each insert type ensues separately from the insert count multiplied by the average insert weight in order to first determine a stack weight and then form a sum over all stack weights of the insert types and over the weight of the container (envelope).

The step 514 is modified in a variant version in order to identify the recipient address and to interpret the date as well as to enable access to the memory of the personal computer in order to identify the letter file and interrogate at least a part of the shipping information, with the remainder of the shipping information being permanently set in the postage meter machine. Alternatively, the automatic data input then ensues correspondingly in the step 515.

Optionally, a step 518 is provided in order to send accounting data to the office 21 as a reaction to a request, after the step 517 for the two-dimensional accounting according to carrier and cost centers.

The method for data input in a mail shipping system further includes a number of optional steps that are implemented on the personal computer in the office 21 at the end of a predetermined period, or as needed, after the franking of a letter. These steps are:

Step 519: accumulative storage of the overall fees, listed according to carriers for a selected cost center;

Step 520: accumulative storage of the cost center-related accounting data for a selected carrier.

The communication sequences via the communication means, preferably the data line 24 via which the access to the memories of the personal computer is also undertaken in step 514 in order to identify the letter file. Of course, a wireless communication can be alternatively used as the communication means. In a further version, the personal computer containing the relevant letter file is determined via the communication means itself, thereby shortening the search for letter files in the data bank distributed among a number of hard disks of the respective personal computer.

Another variant of the invention contains a combination with scanning of the return address and the recipient address within the framework of the second embodiment. A program routine for the automatic entry of the cost center number is executed in a preparatory step 504 in conjunction with a first input mask that is automatically called in the step 502 following the first preparatory step 501. A PC number for the identification can be advantageously stored allocated to a separate return address, or to a cost center number. The appertaining personal computer with the relevant letter file can then be determined via the return address, or with the PC number.

When scanning the mark with respect to the return address in the detection of a piece of mail of supplied pieces of mail in the transport path to the print head of the postage meter machine, the appertaining personal computer in the office 21 can be indirectly determined via the department or firm designation of the sender.

A further variant contains a combination of the first and second embodiments. The determination of the appertaining personal computer with the relevant letter file ensues directly, with the contents of the mark including an identifier (PC No.) for that personal computer in the office 21 that contains the relevant letter file in its memories.

The following steps are conducted in another version the inventive method for data processing in a mail shipping system, with the internal weight and postage calculation, according to the second embodiment.

In a first step 201, a detection of a piece of mail in the transport path to the print head 1 of the postage meter machine (such as by the sensor 16) takes place with scanning of the return address and/or of the mark for the return address (such as with the scanner 26) in step 511, An interrogation of the personal computer in the office 21 ensues in step 513 via the communication means from the postage meter machine FM for determining the personal computer on which the letter was produced, on the basis of scanned return address. The appropriate letter file is then searched for shipping or accounting information. As a result of the search, shipping information including at least the pate or insert count and/or the cost center number is automatically entered into the postage meter machine FM, and at least non-volatilely stored setting data are called in the step 515 for an automatic print data input into the postage meter machine FM.

A processing routine is executed in a second step 209, including at least one routine allowing for automatic modification of non-volatilely stored setting data, for internal calculation of the weight value in step 516*a*, and the postage value in step 516 using the current fee table of the selected carrier, plus a routine for generating a carrier-specific print format.

The data are then processed in the franking mode with a cost-center-specified accounting ensuing before the franking.

Further, a routine is provided for the formation of request data for the reloading of selected carrier data and/or current carrier fee schedules of the selected carrier as a result of the selection of a predetermined mail carrier number (CIN), for automatic print data input and inspection as well as for display, for automatic or manual input. The routine may also contain a sub-routine for the allocation of a cost center number to a slogan number for the automatic input of the slogan number given input of the cost center number. The processing the data in the franking mode preferably ensues with a cost center-related and carrier-specific accounting before the franking.

The marking on the letter in the address field or on the envelope is generated in preparatory steps with the personal computer, whereby, following a first preparatory step 501 for creating a letter file in the framework of a letter production program, the further preparatory steps 502 through 507 are executed, and an allocation of the data of the printable letter, required for the marking, to the aforementioned address is fetchably stored in the personal computer.

The scanning of the return address as well as of the letter recipient address and/or of the corresponding mark for the return address is implemented with a single scanner 26 or with separate scanners 26, 26.1 that are connected in common with the letter sensor 16 to the register unit 19. It is thereby provided that at least one scanner is arranged in the mail delivery stream so that marks on different formats of postal matter can be scanned.

Variants of both the first and second embodiments of the invention are conceivable, whereby only a part of the information, i.e. cost center or shipping information, is communicated to the postage meter machine and another part of the information necessary for franking is permanently set in the postage meter machine, or is non-volatilely stored therein. Combinations are also possible whereby a cost center number, an insert count or selected carrier information are not printed on the letter or on the envelopes but can be interrogated from the distributed data bank via the data line 24.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for data processing in a shipping system for separate pieces of mail, said method comprising the steps of:

(a) providing a postage meter device having a transport path by which pieces of mail are transported to said postage meter machine, each piece of mail comprising a container containing at least one item and each piece of mail having an information-containing mark printed thereon;

(b) detecting a piece of mail, as a detected piece of mail, in said transport path;

(c) scanning the mark of the detected piece of mail in said transport path;

(d) using the information in the mark of the detected piece of mail, identifying an item count equal to a number of items contained in the detected piece of mail;

(e) providing data from which a weight associated with shipping said detected piece of mail is derivable;

(f) calculating a calculated weight associated with shipping said detected piece of mail from said data;

(g) making said calculated weight available to said postage meter device and calculating in said postage meter device a fee for shipping said detected piece of mail based on said calculated weight; and (h) conducting an accounting for charging said fee, and generating print data in said postage meter device including said fee and supplying said print data to said print head printing a franking imprint on said detected piece of mail incorporating a printed representation of said fee.

2. A method as claimed in claim 1 comprising the additional step of including, in the information in the mark on each piece of mail, an item count identifier, and wherein step (d) comprises identifying said item count from said item count identifier.

3. A method as claimed in claim 2 comprising the additional step of selecting a carrier for said detected piece of mail among a plurality of available carriers and including a carrier identifier in said information in said address field, and wherein step (g) comprises calculating said fee for shipping said detected piece of mail based on said weight of said detected piece of mail and a fee table for said selected carrier.

4. A method as claimed in claim 3 wherein said shipping system is used by a plurality of independent cost centers, and comprising the additional step of including a cost center identifier, identifying a cost center to be charged said fee for shipping said detected piece of mail in said information in said mark, and wherein step (h) comprises conducting a cost-center-specific accounting in said postage meter device and charging said fee to the cost center identified by said cost center identifier.

5. A method as claimed in claim 1 wherein said shipping system is used by a plurality of independent cost centers, and comprising the additional step of including a cost center identifier, identifying a cost center to be charged said fee for shipping said detected piece of mail in said information in said mark, and wherein step (h) comprises conducting a cost-center-specific accounting in said postage meter device and charging said fee to the cost center identified by said cost center identifier.

6. A method as claimed in claim 1 comprising the additional steps of:

providing at least one personal computer, having a memory, remote from said postage meter device and producing a piece of mail, having mail contents, using said personal computer;

storing said mail contents in a datafile in said memory of said personal computer allocated to instructional data including at least said item count;

providing communication means for bidirectional communication between said personal computer and said postage meter device, and wherein step (d) comprises:

executing an office computer communication routine in said postage meter device between said postage meter device and said personal computer via said communication means, including searching said memory of said personal computer, using said information in the mark of the detected piece of mail, for locating the datafile in said personal computer containing the mail contents of said detected piece of mail and for interrogating said datafile containing the mail contents of said detected piece of mail to identify said item count, and supplying said item count for said detected piece of mail from said personal computer to said postage meter device via said communication means and automatically entering said item count into said postage meter device.

7. A method as claimed in claim 6 wherein the step of storing said mail contents allocated to said instructional data comprises storing said mail contents in a datafile of said memory of said personal computer allocated to instructional information including at least said item count and time data, and wherein the step of searching said memory of said personal computer comprises searching said memory of said personal computer using said information in the mark of the detected piece of mail and said time data for locating the datafile containing the mail contents of said detected piece of mail.

8. A method as claimed in claim 6 wherein step (c) comprises scanning said mark of said detected piece of mail using a scanner in said transport path remote from said postage meter device, and said method comprising the additional steps of providing a peripheral input unit remote from said postage meter device, and executing in said postage meter device a scanner communication routine and peripheral input communication routine to determine which of said scanner and said peripheral input unit will interface with said postage meter device.

9. A method as claimed in claim 8 wherein the step of providing a peripheral input unit remote from said postage meter device comprises providing a value card reader remote from said postage meter device as said peripheral input unit.

10. A method as claimed in claim 6 comprising the additional step of selecting a carrier for shipping said detected piece of mail among a plurality of available carriers and including an identification of the selected carrier in said instructional data and wherein the step of supplying information from said personal computer to said postage meter device comprises supplying information identifying said item count and said selected carrier from said personal computer to said postage meter device, and wherein step (g) comprises calculating said fee for shipping said detected piece of mail based on said weight of said detected piece of mail and a fee table for said selected carrier.

11. A method as claimed in claim 10 wherein said shipping system is used by a plurality of independent cost centers, said personal computer being located at one of said cost centers, and comprising the additional step of including a cost center identifier in said instructional information and wherein the step of supplying information from said personal computer to said postage meter device comprises supplying said item count and said cost center identifier from said personal computer to said postage meter device, and wherein step (h) comprises conducting a cost-center-specific accounting in said postage meter device for charging said fee to the cost center identified by said cost center identifier.

12. A method as claimed in claim 6 wherein said shipping system is used by a plurality of independent cost centers, said personal computer being located at one of said cost centers, and comprising the additional step of including a cost center identifier in said instructional information and wherein the step of supplying information from said personal computer to said postage meter device comprises supplying said item count and said cost center identifier from said personal computer to said postage meter device, and wherein step (h) comprises conducting a cost-center-specific accounting in said postage meter device for charging said fee to the cost center identified by said cost center identifier.

13. A method as claimed in claim 1 wherein said shipping system is used by a plurality of independent cost centers, and comprising the additional step of selecting a carrier for shipping said detected piece of mail among a plurality of available carriers, and wherein step (d) comprises using the information in the mark of the detected piece of mail, identifying the selected carrier and a cost center for said detected piece of mail, in addition to said item count, and wherein step (g) comprises calculating said fee for shipping said detected piece of mail based on said weight of said detected piece of mail and a fee table for said selected carrier, and wherein step (h) comprises conducting a cost-center-specific and carrier-specific accounting for charging said fee to the cost center identified in the mark of the detected piece of mail, in a two-dimensional accounting matrix.

14. A method as claimed in claim 1 comprising the additional step of selecting a carrier for shipping said detected piece of mail among a plurality of available carriers, and wherein step (d) comprises using the information in the mark of the detected piece of mail identifying the selected carrier for said detected piece of mail in addition to said item count, and said method comprising the additional step of storing a plurality of carrier-specific print formats in said postage meter device respectively corresponding to said plurality of available carriers, and retrieving a carrier-specific print format corresponding to said selected carrier, and wherein step (h) comprises franking said detected piece of mail in said postage meter device printing a franking imprint on said detected piece of mail at said print head incorporating said fee and the carrier-specific print format for said selected carrier.

15. A method as claimed in claim 1 wherein step (e) comprises entering and storing said average item weight and said container weight in said postage meter device in setting data to be used for franking, and wherein step (h) comprises franking said detected piece of mail in said postage meter device including printing said franking imprint at said print head using said setting data.

16. A method as claimed in claim 15 comprising the additional steps of retrieving non-volatilely stored setting data when no piece of mail is detected in step (b), allowing for manual modification of the retrieved setting data by manual input into said postage meter device as needed, and wherein step (c) comprises automatically entering said information in said mark of the detected piece of mail into said postage meter machine when said detected piece of mail is detected in step (b).

17. A method as claimed in claim 15 wherein said shipping system is used with a data center remote from said shipping system, and said method comprising the additional steps of:

if sufficient setting data are not available in said postage meter device for generating said print data, forming a data request to said remote data center for data needed to complete generation of said print data;

establishing a communication between said postage meter device and said remote data center and transmitting said data request from said postage meter device to said remote data center; and transmitting said data needed to complete said print data from said remote data center to said postage meter device, and generating said print data using said data needed to complete said print data transmitted to said postage meter machine device.

18. A method as claimed in claim 17 wherein said print data frame data and pixel data, and wherein the step of generating said print data using said data transmitted from said remote data center to complete said print data comprises modifying at least one of said frame data and said pixel data.

19. A method as claimed in claim 17 comprising providing a plurality of modifiable information categories in said print data and, for each category, assigning respective numbers to each available modification of that category, and using said numbers in the step of forming said data request.

20. A method as claimed in claim 19 comprising the additional steps of providing said postage meter device with a means for manually entering data into said postage meter device having a plurality of actuation elements, and entering said numbers into said postage meter device using respective actuation elements.

21. A method as claimed in claim 1 wherein said shipping system is used by a plurality of independent cost centers each having an advertising cliché associated therewith, wherein step (d) comprises using the information in the mark of the detected piece of mail identifying a cost center to be charged said fee, in addition to said item count, said method comprising the additional step of storing a plurality of advertising cliches respectively associated with said cost centers in said postage meter device and retrieving an advertising cliche associated with the identified cost center, and wherein step (h) comprises franking said detected piece of mail at said print head in said postage meter device a franking imprint on said detected piece of mail incorporating said fee and the advertising cliche associated with the identified cost center.

22. A method as claimed in claim 1 wherein said mail shipping system is used by a plurality of independent cost centers, and said method comprising the additional steps of:

respectively allocating a cost center number to each cost center;

providing an input unit in communication with said postage meter device via which a selected cost center number can be entered into said postage meter device; and upon entry of a cost center number into said postage meter device via said input unit, displaying at said postage meter device all shipping costs respectively associated with each carrier used by said cost center.

23. A method as claimed in claim 22 comprising the additional step of:

allowing for display of all shipping costs for all cost centers, with each shipping cost displayed matched to a cost center number for the cost center which incurred the shipping cost.

24. A method as claimed in claim 1 wherein said mail shipping system is used by a plurality of independent cost centers, and said method comprising the additional steps of:

respectively allocating a cost center number to each cost center;

providing an input unit in communication with said postage meter device via which a selected cost center number can be entered into said postage meter device; and upon entry of a cost center number into said postage meter device via said input unit, displaying at said postage meter device a number of mailed documents respectively mailed by each carrier used by said cost center.

25. A method as claimed in claim 24 comprising the additional step of displaying all numbers of shipped pieces of mail by all of said cost centers, with each number of shipped pieces of mail matched to a cost center number for the cost center which produced the shipped pieces of mail.

26. A method as claimed in claim 1 wherein steps (e) and (f) respectively comprise:

(e) storing an average item weight and a container weight and making the stored average item weight and container weight available to said postage meter device; and (f) calculating a weight of said detected piece of mail in said postage meter device by multiplying said item count by said average item weight and adding said container weight.

27. A method for processing data in a mail shipping system comprising the steps of:

(a) creating a document in a document producing program in a personal computer for one of a plurality of cost centers, each cost center having a cost center number uniquely identifying that cost center;

(b) calling a first input mask in said personal computer;

(c) entering and storing in said personal computer an address of a recipient of said document and a date of said document using said first input mask;

(d) calling said second input mask in said personal computer;

(e) selecting from said second input mask a carrier for shipping said document among a plurality of available carriers, each carrier having a carrier number uniquely identifying that carrier;

(f) storing number data in said personal computer comprising at least one of said carrier number and said cost center number;

(g) producing and storing contents of said document in said personal computer, said contents comprising a number of pages;

(h) printing out said document and providing said document with an envelope and printing said address of said recipient, said number data and an item count including at least a page count equal to said number of pages; and (i) inserting said document into said envelope.

28. A method as claimed in claim 27 comprising the additional step of entering shipping information for shipping said document into said personal computer, and wherein step (h) comprises printing said shipping information, in addition to said address of said recipient, said number data and said item count, on at least one of said document and said envelope.

29. A method as claimed in claim 28 wherein said shipping information comprises a shipping type and a shipping form.

30. A method as claimed in claim 28 wherein step (h) comprises printing at least one of said shipping information, said address of said recipient, said number data and said item count as a non-alphanumeric mark on at least one of said document and said envelope.

31. A method as claimed in claim 27 wherein step (h) comprises printing out said document on a printer dedicated exclusively to said personal computer.

32. A method as claimed in claim 27 wherein step (h) comprises printing out said document on a printer shared by said personal computer and a plurality of other personal computers.

33. A method as claimed in claim 27 comprising the additional step of storing a program routine for postal regulations regarding positioning of information in said address of said recipient, and wherein step (h) comprises printing out said address of said recipient in accordance with said postal regulations, using said program routine.

34. A method as claimed in claim 27 comprising the additional step of identifying a number of inserts to be shipped with said document and storing said number of inserts in said personal computer, and wherein step (h) comprises printing said address of said recipient, said number data and an item count comprising said page count and an insert count equal to said number of inserts on at least one of said document and said envelope.

35. A method for data entry in a mail shipping system comprising the steps of:

scanning a mark on an individual piece of mail and from said mark identifying scanned information including an item count and at least one of a carrier number for a carrier for shipping said piece of mail and a cost center number for a cost center to be charged a fee for shipping said piece of mail;

automatically entering said scanned information into a postage meter device connected to a print head;

storing an average insert weight and a container weight and making the stored average insert weight and container weight available to said postage meter device;

calculating in said postage meter machine a weight of said piece of mail by multiplying said item count by said average item weight and adding said container weight;

calculating said fee in said postage meter device for shipping said piece of mail by a selected carrier using a postage fee table for said selected carrier;

conducting an accounting in said postage meter device machine for classifying said fee according to at least one of said selected carrier and a cost center; and generating print data in said postage meter device including said fee and supplying said print data to said print head for printing a franking imprint on said piece of mail incorporating said fee.

36. A method as claimed in claim 35 wherein the step of conducting an accounting comprises conducting an accounting according to said selected carrier for all cost centers using said selected carrier for shipping pieces of mail.

37. A method as claimed in claim 35 wherein each cost center comprises a plurality of departments, and wherein the step of conducting said accounting comprises conducting a department-specific accounting for a cost center identified by a cost center number in said scanned information.

38. A method as claimed in claim 36 wherein said item number comprises at least one of a page count identifying a number of pages and an insert count identifying a number of inserts, wherein the step of storing an average item weight in said postage meter machine comprises storing an average page weight and an average insert weight in said postage meter device, and wherein the step of calculating the weight of said piece of mail in said postage meter device comprises multiplying said average page weight by said page count, if said page count is present in said scanned information, to obtain a total page weight and multiplying said average insert weight by said insert count, if said insert count is present in said scanned information, to obtain a total insert weight, and adding said total page weight and said total insert weight to said container weight.

39. A method for data entry in a mail shipping system comprising the steps of:

scanning a mark on an individual piece of mail to obtain scanned information identifying a recipient address and a date;

supplying said scanned information to a postage meter device connected to a print head;

establishing a communication link between said postage meter device and a personal computer remote therefrom and conducting a search in said personal computer by said postage meter device, using said recipient address and said date, for identifying a letter file in said personal computer and retrieving instructional data and an item count from said letter file;

automatically entering said instructional data and said item count into said postage meter device;

providing data from which a weight associated with shipping said detected piece of mail is derivable;

calculating a calculated weight associated with shipping said detected piece of mail from said data;

calculating a fee for shipping said piece of mail by a selected carrier using a fee table for said selected carrier and said calculated weight of said piece of mail;

conducting an accounting in said postage meter device for classifying said fee according to at least one of said selected carrier and a cost center; and generating print data said postage meter device including said fee and supplying said print data to said print head for printing a franking imprint on said piece of mail incorporating said fee.

40. A method as claimed in claim 39 wherein the step of conducting an accounting comprises conducting an accounting according to said selected carrier for all cost centers using said selected carrier for shipping pieces of mail.

41. A method as claimed in claim 39 wherein each cost center comprises a plurality of departments, and wherein the step of conducting said accounting comprises conducting a department-specific accounting for a cost center identified by a cost center number in said scanned information.

42. A method as claimed in claim 39 wherein said item number comprises at least one of a page count identifying a number of pages and an insert count identifying a number of inserts, wherein the step of storing an average item weight in said postage meter device comprises storing an average page weight and an average insert weight in said postage meter device, and wherein the step of calculating the weight of said piece of mail in said postage meter device comprises multiplying said average page weight by said page count, if said page count is present in said scanned information, to obtain a total page weight and multiplying said average insert weight by said insert count, if said insert count is present in said scanned information, to obtain a total insert weight, and adding said total page weight and said total insert weight to said container weight.

43. A method as claimed in claim 39 wherein the step of providing data from which a weight associated with shipping said detected piece of mail is derivable comprises storing an average item weight and a container weight and making the stored average item weight and container weight available to said postage meter device, and wherein the step of calculating a calculated weight comprises calculating a calculated weight of said piece of mail in said postage meter device by multiplying said average item weight by said item count and adding said container weight.

44. A method for data processing in a mail shipping system comprising the steps of:

providing a postage meter device connected to a print head, and detecting an individual piece of mail in a transport path leading to said print head, said piece of mail comprising a container containing at least one item and having information printed thereon representing an item count which identifies a number of items in said container;

scanning said information printed on said piece of mail to obtain scanned information including said item count;

storing an average item weight in said postage meter device;

automatically entering said scanned information into said postage meter device and calculating a weight of said piece of mail in said postage meter device by multiplying said item count by said average item weight;

calculating a postage fee in said postage meter device for a carrier for said piece of mail using said weight of said piece of mail; and generating print data in said postage meter device including said fee and supplying said print data to said print head for producing a franking imprint on said piece of mail incorporating said fee.

45. An arrangement for data processing in a mail shipping system comprising:

a postage meter device connected to a print head, and a transport path along which separate pieces of mail are transported to said print head, each said piece of mail comprising a container containing at least one item and having information printed thereon representing an item count which identifies a number of items in said container;

scanner means for scanning a piece of mail in said transport path for identifying a recipient of said piece of mail;

means in said postage meter device for interrogating a personal computer, remote from said postage meter device, based on said recipient to identify an item count for said piece of mail;

means for storing an average item weight;

first calculator means, supplied with said average item weight, for calculating a weight of said piece of mail by multiplying said item count by said average item weight;

second calculator means, in said postage meter device, for calculating a fee required for shipping said piece of mail by a carrier using a fee table for said carrier and said weight of said piece of mail; and means in said postage meter device for generating print data including said fee and for supplying said print data to said print head for producing a franking imprint on said piece of mail incorporating said fee.

46. An arrangement as claimed in claim 45 wherein said scanner means comprises means for recognizing different formats of pieces of mail.

47. An arrangement as claimed in claim 46 wherein at least one of said formats comprises a format regulated by a postal authority which specifies a position for information within at least one of said formats, and wherein said personal computer comprises memory means for storing said position information in said at least one of said formats for printing information on said piece of mail according to said at least one of said formats.

48. An arrangement as claimed in claim 45 wherein said scanner means is contained in said postage meter device.

49. An arrangement as claimed in claim 45 further comprising register means in said postage meter device, supplied with a signal from said scanner means, for intermediately storing said scanned information for inclusion in said print data and for conducting a parallel-to-serial conversion of said scanned information, said register means being connected to said print head for producing said franking imprint.

50. An arrangement as claimed in claim 45 wherein said means for interrogating comprises means for interrogating said personal computer to identify a cost center to be charged said fee, in addition to identifying said item count, and further comprising means in said postage meter device for using said cost center for conducting a cost-center-specific accounting for said fee.

51. An arrangement as claimed in claim 45 wherein said scanner means comprises an electronic image interpretation circuit.

52. An arrangement as claimed in claim 45 further comprising means for selecting a carrier, as a selected carrier, among a plurality of available carriers, and means for storing a print format in said postage meter device for said selected carrier, and wherein said means for generating print data comprises means for generating print data including said fee and said print format and for supplying said print data to said print head for producing a franking imprint on said piece of mail incorporating said fee and said print format for said selected carrier.

53. An arrangement as claimed in claim 45 wherein said first calculator means is disposed in said postage meter device.

54. An apparatus for data processing in a mail shipping system comprising:

a postage meter device connected to a print head, and a transport path by which separate pieces of mail are transported to said print head, each said piece of mail comprising a container containing at least one item and having information printed thereon representing an item count which identifies a number of items in said container;

means for detecting a piece of mail in a transport path to said postage meter device;

scanner means for scanning information printed on said piece of mail to obtain scanned information including an item count and for automatically entering said scanned information into said postage meter device;

means for storing an average item weight and making the stored average item weight available to said postage meter device;

means in said postage meter device for calculating a weight of said piece of mail by multiplying said item count by said average item weight;

means in said postage meter device for calculating a postage fee for a carrier for said piece of mail using said weight of said piece of mail; and means in said postage meter machine for generating print data including said fee and for supplying said print data to said print head for producing a franking imprint on said piece of mail incorporating said fee.

55. A method for data processing in a shipping system for separate pieces of mail, said method comprising the steps of:

(a) providing print head having a transport path by which pieces of mail are transported to said print head, each piece of mail comprising a container containing at least one item and each piece of mail having an information-containing mark printed thereon;

(b) electronically detecting a piece of mail, as a detected piece of mail, in said transport path;

(c) electronically scanning the mark of the detected piece of mail in said transport path;

(d) using the information in the mark of the detected piece of mail, identifying an item count equal to a number of items contained in the detected piece of mail;

(e) providing data from which a weight associated with shipping said detected piece of mail is derivable;

(f) electronically calculating a calculated weight associated with shipping said detected piece of mail from said data;

(g) electronically calculating a fee for shipping said detected piece of mail based on said calculated weight; and (h) electronically conducting an accounting for charging said fee, electronically generating print data and supplying said print data to said print head and printing a franking imprint on said detected piece of mail incorporating a printed representation of said fee.

56. A method as claimed in claim 55 wherein steps (e) and (f) respectively comprise:

(e) storing an average item weight and a container weight; and (f) electronically calculating a weight of said detected piece of mail by multiplying said item count by said average item weight and adding said container weight.

57. A method for data entry in a mail shipping system comprising the steps of:

electronically scanning a mark on an individual piece of mail and from said mark identifying scanned information including an item count and a cost center number for a cost center to be charged a fee for shipping said piece of mail;

storing an average insert weight and a container weight;

electronically calculating a weight of said piece of mail by multiplying said item count by said average item weight and adding said container weight;

electronically calculating for shipping said piece of mail by a carrier using a postage fee table for said carrier;

electronically conducting an accounting for classifying said fee according to a cost center; and generating print data including said fee and printing a franking imprint on said piece of mail incorporating said fee.

58. A method for data entry in a mail shipping system comprising the steps of:

electronically scanning a mark on an individual piece of mail and from said mark identifying scanned information including an item count and at least one of a carrier identification for a carrier for shipping said piece of mail;

storing an average insert weight and a container weight;

electronically calculating a weight of said piece of mail by multiplying said item count by said average item weight and adding said container weight;

electronically calculating said fee for shipping said piece of mail by a selected carrier using a postage fee table for said selected carrier;

electronically conducting an accounting for classifying said fee according to at least one of said selected carrier; and generating print data including said fee and for printing a franking imprint on said piece of mail incorporating said fee.

59. A method for data entry in a mail shipping system comprising the steps of:

scanning a mark on an individual piece of mail to obtain scanned information;

interrogating a personal computer and conducting a search in said personal computer, using said scanned information, for identifying a letter file in said personal computer and retrieving instructional data and an item count from said letter file;

providing data from which a weight associated with shipping said detected piece of mail is derivable;

calculating a calculated weight associated with shipping said detected piece of mail from said data;

calculating a fee for shipping said piece of mail by a carrier using a fee table for said carrier and said calculated weight of said piece of mail;

conducting an accounting for classifying said fee according to a cost center; and generating print data including said fee and supplying said print data to said print head for printing a franking imprint on said piece of mail incorporating said fee.

60. A method for data entry in a mail shipping system comprising the steps of:

scanning a mark on an individual piece of mail to obtain scanned information;

interrogating a personal computer and conducting a search in said personal computer, using said scanned information, for identifying a letter file in said personal computer and retrieving instructional data and an item count from said letter file;

providing data from which a weight associated with shipping said detected piece of mail is derivable;

calculating a calculated weight associated with shipping said detected piece of mail from said data;

calculating a fee for shipping said piece of mail by a carrier using a fee table for said carrier and said calculated weight of said piece of mail;

conducting an accounting for said carrier; and generating print data including said fee and supplying said print data to said print head for printing a franking imprint on said piece of mail incorporating said fee.

61. An arrangement for data processing in a mail shipping system comprising: a print head, and a transport path along which separate pieces of mail are transported to said print head, each said piece of mail comprising a container containing at least one item and having information printed thereon;

scanner means for scanning a piece of mail in said transport path for identifying said information;

means for storing data representing an item count for said piece of mail, which identifies a number of items in said container, said means for storing being accessible from a personal computer remote from said print head;

means for interrogating said personal computer based on said information to identify said item count for said piece of mail;

means for storing an average item weight;

first calculator means, supplied with said average item weight, for calculating a weight of said piece of mail by multiplying said item count by said average item weight;

second calculator means for calculating a fee required for shipping said piece of mail by a carrier using a fee table for said carrier and said weight of said piece of mail; and means for generating print data including said fee and for supplying said print data to said print head for producing a franking imprint on said piece of mail incorporating said fee.

* * * * *

UNITED STATES PATENT AND TRADEMARK OFFICE

CERTIFICATE OF CORRECTION

PATENT NO. : 6,226,626 B1
DATED : May 1, 2001
INVENTOR(S) : Wolfgang Thiel

It is certified that error appears in the above-identified patent and that said Letters Patent is hereby corrected as shown below:

Title page,
Item [73], Assignee, cancel "Siemens Aktiengesellschaft, Munich (DE)" and substitute -- Francotyp-Postalia AG & Co., Birkenwerder (DE) -- therefor.

Signed and Sealed this

Sixth Day of September, 2005

JON W. DUDAS
*Director of the United States Patent and Trademark Office*